(12) United States Patent  
Taylor et al.

(10) Patent No.: US 8,543,330 B2  
(45) Date of Patent: Sep. 24, 2013

(54) DRIVER ASSIST SYSTEM FOR VEHICLE

(71) Applicants: David W. Taylor, Fenton, MI (US); Kevin C. McCarthy, Tucson, AZ (US); Niall R. Lynam, Holland, MI (US); Kenneth Schofield, Holland, MI (US)

(72) Inventors: David W. Taylor, Fenton, MI (US); Kevin C. McCarthy, Tucson, AZ (US); Niall R. Lynam, Holland, MI (US); Kenneth Schofield, Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 13/621,382

(22) Filed: Sep. 17, 2012

(65) Prior Publication Data

US 2013/0016209 A1     Jan. 17, 2013

Related U.S. Application Data

(63) Continuation of application No. 13/399,347, filed on Feb. 17, 2012, now Pat. No. 8,271,187, which is a continuation of application No. 13/209,645, filed on Aug. 15, 2011, now Pat. No. 8,121,787, which is a continuation of application No. 12/908,481, filed on Oct. 20, 2010, now Pat. No. 8,000,894, which is a continuation of application No. 12/724,895, filed on Mar. 16, 2010, now Pat. No. 7,822,543, which is a (Continued)

(51) Int. Cl.  
*G01C 21/00* (2006.01)

(52) U.S. Cl.  
USPC ............. 701/408; 701/24; 701/409; 701/410; 340/525

(58) Field of Classification Search  
USPC ............ 701/408, 409, 410, 412, 24; 340/525  
See application file for complete search history.

(56) References Cited

U.S. PATENT DOCUMENTS 1,096,452 A    5/1914   Perrin  
1,563,258 A    11/1925  Cunningham (Continued)

FOREIGN PATENT DOCUMENTS

AU      A-40317/95    2/1995  
CN      1189224       7/1998

(Continued)

OTHER PUBLICATIONS

Stewart, James W.; HP SnapLED: LED Assemblies for Automotive Signal Applications; Nov. 1, 1998; Hewlett-Packard Journal; vol. 50, No. 1, www.hpl.hp.com/hpjournal/98nov/nov98a1.pdf.

(Continued)

*Primary Examiner* — Gertrude Arthur Jeanglaude  
(74) *Attorney, Agent, or Firm* — Gardner, Linn, Burkhart & Flory, LLP

(57) ABSTRACT

A driver assist system for a vehicle includes a camera disposed at a vehicle and having an exterior field of view relative to the vehicle, and a video display operable to display image data captured by the camera and viewable by the driver of the vehicle. The driver assist system is operable to detect objects present in the exterior field of view of the camera. The driver assist system is operable to provide a display intensity of displayed image data of at least about 200 candelas/sq. meter for viewing by the driver. The driver assist system is operable to provide a visual alert and an audible alert responsive to detection of an object exterior of the vehicle. The visual alert includes electronically generated indicia that overlay displayed image data and that at least one of (i) indicate distance to a detected object and (ii) highlight a detected object.

89 Claims, 2 Drawing Sheets

Related U.S. Application Data

(63) continuation of application No. 12/405,614, filed on Mar. 17, 2009, now Pat. No. 7,711,479, which is a continuation of application No. 11/935,800, filed on Nov. 6, 2007, now Pat. No. 7,571,042, which is a continuation of application No. 11/624,381, filed on Jan. 18, 2007, now Pat. No. 7,490,007, which is a continuation of application No. 10/645,762, filed on Aug. 20, 2003, now Pat. No. 7,167,796, and a continuation-in-part of application No. 10/456,599, filed on Jun. 6, 2003, now Pat. No. 7,004,593, and a continuation-in-part of application No. 10/287,178, filed on Nov. 4, 2002, now Pat. No. 6,678,614, which is a continuation of application No. 09/799,414, filed on Mar. 5, 2001, now Pat. No. 6,477,464, said application No. 11/624,381 is a continuation-in-part of application No. 10/755,915, filed on Jan. 13, 2004, now Pat. No. 7,446,650, which is a continuation of application No. 09/793,002, filed on Feb. 26, 2001, now Pat. No. 6,690,268, which is a continuation-in-part of application No. 10/054,633, filed on Jan. 22, 2002, now Pat. No. 7,195,381, and a continuation-in-part of application No. 09/793,002, filed on Feb. 26, 2001, now Pat. No. 6,690,268.

(60) Provisional application No. 60/406,166, filed on Aug. 27, 2002, provisional application No. 60/405,392, filed on Aug. 23, 2002, provisional application No. 60/404,906, filed on Aug. 21, 2002, provisional application No. 60/187,960, filed on Mar. 9, 2000, provisional application No. 60/263,680, filed on Jan. 23, 2001, provisional application No. 60/243,986, filed on Oct. 27, 2000, provisional application No. 60/238,483, filed on Oct. 6, 2000, provisional application No. 60/237,077, filed on Sep. 30, 2000, provisional application No. 60/234,412, filed on Sep. 21, 2000, provisional application No. 60/218,336, filed on Jul. 14, 2000, provisional application No. 60/186,520, filed on Mar. 2, 2000, provisional application No. 60/346,733, filed on Jan. 7, 2002, provisional application No. 60/263,680, filed on Jan. 23, 2001, provisional application No. 60/271,466, filed on Feb. 26, 2001, provisional application No. 60/315,384, filed on Aug. 28, 2001.

(56) References Cited

U.S. PATENT DOCUMENTS

| | | |
|---|---|---|
| 2,069,368 A | 2/1937 | Horinstein |
| 2,166,303 A | 7/1939 | Hodny et al. |
| 2,263,382 A | 11/1941 | Gotzinger |
| 2,414,223 A | 1/1947 | DeVirgilis |
| 2,457,348 A | 12/1948 | Chambers |
| 2,561,582 A | 7/1951 | Marbel |
| 2,580,014 A | 12/1951 | Gazda |
| 3,004,473 A | 10/1961 | Arthur et al. |
| 3,075,430 A | 1/1963 | Woodward et al. |
| 3,141,393 A | 7/1964 | Platt |
| 3,152,216 A | 10/1964 | Woodward |
| 3,162,008 A | 12/1964 | Berger et al. |
| 3,185,020 A | 5/1965 | Thelen |
| 3,266,016 A | 8/1966 | Maruyama et al. |
| 3,280,701 A | 10/1966 | Donnelly et al. |
| 3,432,225 A | 3/1969 | Rock |
| 3,451,741 A | 6/1969 | Manos |
| 3,453,038 A | 7/1969 | Kissa et al. |
| 3,467,465 A | 9/1969 | Van Noord |
| 3,473,867 A | 10/1969 | Byrnes |
| 3,480,781 A | 11/1969 | Mandalakas |
| 3,499,112 A | 3/1970 | Heilmeier et al. |
| 3,499,702 A | 3/1970 | Goldmacher et al. |
| 3,521,941 A | 7/1970 | Deb et al. |
| 3,543,018 A | 11/1970 | Barcus et al. |
| 3,557,265 A | 1/1971 | Chisholm et al. |
| 3,565,985 A | 2/1971 | Schrenk et al. |
| 3,612,654 A | 10/1971 | Klein |
| 3,614,210 A | 10/1971 | Caplan |
| 3,628,851 A | 12/1971 | Robertson |
| 3,676,668 A | 7/1972 | Collins et al. |
| 3,680,951 A | 8/1972 | Jordan et al. |
| 3,689,695 A | 9/1972 | Rosenfield et al. |
| 3,711,176 A | 1/1973 | Alfrey, Jr. et al. |
| 3,712,710 A | 1/1973 | Castellion et al. |
| 3,748,017 A | 7/1973 | Yamamura et al. |
| 3,781,090 A | 12/1973 | Sumita |
| 3,806,229 A | 4/1974 | Schoot et al. |
| 3,807,832 A | 4/1974 | Castellion |
| 3,807,833 A | 4/1974 | Graham et al. |
| 3,821,590 A | 6/1974 | Kosman et al. |
| 3,837,129 A | 9/1974 | Losell |
| 3,860,847 A | 1/1975 | Carley |
| 3,862,798 A | 1/1975 | Hopkins |
| 3,870,404 A | 3/1975 | Wilson et al. |
| 3,876,287 A | 4/1975 | Sprokel |
| 3,932,024 A | 1/1976 | Yaguchi et al. |
| 3,940,822 A | 3/1976 | Emerick et al. |
| 3,956,017 A | 5/1976 | Shigemasa |
| 3,978,190 A | 8/1976 | Kurz, Jr. et al. |
| 3,985,424 A | 10/1976 | Steinacher |
| 4,006,546 A | 2/1977 | Anderson et al. |
| 4,035,681 A | 7/1977 | Savage |
| 4,040,727 A | 8/1977 | Ketchpel |
| 4,052,712 A | 10/1977 | Ohama et al. |
| 4,075,468 A | 2/1978 | Marcus |
| 4,088,400 A | 5/1978 | Assouline et al. |
| 4,093,364 A | 6/1978 | Miller |
| 4,097,131 A | 6/1978 | Nishiyama |
| 4,109,235 A | 8/1978 | Bouthors |
| 4,139,234 A | 2/1979 | Morgan |
| 4,159,866 A | 7/1979 | Wunsch et al. |
| 4,161,653 A | 7/1979 | Bedini et al. |
| 4,171,875 A | 10/1979 | Taylor et al. |
| 4,174,152 A | 11/1979 | Giglia et al. |
| 4,200,361 A | 4/1980 | Malvano et al. |
| 4,202,607 A | 5/1980 | Washizuka et al. |
| 4,211,955 A | 7/1980 | Ray |
| 4,214,266 A | 7/1980 | Myers |
| 4,219,760 A | 8/1980 | Ferro |
| 4,221,955 A | 9/1980 | Joslyn |
| 4,228,490 A | 10/1980 | Thillays |
| 4,247,870 A | 1/1981 | Gabel et al. |
| 4,257,703 A | 3/1981 | Goodrich |
| 4,274,078 A | 6/1981 | Isobe et al. |
| 4,277,804 A | 7/1981 | Robison |
| 4,281,899 A | 8/1981 | Oskam |
| 4,288,814 A | 9/1981 | Talley et al. |
| 4,297,401 A | 10/1981 | Chern et al. |
| RE30,835 E | 12/1981 | Giglia |
| 4,306,768 A | 12/1981 | Egging |
| 4,310,851 A | 1/1982 | Pierrat |
| 4,331,382 A | 5/1982 | Graff |
| 4,338,000 A | 7/1982 | Kamimori et al. |
| 4,377,613 A | 3/1983 | Gordon |
| 4,398,805 A | 8/1983 | Cole |
| 4,419,386 A | 12/1983 | Gordon |
| 4,420,238 A | 12/1983 | Felix |
| 4,425,717 A | 1/1984 | Marcus |
| 4,435,042 A | 3/1984 | Wood et al. |
| 4,435,048 A | 3/1984 | Kamimori et al. |
| 4,436,371 A | 3/1984 | Wood et al. |
| 4,438,348 A | 3/1984 | Casper et al. |
| 4,443,057 A | 4/1984 | Bauer et al. |
| 4,446,171 A | 5/1984 | Thomas |
| 4,465,339 A | 8/1984 | Baucke et al. |
| 4,473,695 A | 9/1984 | Wrighton et al. |
| 4,490,227 A | 12/1984 | Bitter |
| 4,491,390 A | 1/1985 | Tong-Shen |
| 4,499,451 A | 2/1985 | Suzuki et al. |

| | | | | | |
|---|---|---|---|---|---|
| 4,521,079 A | 6/1985 | Leenhouts et al. | 4,871,917 A | 10/1989 | O'Farrell et al. |
| 4,524,941 A | 6/1985 | Wood et al. | 4,872,051 A | 10/1989 | Dye |
| 4,538,063 A | 8/1985 | Bulat | 4,882,466 A | 11/1989 | Friel |
| 4,546,551 A | 10/1985 | Franks | 4,882,565 A | 11/1989 | Gallmeyer |
| 4,555,694 A | 11/1985 | Yanagishima et al. | 4,883,349 A | 11/1989 | Mittelhäuser |
| 4,561,625 A | 12/1985 | Weaver | 4,884,135 A | 11/1989 | Schiffman |
| 4,572,619 A | 2/1986 | Reininger et al. | 4,886,960 A | 12/1989 | Molyneux et al. |
| 4,580,196 A | 4/1986 | Task | 4,889,412 A | 12/1989 | Clerc et al. |
| 4,580,875 A | 4/1986 | Bechtel et al. | 4,891,828 A | 1/1990 | Kawazoe |
| 4,581,827 A | 4/1986 | Higashi | 4,892,345 A | 1/1990 | Rachael, III |
| 4,588,267 A | 5/1986 | Pastore | 4,902,103 A | 2/1990 | Miyake et al. |
| 4,603,946 A | 8/1986 | Kato et al. | 4,902,108 A | 2/1990 | Byker |
| 4,623,222 A | 11/1986 | Itoh et al. | 4,906,085 A | 3/1990 | Sugihara et al. |
| 4,625,210 A | 11/1986 | Sagl | 4,909,606 A | 3/1990 | Wada et al. |
| 4,626,850 A | 12/1986 | Chey | 4,910,591 A | 3/1990 | Petrossian et al. |
| 4,630,040 A | 12/1986 | Haertling | 4,916,374 A | 4/1990 | Schierbeek et al. |
| 4,630,109 A | 12/1986 | Barton | 4,917,477 A | 4/1990 | Bechtel et al. |
| 4,630,904 A | 12/1986 | Pastore | 4,926,170 A | 5/1990 | Beggs et al. |
| 4,634,835 A | 1/1987 | Suzuki | 4,930,742 A | 6/1990 | Schofield et al. |
| 4,635,033 A | 1/1987 | Inukai et al. | 4,933,814 A | 6/1990 | Sanai |
| 4,636,782 A | 1/1987 | Nakamura et al. | 4,935,665 A | 6/1990 | Murata |
| 4,638,287 A | 1/1987 | Umebayashi et al. | 4,936,533 A | 6/1990 | Adams et al. |
| 4,646,210 A | 2/1987 | Skogler et al. | 4,937,796 A | 6/1990 | Tendler |
| 4,652,090 A | 3/1987 | Uchikawa et al. | 4,937,945 A | 7/1990 | Schofield et al. |
| 4,655,549 A | 4/1987 | Suzuki et al. | 4,943,796 A | 7/1990 | Lee |
| 4,664,479 A | 5/1987 | Hiroshi | 4,948,242 A | 8/1990 | Desmond et al. |
| 4,665,311 A | 5/1987 | Cole | 4,953,305 A | 9/1990 | Van Lente et al. |
| 4,665,430 A | 5/1987 | Hiroyasu | 4,956,591 A | 9/1990 | Schierbeek et al. |
| 4,669,827 A | 6/1987 | Fukada et al. | 4,957,349 A | 9/1990 | Clerc et al. |
| 4,671,615 A | 6/1987 | Fukada et al. | 4,959,247 A | 9/1990 | Moser et al. |
| 4,671,619 A | 6/1987 | Kamimori et al. | 4,959,865 A | 9/1990 | Stettiner et al. |
| 4,678,281 A | 7/1987 | Bauer | 4,970,653 A | 11/1990 | Kenue |
| 4,679,906 A | 7/1987 | Brandenburg | 4,973,844 A | 11/1990 | O'Farrell et al. |
| 4,682,083 A | 7/1987 | Alley | 4,974,122 A | 11/1990 | Shaw |
| 4,692,798 A | 9/1987 | Seko et al. | 4,978,196 A | 12/1990 | Suzuki et al. |
| 4,694,295 A | 9/1987 | Miller et al. | 4,983,951 A | 1/1991 | Igarashi et al. |
| 4,697,883 A | 10/1987 | Suzuki et al. | 4,985,809 A | 1/1991 | Matsui et al. |
| 4,701,022 A | 10/1987 | Jacob | 4,987,357 A | 1/1991 | Masaki |
| 4,702,566 A | 10/1987 | Tukude et al. | 4,989,956 A | 2/1991 | Wu et al. |
| 4,704,740 A | 11/1987 | McKee et al. | 4,996,083 A | 2/1991 | Moser et al. |
| 4,711,544 A | 12/1987 | Iino et al. | 5,001,386 A | 3/1991 | Sullivan et al. |
| 4,712,879 A | 12/1987 | Lynam et al. | 5,001,558 A | 3/1991 | Burley et al. |
| 4,713,685 A | 12/1987 | Nishimura et al. | 5,005,213 A | 4/1991 | Hanson et al. |
| RE32,576 E | 1/1988 | Pastore | 5,006,971 A | 4/1991 | Jerkins |
| 4,718,756 A | 1/1988 | Lancaster | 5,014,167 A | 5/1991 | Roberts |
| 4,721,364 A | 1/1988 | Itoh et al. | 5,016,988 A | 5/1991 | Iimura |
| 4,729,068 A | 3/1988 | Ohe | 5,016,996 A | 5/1991 | Ueno |
| 4,729,076 A | 3/1988 | Masami et al. | 5,017,903 A | 5/1991 | Krippelz, Sr. |
| 4,731,669 A | 3/1988 | Hayashi et al. | 5,018,839 A | 5/1991 | Yamamoto et al. |
| 4,733,335 A | 3/1988 | Serizawa et al. | 5,027,200 A | 6/1991 | Petrossian et al. |
| 4,733,336 A | 3/1988 | Skogler et al. | 5,037,182 A | 8/1991 | Groves et al. |
| 4,740,838 A | 4/1988 | Mase et al. | 5,038,255 A | 8/1991 | Nishihashi et al. |
| 4,761,061 A | 8/1988 | Nishiyama et al. | 5,052,163 A | 10/1991 | Czekala |
| 4,773,740 A | 9/1988 | Kawakami et al. | 5,056,899 A | 10/1991 | Warszawski |
| 4,780,752 A | 10/1988 | Angerstein et al. | 5,057,974 A | 10/1991 | Mizobe |
| 4,781,436 A | 11/1988 | Armbruster | 5,058,851 A | 10/1991 | Lawlor et al. |
| 4,789,774 A | 12/1988 | Koch et al. | 5,059,015 A | 10/1991 | Tran |
| 4,789,904 A | 12/1988 | Peterson | 5,066,108 A | 11/1991 | McDonald |
| 4,793,690 A | 12/1988 | Gahan et al. | 5,066,112 A | 11/1991 | Lynam et al. |
| 4,793,695 A | 12/1988 | Wada et al. | 5,069,535 A | 12/1991 | Baucke et al. |
| 4,794,261 A | 12/1988 | Rosen | 5,070,323 A | 12/1991 | Iino et al. |
| D299,491 S | 1/1989 | Masuda | 5,073,012 A | 12/1991 | Lynam |
| 4,799,768 A | 1/1989 | Gahan | 5,076,673 A | 12/1991 | Lynam et al. |
| 4,803,599 A | 2/1989 | Trine et al. | 5,076,674 A | 12/1991 | Lynam |
| 4,807,096 A | 2/1989 | Skogler et al. | 5,078,480 A | 1/1992 | Warszawski |
| 4,820,933 A | 4/1989 | Hong et al. | 5,096,287 A | 3/1992 | Kakinami et al. |
| 4,825,232 A | 4/1989 | Howdle | 5,100,095 A | 3/1992 | Haan et al. |
| 4,826,289 A | 5/1989 | Vandenbrink et al. | 5,101,139 A | 3/1992 | Lechter |
| 4,827,086 A | 5/1989 | Rockwell | 5,105,127 A | 4/1992 | Lavaud et al. |
| 4,837,551 A | 6/1989 | Iino | 5,115,346 A | 5/1992 | Lynam |
| 4,842,378 A | 6/1989 | Flasck et al. | 5,119,220 A | 6/1992 | Narita et al. |
| 4,845,402 A | 7/1989 | Smith | 5,121,200 A | 6/1992 | Choi |
| 4,847,772 A | 7/1989 | Michalopoulos et al. | 5,122,619 A | 6/1992 | Dlubak |
| 4,855,161 A | 8/1989 | Moser et al. | 5,123,077 A | 6/1992 | Endo et al. |
| 4,855,550 A | 8/1989 | Schultz, Jr. | 5,124,845 A | 6/1992 | Shimojo |
| 4,859,813 A | 8/1989 | Rockwell | 5,124,890 A | 6/1992 | Choi et al. |
| 4,859,867 A | 8/1989 | Larson et al. | 5,128,799 A | 7/1992 | Byker |
| 4,860,171 A | 8/1989 | Kojima | 5,130,898 A | 7/1992 | Akahane |
| 4,862,594 A | 9/1989 | Schierbeek et al. | 5,131,154 A | 7/1992 | Schierbeek et al. |

| | | |
|---|---|---|
| 5,134,507 A | 7/1992 | Ishii |
| 5,134,549 A | 7/1992 | Yokoyama |
| 5,135,298 A | 8/1992 | Feltman |
| 5,136,483 A | 8/1992 | Schöniger et al. |
| 5,140,455 A | 8/1992 | Varaprasad et al. |
| 5,140,465 A | 8/1992 | Yasui et al. |
| 5,142,407 A | 8/1992 | Varaprasad et al. |
| 5,145,609 A | 9/1992 | Varaprasad et al. |
| 5,148,306 A | 9/1992 | Yamada et al. |
| 5,150,232 A | 9/1992 | Gunkima et al. |
| 5,151,816 A | 9/1992 | Varaprasad et al. |
| 5,151,824 A | 9/1992 | O'Farrell |
| 5,154,617 A | 10/1992 | Suman et al. |
| 5,158,638 A | 10/1992 | Osanami et al. |
| 5,160,200 A | 11/1992 | Cheselske |
| 5,160,201 A | 11/1992 | Wrobel |
| 5,166,815 A | 11/1992 | Elderfield |
| 5,168,378 A | 12/1992 | Black et al. |
| 5,173,881 A | 12/1992 | Sindle |
| 5,177,031 A | 1/1993 | Buchmann et al. |
| 5,178,448 A | 1/1993 | Adams et al. |
| 5,179,471 A | 1/1993 | Caskey et al. |
| 5,183,099 A | 2/1993 | Bechu |
| 5,184,956 A | 2/1993 | Langlarais et al. |
| 5,189,537 A | 2/1993 | O'Farrell |
| 5,193,029 A | 3/1993 | Schofield et al. |
| 5,197,562 A | 3/1993 | Kakinami et al. |
| 5,202,950 A | 4/1993 | Arego et al. |
| 5,207,492 A | 5/1993 | Roberts |
| 5,210,967 A | 5/1993 | Brown |
| 5,212,819 A | 5/1993 | Wada |
| 5,214,408 A | 5/1993 | Asayama |
| 5,217,794 A | 6/1993 | Schrenk |
| 5,223,814 A | 6/1993 | Suman |
| 5,223,844 A | 6/1993 | Mansell et al. |
| 5,229,975 A | 7/1993 | Truesdell et al. |
| 5,230,400 A | 7/1993 | Kakinami et al. |
| 5,233,461 A | 8/1993 | Dornan et al. |
| 5,235,316 A | 8/1993 | Qualizza |
| 5,239,405 A | 8/1993 | Varaprasad et al. |
| 5,239,406 A | 8/1993 | Lynam |
| 5,243,417 A | 9/1993 | Pollard |
| 5,245,422 A | 9/1993 | Borcherts et al. |
| 5,252,354 A | 10/1993 | Cronin et al. |
| 5,253,109 A | 10/1993 | O'Farrell et al. |
| 5,255,442 A | 10/1993 | Schierbeek et al. |
| 5,260,626 A | 11/1993 | Takase et al. |
| 5,277,986 A | 1/1994 | Cronin et al. |
| 5,280,555 A | 1/1994 | Ainsburg |
| 5,285,060 A | 2/1994 | Larson et al. |
| 5,289,321 A | 2/1994 | Secor |
| 5,296,924 A | 3/1994 | de Saint Blancard et al. |
| 5,303,075 A | 4/1994 | Wada et al. |
| 5,303,205 A | 4/1994 | Gauthier et al. |
| 5,304,980 A | 4/1994 | Maekawa |
| 5,305,012 A | 4/1994 | Faris |
| 5,307,136 A | 4/1994 | Saneyoshi |
| 5,313,335 A | 5/1994 | Gray et al. |
| 5,325,096 A | 6/1994 | Pakett |
| 5,325,386 A | 6/1994 | Jewell et al. |
| 5,327,288 A | 7/1994 | Wellington et al. |
| 5,330,149 A | 7/1994 | Haan et al. |
| 5,331,312 A | 7/1994 | Kudoh |
| 5,331,358 A | 7/1994 | Schurle et al. |
| 5,339,075 A | 8/1994 | Abst et al. |
| 5,339,529 A | 8/1994 | Lindberg |
| 5,341,437 A | 8/1994 | Nakayama |
| D351,370 S | 10/1994 | Lawlor et al. |
| 5,354,965 A | 10/1994 | Lee |
| 5,355,118 A | 10/1994 | Fukuhara |
| 5,355,245 A | 10/1994 | Lynam |
| 5,355,284 A | 10/1994 | Roberts |
| 5,361,190 A | 11/1994 | Roberts et al. |
| 5,363,294 A | 11/1994 | Yamamoto et al. |
| 5,371,659 A | 12/1994 | Pastrick et al. |
| 5,373,482 A | 12/1994 | Gauthier |
| 5,379,146 A | 1/1995 | Defendini |
| 5,386,285 A | 1/1995 | Asayama |
| 5,386,306 A | 1/1995 | Gunjima et al. |
| 5,400,158 A | 3/1995 | Ohnishi et al. |
| 5,402,103 A | 3/1995 | Tashiro |
| 5,406,395 A | 4/1995 | Wilson et al. |
| 5,406,414 A | 4/1995 | O'Farrell et al. |
| 5,408,353 A | 4/1995 | Nichols et al. |
| 5,408,357 A | 4/1995 | Beukema |
| 5,410,346 A | 4/1995 | Saneyoshi et al. |
| 5,414,439 A | 5/1995 | Groves et al. |
| 5,414,461 A | 5/1995 | Kishi et al. |
| 5,416,313 A | 5/1995 | Larson et al. |
| 5,416,478 A | 5/1995 | Morinaga |
| 5,418,610 A | 5/1995 | Fischer |
| 5,422,756 A | 6/1995 | Weber |
| 5,424,726 A | 6/1995 | Beymer |
| 5,424,865 A | 6/1995 | Lynam |
| 5,424,952 A | 6/1995 | Asayama |
| 5,426,524 A | 6/1995 | Wada et al. |
| 5,426,723 A | 6/1995 | Horsley |
| 5,430,431 A | 7/1995 | Nelson |
| 5,432,496 A | 7/1995 | Lin |
| 5,432,626 A | 7/1995 | Sasuga et al. |
| 5,436,741 A | 7/1995 | Crandall |
| 5,437,931 A | 8/1995 | Tsai et al. |
| 5,439,305 A | 8/1995 | Santo |
| 5,444,478 A | 8/1995 | Lelong et al. |
| 5,446,576 A | 8/1995 | Lynam et al. |
| 5,455,716 A | 10/1995 | Suman et al. |
| 5,461,361 A | 10/1995 | Moore |
| D363,920 S | 11/1995 | Roberts et al. |
| 5,469,187 A | 11/1995 | Yaniv |
| 5,469,298 A | 11/1995 | Suman et al. |
| 5,475,366 A | 12/1995 | Van Lente et al. |
| 5,475,494 A | 12/1995 | Nishida et al. |
| 5,481,409 A | 1/1996 | Roberts |
| 5,483,453 A | 1/1996 | Uemura et al. |
| 5,485,161 A | 1/1996 | Vaughn |
| 5,485,378 A | 1/1996 | Franke et al. |
| 5,487,522 A | 1/1996 | Hook |
| 5,488,496 A | 1/1996 | Pine |
| 5,497,305 A | 3/1996 | Pastrick et al. |
| 5,497,306 A | 3/1996 | Pastrick |
| 5,500,760 A | 3/1996 | Varaprasad et al. |
| 5,506,701 A | 4/1996 | Ichikawa |
| 5,509,606 A | 4/1996 | Breithaupt et al. |
| 5,510,983 A | 4/1996 | Iino |
| 5,515,448 A | 5/1996 | Nishitani |
| 5,517,853 A | 5/1996 | Chamussy |
| 5,519,621 A | 5/1996 | Wortham |
| 5,521,744 A | 5/1996 | Mazurek |
| 5,521,760 A | 5/1996 | De Young et al. |
| 5,523,811 A | 6/1996 | Wada et al. |
| 5,523,877 A | 6/1996 | Lynam |
| 5,525,264 A | 6/1996 | Cronin et al. |
| 5,525,977 A | 6/1996 | Suman |
| 5,528,422 A | 6/1996 | Roberts |
| 5,528,474 A | 6/1996 | Roney et al. |
| 5,529,138 A | 6/1996 | Shaw et al. |
| 5,530,240 A | 6/1996 | Larson et al. |
| 5,530,420 A | 6/1996 | Tsuchiya et al. |
| 5,530,421 A | 6/1996 | Marshall et al. |
| 5,535,056 A | 7/1996 | Caskey et al. |
| 5,535,144 A | 7/1996 | Kise |
| 5,539,397 A | 7/1996 | Asanuma et al. |
| 5,541,590 A | 7/1996 | Nishio |
| 5,550,677 A | 8/1996 | Schofield et al. |
| 5,555,172 A | 9/1996 | Potter |
| 5,561,333 A | 10/1996 | Darius |
| 5,566,224 A | 10/1996 | ul Azam et al. |
| 5,567,360 A | 10/1996 | Varaprasad et al. |
| 5,568,316 A | 10/1996 | Schrenk et al. |
| 5,570,127 A | 10/1996 | Schmidt |
| 5,572,354 A | 11/1996 | Desmond et al. |
| 5,574,426 A | 11/1996 | Shisgal et al. |
| 5,574,443 A | 11/1996 | Hsieh |
| 5,575,552 A | 11/1996 | Faloon et al. |
| 5,576,687 A | 11/1996 | Blank et al. |
| 5,576,854 A | 11/1996 | Schmidt et al. |
| 5,576,975 A | 11/1996 | Sasaki et al. |
| 5,578,404 A | 11/1996 | Kliem |

| | | | | | |
|---|---|---|---|---|---|
| 5,587,236 A | 12/1996 | Agrawal et al. | 5,745,266 A | 4/1998 | Smith |
| 5,587,699 A | 12/1996 | Faloon et al. | 5,748,172 A | 5/1998 | Song et al. |
| 5,593,221 A | 1/1997 | Evanicky et al. | 5,748,287 A | 5/1998 | Takahashi et al. |
| 5,594,222 A | 1/1997 | Caldwell | 5,751,211 A | 5/1998 | Shirai et al. |
| 5,594,560 A | 1/1997 | Jelley et al. | 5,751,246 A | 5/1998 | Hertel |
| 5,594,615 A | 1/1997 | Spijkerman et al. | 5,751,390 A | 5/1998 | Crawford et al. |
| 5,602,542 A | 2/1997 | Widmann et al. | 5,751,489 A | 5/1998 | Caskey et al. |
| 5,602,670 A | 2/1997 | Keegan | 5,754,099 A | 5/1998 | Nishimura et al. |
| 5,603,104 A | 2/1997 | Phelps, III et al. | D394,833 S | 6/1998 | Muth |
| 5,608,550 A | 3/1997 | Epstein et al. | 5,760,828 A | 6/1998 | Cortes |
| 5,609,652 A | 3/1997 | Yamada et al. | 5,760,931 A | 6/1998 | Saburi et al. |
| 5,610,380 A | 3/1997 | Nicolaisen | 5,760,962 A | 6/1998 | Schofield et al. |
| 5,610,756 A | 3/1997 | Lynam et al. | 5,761,094 A | 6/1998 | Olson et al. |
| 5,611,966 A | 3/1997 | Varaprasad et al. | 5,762,823 A | 6/1998 | Hikmet |
| 5,614,885 A | 3/1997 | Van Lente et al. | 5,764,139 A | 6/1998 | Nojima et al. |
| 5,615,023 A | 3/1997 | Yang | 5,765,940 A | 6/1998 | Levy et al. |
| 5,615,857 A | 4/1997 | Hook | 5,767,793 A | 6/1998 | Agravante et al. |
| 5,617,085 A | 4/1997 | Tsutsumi et al. | 5,768,020 A | 6/1998 | Nagao |
| 5,619,374 A | 4/1997 | Roberts | 5,775,762 A | 7/1998 | Vitito |
| 5,619,375 A | 4/1997 | Roberts | 5,777,779 A | 7/1998 | Hashimoto et al. |
| 5,621,571 A | 4/1997 | Bantli et al. | 5,780,160 A | 7/1998 | Allemand et al. |
| 5,626,800 A | 5/1997 | Williams et al. | 5,786,772 A | 7/1998 | Schofield et al. |
| 5,631,089 A | 5/1997 | Center, Jr. et al. | 5,788,357 A | 8/1998 | Muth et al. |
| 5,631,638 A | 5/1997 | Kaspar et al. | 5,790,298 A | 8/1998 | Tonar |
| 5,631,639 A | 5/1997 | Hibino et al. | 5,790,502 A | 8/1998 | Horinouchi et al. |
| 5,632,092 A | 5/1997 | Blank et al. | 5,790,973 A | 8/1998 | Blaker et al. |
| 5,632,551 A | 5/1997 | Roney et al. | 5,793,308 A | 8/1998 | Rosinski et al. |
| 5,634,709 A | 6/1997 | Iwama | 5,793,420 A | 8/1998 | Schmidt |
| 5,640,216 A | 6/1997 | Hasegawa et al. | 5,796,094 A | 8/1998 | Schofield et al. |
| 5,642,238 A | 6/1997 | Sala | 5,796,176 A | 8/1998 | Kramer et al. |
| 5,644,851 A | 7/1997 | Blank et al. | 5,798,057 A | 8/1998 | Hikmet |
| 5,646,614 A | 7/1997 | Abersfelder et al. | 5,798,575 A | 8/1998 | O'Farrell et al. |
| 5,649,756 A | 7/1997 | Adams et al. | 5,798,688 A | 8/1998 | Schofield |
| 5,649,758 A | 7/1997 | Dion | 5,800,918 A | 9/1998 | Chartier et al. |
| 5,650,765 A | 7/1997 | Park | 5,802,727 A | 9/1998 | Blank et al. |
| 5,650,929 A | 7/1997 | Potter et al. | 5,803,579 A | 9/1998 | Turnbull et al. |
| 5,661,455 A | 8/1997 | Van Lente et al. | 5,805,330 A | 9/1998 | Byker et al. |
| 5,661,651 A | 8/1997 | Geschke et al. | 5,805,367 A | 9/1998 | Kanazawa |
| 5,661,804 A | 8/1997 | Dykema et al. | 5,806,879 A | 9/1998 | Hamada et al. |
| 5,662,375 A | 9/1997 | Adams et al. | 5,806,965 A | 9/1998 | Deese |
| 5,666,157 A | 9/1997 | Aviv | 5,808,197 A | 9/1998 | Dao |
| 5,667,289 A | 9/1997 | Akahane et al. | 5,808,566 A | 9/1998 | Behr et al. |
| 5,668,663 A | 9/1997 | Varaprasad et al. | 5,808,589 A | 9/1998 | Fergason |
| 5,668,675 A | 9/1997 | Fredricks | 5,808,713 A | 9/1998 | Broer et al. |
| 5,669,698 A | 9/1997 | Veldman et al. | 5,808,777 A | 9/1998 | Lynam et al. |
| 5,669,699 A | 9/1997 | Pastrick et al. | 5,808,778 A | 9/1998 | Bauer et al. |
| 5,669,704 A | 9/1997 | Pastrick | 5,812,321 A | 9/1998 | Schierbeek et al. |
| 5,669,705 A | 9/1997 | Pastrick et al. | 5,813,745 A | 9/1998 | Fant, Jr. et al. |
| 5,670,935 A | 9/1997 | Schofield et al. | 5,818,625 A | 10/1998 | Forgette et al. |
| 5,671,996 A | 9/1997 | Bos et al. | 5,820,097 A | 10/1998 | Spooner |
| 5,673,994 A | 10/1997 | Fant, Jr. et al. | 5,820,245 A | 10/1998 | Desmond et al. |
| 5,673,999 A | 10/1997 | Koenck | 5,822,023 A | 10/1998 | Suman et al. |
| 5,677,598 A | 10/1997 | De Hair et al. | 5,823,654 A | 10/1998 | Pastrick et al. |
| 5,679,283 A | 10/1997 | Tonar et al. | 5,825,527 A | 10/1998 | Forgette et al. |
| 5,680,123 A | 10/1997 | Lee | 5,835,166 A | 11/1998 | Hall et al. |
| 5,680,245 A | 10/1997 | Lynam | 5,837,994 A | 11/1998 | Stam et al. |
| 5,680,263 A | 10/1997 | Zimmermann et al. | 5,844,505 A | 12/1998 | Van Ryzin |
| 5,686,975 A | 11/1997 | Lipton | 5,848,373 A | 12/1998 | DeLorme et al. |
| 5,686,979 A | 11/1997 | Weber et al. | 5,850,176 A | 12/1998 | Kinoshita et al. |
| 5,689,241 A | 11/1997 | Clarke, Sr. et al. | 5,850,205 A | 12/1998 | Blouin |
| 5,689,370 A | 11/1997 | Tonar et al. | 5,863,116 A | 1/1999 | Pastrick et al. |
| 5,691,848 A | 11/1997 | Van Lente et al. | 5,864,419 A | 1/1999 | Lynam |
| 5,692,819 A | 12/1997 | Mitsutake et al. | 5,867,801 A | 2/1999 | Denny |
| 5,696,529 A | 12/1997 | Evanicky et al. | 5,871,275 A | 2/1999 | O'Farrell et al. |
| 5,696,567 A | 12/1997 | Wada et al. | 5,871,843 A | 2/1999 | Yoneda et al. |
| 5,699,044 A | 12/1997 | Van Lente et al. | 5,877,707 A | 3/1999 | Kowalick |
| 5,699,188 A | 12/1997 | Gilbert et al. | 5,877,897 A | 3/1999 | Schofield et al. |
| 5,703,568 A | 12/1997 | Hegyi | 5,878,353 A | 3/1999 | ul Azam et al. |
| 5,708,410 A | 1/1998 | Blank et al. | 5,878,370 A | 3/1999 | Olson |
| 5,708,415 A | 1/1998 | Van Lente et al. | 5,879,074 A | 3/1999 | Pastrick |
| 5,708,857 A | 1/1998 | Ishibashi | 5,883,605 A | 3/1999 | Knapp |
| 5,715,093 A | 2/1998 | Schierbeek et al. | 5,883,739 A | 3/1999 | Ashihara et al. |
| 5,724,187 A | 3/1998 | Varaprasad et al. | 5,888,431 A | 3/1999 | Tonar et al. |
| 5,724,316 A | 3/1998 | Brunts | 5,894,196 A | 4/1999 | McDermott |
| 5,729,194 A | 3/1998 | Spears et al. | D409,540 S | 5/1999 | Muth |
| 5,737,226 A | 4/1998 | Olson et al. | 5,899,551 A | 5/1999 | Neijzen et al. |
| 5,741,966 A | 4/1998 | Handfield et al. | 5,899,956 A | 5/1999 | Chan |
| 5,744,227 A | 4/1998 | Bright et al. | 5,904,729 A | 5/1999 | Ruzicka |
| 5,745,050 A | 4/1998 | Nakagawa | 5,910,854 A | 6/1999 | Varaprasad et al. |

| Patent No. | Kind | Date | Inventor |
|---|---|---|---|
| 5,914,815 | A | 6/1999 | Bos |
| 5,917,664 | A | 6/1999 | O'Neill et al. |
| 5,918,180 | A | 6/1999 | Dimino |
| 5,922,176 | A | 7/1999 | Caskey |
| 5,923,027 | A | 7/1999 | Stam et al. |
| 5,923,457 | A | 7/1999 | Byker et al. |
| 5,924,212 | A | 7/1999 | Domanski |
| 5,926,087 | A | 7/1999 | Busch et al. |
| 5,927,792 | A | 7/1999 | Welling et al. |
| 5,928,572 | A | 7/1999 | Tonar et al. |
| 5,929,786 | A | 7/1999 | Schofield et al. |
| 5,935,702 | A | 8/1999 | Macquart et al. |
| 5,936,774 | A | 8/1999 | Street |
| 5,938,320 | A | 8/1999 | Crandall |
| 5,938,321 | A | 8/1999 | Bos et al. |
| 5,938,721 | A | 8/1999 | Dussell et al. |
| 5,940,011 | A | 8/1999 | Agravante et al. |
| 5,940,120 | A | 8/1999 | Frankhouse et al. |
| 5,940,201 | A | 8/1999 | Ash et al. |
| 5,942,895 | A | 8/1999 | Popovic et al. |
| 5,947,586 | A | 9/1999 | Weber |
| 5,949,331 | A | 9/1999 | Schofield et al. |
| 5,949,345 | A | 9/1999 | Beckert et al. |
| 5,949,506 | A | 9/1999 | Jones et al. |
| 5,956,079 | A | 9/1999 | Ridgley |
| 5,956,181 | A | 9/1999 | Lin |
| 5,959,367 | A | 9/1999 | O'Farrell et al. |
| 5,959,555 | A | 9/1999 | Furuta |
| 5,959,577 | A | 9/1999 | Fan et al. |
| 5,963,247 | A | 10/1999 | Banitt |
| 5,963,284 | A | 10/1999 | Jones et al. |
| 5,965,247 | A | 10/1999 | Jonza et al. |
| 5,968,538 | A | 10/1999 | Snyder, Jr. |
| 5,971,552 | A | 10/1999 | O'Farrell et al. |
| 5,973,760 | A | 10/1999 | Dehmlow |
| 5,975,715 | A | 11/1999 | Bauder |
| 5,984,482 | A | 11/1999 | Rumsey et al. |
| 5,986,730 | A | 11/1999 | Hansen et al. |
| 5,990,469 | A | 11/1999 | Bechtel et al. |
| 5,990,625 | A | 11/1999 | Meissner et al. |
| 5,995,180 | A | 11/1999 | Moriwaki et al. |
| 5,998,617 | A | 12/1999 | Srinivasa et al. |
| 5,998,929 | A | 12/1999 | Bechtel et al. |
| 6,000,823 | A | 12/1999 | Desmond et al. |
| 6,001,486 | A | 12/1999 | Varaprasad et al. |
| 6,002,511 | A | 12/1999 | Varaprasad et al. |
| 6,002,983 | A | 12/1999 | Alland et al. |
| 6,005,724 | A | 12/1999 | Todd |
| 6,007,222 | A | 12/1999 | Thau |
| 6,008,486 | A | 12/1999 | Stam et al. |
| 6,008,871 | A | 12/1999 | Okumura |
| 6,009,359 | A | 12/1999 | El-Hakim et al. |
| 6,016,035 | A | 1/2000 | Eberspächer et al. |
| 6,016,215 | A | 1/2000 | Byker |
| 6,019,411 | A | 2/2000 | Carter et al. |
| 6,019,475 | A | 2/2000 | Lynam et al. |
| 6,020,987 | A | 2/2000 | Baumann et al. |
| 6,021,371 | A | 2/2000 | Fultz |
| 6,023,229 | A | 2/2000 | Bugno et al. |
| 6,025,872 | A | 2/2000 | Ozaki et al. |
| 6,028,537 | A | 2/2000 | Suman et al. |
| 6,037,689 | A | 3/2000 | Bingle et al. |
| 6,040,939 | A | 3/2000 | Demiryont et al. |
| 6,042,253 | A | 3/2000 | Fant, Jr. et al. |
| 6,042,934 | A | 3/2000 | Guiselin et al. |
| 6,045,243 | A | 4/2000 | Muth et al. |
| 6,045,643 | A | 4/2000 | Byker et al. |
| 6,046,766 | A | 4/2000 | Sakata |
| 6,046,837 | A | 4/2000 | Yamamoto |
| 6,049,171 | A | 4/2000 | Stam et al. |
| D425,466 | S | 5/2000 | Todd et al. |
| 6,060,989 | A | 5/2000 | Gehlot |
| 6,061,002 | A | 5/2000 | Weber et al. |
| 6,062,920 | A | 5/2000 | Jordan et al. |
| 6,064,508 | A | 5/2000 | Forgette et al. |
| 6,065,840 | A | 5/2000 | Caskey et al. |
| 6,066,920 | A | 5/2000 | Torihara et al. |
| 6,067,111 | A | 5/2000 | Hahn et al. |
| 6,067,500 | A | 5/2000 | Morimoto et al. |
| 6,068,380 | A | 5/2000 | Lynn et al. |
| D426,506 | S | 6/2000 | Todd et al. |
| D426,507 | S | 6/2000 | Todd et al. |
| D427,128 | S | 6/2000 | Mathieu |
| 6,072,391 | A | 6/2000 | Suzukie et al. |
| 6,074,077 | A | 6/2000 | Pastrick et al. |
| 6,074,777 | A | 6/2000 | Reimers et al. |
| 6,076,948 | A | 6/2000 | Bukosky et al. |
| 6,078,355 | A | 6/2000 | Zengel |
| 6,078,865 | A | 6/2000 | Koyanagi |
| D428,372 | S | 7/2000 | Todd et al. |
| D428,373 | S | 7/2000 | Todd et al. |
| 6,082,881 | A | 7/2000 | Hicks |
| 6,084,700 | A | 7/2000 | Knapp et al. |
| 6,086,131 | A | 7/2000 | Bingle et al. |
| 6,086,229 | A | 7/2000 | Pastrick |
| 6,087,012 | A | 7/2000 | Varaprasad et al. |
| 6,087,953 | A | 7/2000 | DeLine et al. |
| 6,091,343 | A | 7/2000 | Dykema et al. |
| 6,093,976 | A | 7/2000 | Kramer et al. |
| 6,094,618 | A | 7/2000 | Harada |
| D428,842 | S | 8/2000 | Todd et al. |
| D429,202 | S | 8/2000 | Todd et al. |
| D430,088 | S | 8/2000 | Todd et al. |
| 6,097,023 | A | 8/2000 | Schofield et al. |
| 6,097,316 | A | 8/2000 | Liaw et al. |
| 6,099,131 | A | 8/2000 | Fletcher et al. |
| 6,099,155 | A | 8/2000 | Pastrick et al. |
| 6,102,546 | A | 8/2000 | Carter |
| 6,102,559 | A | 8/2000 | Nold et al. |
| 6,104,552 | A | 8/2000 | Thau et al. |
| 6,106,121 | A | 8/2000 | Buckley et al. |
| 6,111,498 | A | 8/2000 | Jobes et al. |
| 6,111,683 | A | 8/2000 | Cammenga et al. |
| 6,111,684 | A | 8/2000 | Forgette et al. |
| 6,111,685 | A | 8/2000 | Tench et al. |
| 6,111,696 | A | 8/2000 | Allen et al. |
| 6,115,086 | A | 9/2000 | Rosen |
| 6,115,651 | A | 9/2000 | Cruz |
| 6,116,743 | A | 9/2000 | Hoek |
| 6,118,219 | A | 9/2000 | Okigami et al. |
| 6,122,597 | A | 9/2000 | Saneyoshi et al. |
| 6,122,921 | A | 9/2000 | Brezoczky et al. |
| 6,124,647 | A | 9/2000 | Marcus et al. |
| 6,124,886 | A | 9/2000 | DeLine et al. |
| 6,127,919 | A | 10/2000 | Wylin |
| 6,127,945 | A | 10/2000 | Mura-Smith |
| 6,128,576 | A | 10/2000 | Nishimoto et al. |
| 6,130,421 | A | 10/2000 | Bechtel et al. |
| 6,130,448 | A | 10/2000 | Bauer et al. |
| 6,132,072 | A | 10/2000 | Turnbull et al. |
| 6,137,620 | A | 10/2000 | Guarr et al. |
| 6,139,171 | A | 10/2000 | Waldmann |
| 6,139,172 | A | 10/2000 | Bos et al. |
| 6,140,933 | A | 10/2000 | Bugno et al. |
| 6,142,656 | A | 11/2000 | Kurth |
| 6,146,003 | A | 11/2000 | Thau |
| 6,147,934 | A | 11/2000 | Arikawa et al. |
| 6,148,261 | A | 11/2000 | Obradovich et al. |
| 6,149,287 | A | 11/2000 | Pastrick et al. |
| 6,150,014 | A | 11/2000 | Chu et al. |
| 6,151,065 | A | 11/2000 | Steed et al. |
| 6,151,539 | A | 11/2000 | Bergholz et al. |
| 6,152,551 | A | 11/2000 | Annas |
| 6,152,590 | A | 11/2000 | Furst et al. |
| 6,154,149 | A | 11/2000 | Tyckowski et al. |
| 6,154,306 | A | 11/2000 | Varaprasad et al. |
| 6,157,294 | A | 12/2000 | Urai et al. |
| 6,157,418 | A | 12/2000 | Rosen |
| 6,157,424 | A | 12/2000 | Eichenlaub |
| 6,157,480 | A | 12/2000 | Anderson et al. |
| 6,158,655 | A | 12/2000 | DeVries, Jr. et al. |
| 6,161,865 | A | 12/2000 | Rose et al. |
| 6,164,564 | A | 12/2000 | Franco et al. |
| 6,166,625 | A | 12/2000 | Teowee et al. |
| 6,166,629 | A | 12/2000 | Hamma et al. |
| 6,166,834 | A | 12/2000 | Taketomi et al. |
| 6,166,847 | A | 12/2000 | Tench et al. |
| 6,166,848 | A | 12/2000 | Cammenga et al. |

| | | |
|---|---|---|
| 6,167,255 A | 12/2000 | Kennedy, III et al. |
| 6,167,755 B1 | 1/2001 | Damson et al. |
| 6,169,955 B1 | 1/2001 | Fultz |
| 6,170,956 B1 | 1/2001 | Rumsey et al. |
| 6,172,600 B1 | 1/2001 | Kakinami et al. |
| 6,172,601 B1 | 1/2001 | Wada et al. |
| 6,172,613 B1 | 1/2001 | DeLine et al. |
| 6,173,501 B1 | 1/2001 | Blank et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,178,377 B1 | 1/2001 | Ishihara et al. |
| 6,181,387 B1 | 1/2001 | Rosen |
| 6,182,006 B1 | 1/2001 | Meek |
| 6,183,119 B1 | 2/2001 | Desmond et al. |
| 6,184,679 B1 | 2/2001 | Popovic et al. |
| 6,184,781 B1 | 2/2001 | Ramakesavan |
| 6,185,492 B1 | 2/2001 | Kagawa et al. |
| 6,185,501 B1 | 2/2001 | Smith et al. |
| 6,188,505 B1 | 2/2001 | Lomprey et al. |
| 6,191,704 B1 | 2/2001 | Takenaga et al. |
| 6,193,379 B1 | 2/2001 | Tonar et al. |
| 6,193,912 B1 | 2/2001 | Thieste et al. |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,014 B1 | 3/2001 | Walker et al. |
| 6,199,810 B1 | 3/2001 | Wu et al. |
| 6,200,010 B1 | 3/2001 | Anders |
| 6,201,642 B1 | 3/2001 | Bos |
| 6,206,553 B1 | 3/2001 | Boddy et al. |
| 6,207,083 B1 | 3/2001 | Varaprasad et al. |
| 6,210,008 B1 | 4/2001 | Hoekstra et al. |
| 6,210,012 B1 | 4/2001 | Broer |
| 6,212,470 B1 | 4/2001 | Seymour et al. |
| 6,217,181 B1 | 4/2001 | Lynam et al. |
| 6,218,934 B1 | 4/2001 | Regan |
| 6,222,447 B1 | 4/2001 | Schofield et al. |
| 6,222,460 B1 | 4/2001 | DeLine et al. |
| 6,222,689 B1 | 4/2001 | Higuchi et al. |
| 6,227,689 B1 | 5/2001 | Miller |
| 6,232,937 B1 | 5/2001 | Jacobsen et al. |
| 6,236,514 B1 | 5/2001 | Sato |
| 6,239,851 B1 | 5/2001 | Hatazawa et al. |
| 6,239,898 B1 | 5/2001 | Byker et al. |
| 6,239,899 B1 | 5/2001 | DeVries et al. |
| 6,243,003 B1 * | 6/2001 | DeLine et al. ............... 340/425.5 |
| 6,244,716 B1 | 6/2001 | Steenwyk et al. |
| 6,245,262 B1 | 6/2001 | Varaprasad et al. |
| 6,247,820 B1 | 6/2001 | Van Order |
| 6,249,214 B1 | 6/2001 | Kashiwazaki |
| 6,249,310 B1 | 6/2001 | Lefkowitz |
| 6,249,369 B1 | 6/2001 | Theiste et al. |
| 6,250,148 B1 | 6/2001 | Lynam |
| 6,250,766 B1 | 6/2001 | Strumolo et al. |
| 6,250,783 B1 | 6/2001 | Stidham et al. |
| 6,255,639 B1 | 7/2001 | Stam et al. |
| 6,257,746 B1 | 7/2001 | Todd et al. |
| 6,259,412 B1 | 7/2001 | Duroux |
| 6,259,475 B1 | 7/2001 | Ramachandran et al. |
| 6,260,608 B1 | 7/2001 | Kim |
| 6,262,842 B1 | 7/2001 | Ouderkirk et al. |
| 6,264,353 B1 | 7/2001 | Caraher et al. |
| 6,265,968 B1 | 7/2001 | Betzitza et al. |
| 6,268,803 B1 | 7/2001 | Gunderson et al. |
| 6,268,837 B1 | 7/2001 | Kobayashi et al. |
| 6,269,308 B1 | 7/2001 | Kodaka et al. |
| 6,271,901 B1 | 8/2001 | Ide et al. |
| 6,274,221 B2 | 8/2001 | Smith et al. |
| 6,275,231 B1 | 8/2001 | Obradovich |
| 6,276,821 B1 | 8/2001 | Pastrick et al. |
| 6,276,822 B1 | 8/2001 | Bedrosian et al. |
| 6,277,471 B1 | 8/2001 | Tang |
| 6,278,271 B1 | 8/2001 | Schott |
| 6,278,377 B1 * | 8/2001 | DeLine et al. ............... 340/815.4 |
| 6,278,941 B1 | 8/2001 | Yokoyama |
| 6,280,068 B1 | 8/2001 | Mertens et al. |
| 6,280,069 B1 | 8/2001 | Pastrick et al. |
| 6,281,804 B1 | 8/2001 | Haller et al. |
| 6,286,965 B1 | 9/2001 | Caskey et al. |
| 6,286,984 B1 | 9/2001 | Berg |
| 6,289,332 B2 | 9/2001 | Menig et al. |
| 6,290,378 B1 | 9/2001 | Buchalla et al. |
| 6,291,905 B1 | 9/2001 | Drummond et al. |
| 6,291,906 B1 | 9/2001 | Marcus et al. |
| 6,294,989 B1 | 9/2001 | Schofield et al. |
| 6,296,379 B1 | 10/2001 | Pastrick |
| 6,297,781 B1 | 10/2001 | Turnbull et al. |
| 6,299,333 B1 | 10/2001 | Pastrick et al. |
| 6,300,879 B1 | 10/2001 | Regan et al. |
| 6,301,039 B1 | 10/2001 | Tench |
| 6,304,173 B2 | 10/2001 | Pala et al. |
| 6,305,807 B1 | 10/2001 | Schierbeek |
| 6,310,611 B1 | 10/2001 | Caldwell |
| 6,310,714 B1 | 10/2001 | Lomprey et al. |
| 6,310,738 B1 | 10/2001 | Chu |
| 6,313,454 B1 | 11/2001 | Bos et al. |
| 6,314,295 B1 | 11/2001 | Kawamoto |
| 6,315,440 B1 | 11/2001 | Satoh |
| 6,317,057 B1 | 11/2001 | Lee |
| 6,317,180 B1 | 11/2001 | Kuroiwa et al. |
| 6,317,248 B1 | 11/2001 | Agrawal et al. |
| 6,318,870 B1 | 11/2001 | Spooner et al. |
| 6,320,176 B1 | 11/2001 | Schofield et al. |
| 6,320,282 B1 | 11/2001 | Caldwell |
| 6,320,612 B1 | 11/2001 | Young |
| 6,324,295 B1 | 11/2001 | Valery et al. |
| 6,326,613 B1 * | 12/2001 | Heslin et al. ............... 250/239 |
| 6,326,900 B2 | 12/2001 | DeLine et al. |
| 6,327,925 B1 * | 12/2001 | Gombert et al. ............... 74/110 |
| 6,329,925 B1 | 12/2001 | Skiver et al. |
| 6,330,511 B2 | 12/2001 | Ogura et al. |
| 6,331,066 B1 | 12/2001 | Desmond et al. |
| 6,333,759 B1 | 12/2001 | Mazzilli |
| 6,335,680 B1 | 1/2002 | Matsuoka |
| 6,336,737 B1 | 1/2002 | Thau |
| 6,340,850 B1 | 1/2002 | O'Farrell et al. |
| 6,341,523 B2 | 1/2002 | Lynam |
| 6,344,805 B1 | 2/2002 | Yasui et al. |
| 6,346,698 B1 | 2/2002 | Turnbull |
| 6,347,880 B1 | 2/2002 | Furst et al. |
| 6,348,858 B2 | 2/2002 | Weis et al. |
| 6,351,708 B1 | 2/2002 | Takagi et al. |
| 6,353,392 B1 | 3/2002 | Schofield et al. |
| 6,356,206 B1 | 3/2002 | Takenaga et al. |
| 6,356,376 B1 | 3/2002 | Tonar et al. |
| 6,356,389 B1 | 3/2002 | Nilsen et al. |
| 6,357,883 B1 | 3/2002 | Strumolo et al. |
| 6,362,121 B1 | 3/2002 | Chopin et al. |
| 6,362,548 B1 | 3/2002 | Bingle et al. |
| 6,363,326 B1 | 3/2002 | Scully |
| 6,366,013 B1 | 4/2002 | Leenders et al. |
| 6,366,213 B2 | 4/2002 | DeLine et al. |
| 6,369,701 B1 | 4/2002 | Yoshida et al. |
| 6,370,329 B1 | 4/2002 | Teuchert |
| 6,371,636 B1 | 4/2002 | Wesson |
| 6,379,013 B1 | 4/2002 | Bechtel et al. |
| 6,379,788 B2 | 4/2002 | Choi et al. |
| 6,382,805 B1 | 5/2002 | Miyabukuro |
| 6,385,139 B1 | 5/2002 | Arikawa et al. |
| 6,386,742 B1 | 5/2002 | DeLine et al. |
| 6,390,529 B1 | 5/2002 | Bingle et al. |
| 6,390,626 B2 | 5/2002 | Knox |
| 6,390,635 B2 | 5/2002 | Whitehead et al. |
| 6,396,397 B1 | 5/2002 | Bos et al. |
| 6,396,408 B2 | 5/2002 | Drummond et al. |
| 6,396,637 B2 | 5/2002 | Roest et al. |
| 6,407,468 B1 | 6/2002 | LeVesque et al. |
| 6,407,847 B1 | 6/2002 | Poll et al. |
| 6,408,247 B1 | 6/2002 | Ichikawa et al. |
| 6,411,204 B1 | 6/2002 | Bloomfield et al. |
| 6,412,959 B1 | 7/2002 | Tseng |
| 6,412,973 B1 | 7/2002 | Bos et al. |
| 6,414,910 B1 | 7/2002 | Kaneko et al. |
| 6,415,230 B1 | 7/2002 | Maruko et al. |
| 6,416,208 B2 | 7/2002 | Pastrick et al. |
| 6,417,786 B2 | 7/2002 | Learman et al. |

| | | | | | | |
|---|---|---|---|---|---|---|
| 6,418,376 B1 | 7/2002 | Olson | | 6,560,027 B2 | 5/2003 | Meine |
| 6,419,300 B1 | 7/2002 | Pavao et al. | | 6,566,821 B2 | 5/2003 | Nakatsuka et al. |
| 6,420,036 B1 | 7/2002 | Varaprasad et al. | | 6,567,060 B1 | 5/2003 | Sekiguchi |
| 6,420,800 B1 | 7/2002 | LeVesque et al. | | 6,567,708 B1 | 5/2003 | Bechtel et al. |
| 6,420,975 B1 * | 7/2002 | DeLine et al. ............ 340/815.4 | | 6,568,839 B1 | 5/2003 | Pastrick et al. |
| 6,421,081 B1 | 7/2002 | Markus | | 6,572,233 B1 | 6/2003 | Northman et al. |
| 6,424,272 B1 | 7/2002 | Gutta et al. | | 6,573,957 B1 | 6/2003 | Suzuki |
| 6,424,273 B1 | 7/2002 | Gutta et al. | | 6,573,963 B2 | 6/2003 | Ouderkirk et al. |
| 6,424,786 B1 | 7/2002 | Beeson et al. | | 6,575,582 B2 | 6/2003 | Tenmyo |
| 6,424,892 B1 | 7/2002 | Matsuoka | | 6,575,643 B2 | 6/2003 | Takahashi |
| 6,426,492 B1 | 7/2002 | Bos et al. | | 6,578,989 B2 | 6/2003 | Osumi et al. |
| 6,426,568 B2 | 7/2002 | Turnbull et al. | | 6,580,373 B1 | 6/2003 | Ohashi |
| 6,427,349 B1 | 8/2002 | Blank et al. | | 6,580,479 B1 | 6/2003 | Sekiguchi et al. |
| 6,428,172 B1 * | 8/2002 | Hutzel et al. ................. 359/838 | | 6,580,562 B2 | 6/2003 | Aoki et al. |
| 6,433,676 B2 | 8/2002 | DeLine et al. | | 6,581,007 B2 | 6/2003 | Hasegawa et al. |
| 6,433,680 B1 | 8/2002 | Ho | | 6,583,730 B2 | 6/2003 | Lang et al. |
| 6,433,914 B1 | 8/2002 | Lomprey et al. | | 6,591,192 B2 | 7/2003 | Okamura et al. |
| 6,437,688 B1 | 8/2002 | Kobayashi | | 6,592,230 B2 | 7/2003 | Dupay |
| 6,438,491 B1 | 8/2002 | Farmer | | 6,593,565 B2 | 7/2003 | Heslin et al. |
| 6,439,755 B1 | 8/2002 | Fant, Jr. et al. | | 6,593,984 B2 | 7/2003 | Arakawa et al. |
| 6,441,872 B1 | 8/2002 | Ho | | 6,594,065 B2 | 7/2003 | Byker et al. |
| 6,441,943 B1 | 8/2002 | Roberts et al. | | 6,594,067 B2 | 7/2003 | Poll et al. |
| 6,441,963 B2 | 8/2002 | Murakami et al. | | 6,594,090 B2 | 7/2003 | Kruschwitz et al. |
| 6,441,964 B1 | 8/2002 | Chu et al. | | 6,594,583 B2 | 7/2003 | Ogura et al. |
| 6,445,287 B1 | 9/2002 | Schofield et al. | | 6,594,614 B2 | 7/2003 | Studt et al. |
| 6,447,128 B1 | 9/2002 | Lang et al. | | 6,595,649 B2 | 7/2003 | Hoekstra et al. |
| 6,449,082 B1 | 9/2002 | Agrawal et al. | | 6,597,489 B1 | 7/2003 | Guarr et al. |
| 6,452,533 B1 | 9/2002 | Yamabuchi et al. | | 6,606,183 B2 | 8/2003 | Ikai et al. |
| 6,452,572 B1 | 9/2002 | Fan et al. | | 6,611,202 B2 | 8/2003 | Schofield et al. |
| 6,456,438 B1 | 9/2002 | Lee et al. | | 6,611,227 B1 | 8/2003 | Nebiyeloul-Kifle et al. |
| 6,462,795 B1 | 10/2002 | Clarke | | 6,611,759 B2 | 8/2003 | Brosche |
| 6,463,369 B2 | 10/2002 | Sadano et al. | | 6,612,723 B2 | 9/2003 | Futhey et al. |
| 6,466,701 B1 | 10/2002 | Ejiri et al. | | 6,614,387 B1 | 9/2003 | Deadman |
| 6,471,362 B1 | 10/2002 | Carter et al. | | 6,614,419 B1 | 9/2003 | May |
| 6,472,977 B1 | 10/2002 | Pochmuller | | 6,614,579 B2 | 9/2003 | Roberts et al. |
| 6,472,979 B2 | 10/2002 | Schofield et al. | | 6,615,438 B1 | 9/2003 | Franco et al. |
| 6,473,001 B1 | 10/2002 | Blum | | 6,616,313 B2 | 9/2003 | Fürst et al. |
| 6,474,853 B2 | 11/2002 | Pastrick et al. | | 6,616,764 B2 | 9/2003 | Krämer et al. |
| 6,476,731 B1 | 11/2002 | Miki et al. | | 6,618,672 B2 | 9/2003 | Sasaki et al. |
| 6,476,855 B1 | 11/2002 | Yamamoto | | 6,621,616 B1 | 9/2003 | Bauer et al. |
| 6,477,460 B2 | 11/2002 | Kepler | | 6,624,936 B2 | 9/2003 | Kotchick et al. |
| 6,477,464 B2 | 11/2002 | McCarthy et al. | | 6,627,918 B2 | 9/2003 | Getz et al. |
| 6,483,429 B1 | 11/2002 | Yasui et al. | | 6,630,888 B2 | 10/2003 | Lang et al. |
| 6,483,438 B1 | 11/2002 | DeLine et al. | | 6,636,190 B2 | 10/2003 | Hirakata et al. |
| 6,483,613 B1 | 11/2002 | Woodgate et al. | | 6,636,258 B2 | 10/2003 | Strumolo |
| 6,487,500 B2 | 11/2002 | Lemelson et al. | | 6,638,582 B1 | 10/2003 | Uchiyama et al. |
| 6,494,602 B2 | 12/2002 | Pastrick et al. | | 6,639,360 B2 | 10/2003 | Roberts et al. |
| 6,498,620 B2 | 12/2002 | Schofield et al. | | 6,642,840 B2 | 11/2003 | Lang et al. |
| 6,501,387 B2 | 12/2002 | Skiver et al. | | 6,642,851 B2 | 11/2003 | DeLine et al. |
| 6,512,203 B2 | 1/2003 | Jones et al. | | 6,646,697 B1 | 11/2003 | Sekiguchi et al. |
| 6,512,624 B2 | 1/2003 | Tonar et al. | | 6,648,477 B2 | 11/2003 | Hutzel et al. |
| 6,513,252 B1 | 2/2003 | Schierbeek et al. | | 6,650,457 B2 | 11/2003 | Busscher et al. |
| 6,515,378 B1 | 2/2003 | Drummond et al. | | 6,657,607 B1 | 12/2003 | Evanicky et al. |
| 6,515,581 B1 | 2/2003 | Ho | | 6,661,482 B2 | 12/2003 | Hara |
| 6,515,582 B1 | 2/2003 | Teowee | | 6,661,830 B1 | 12/2003 | Reed et al. |
| 6,515,597 B1 | 2/2003 | Wada et al. | | 6,663,262 B2 | 12/2003 | Boyd et al. |
| 6,516,664 B2 | 2/2003 | Lynam | | 6,665,592 B2 | 12/2003 | Kodama |
| 6,518,691 B1 | 2/2003 | Baba | | 6,667,726 B1 | 12/2003 | Damiani et al. |
| 6,519,209 B1 | 2/2003 | Arikawa et al. | | 6,669,109 B2 | 12/2003 | Ivanov et al. |
| 6,520,667 B1 | 2/2003 | Mousseau | | 6,669,285 B1 | 12/2003 | Park et al. |
| 6,522,451 B1 | 2/2003 | Lynam | | 6,670,207 B1 | 12/2003 | Roberts |
| 6,522,969 B2 | 2/2003 | Kannonji | | 6,670,910 B2 | 12/2003 | Delcheccolo et al. |
| 6,525,707 B1 | 2/2003 | Kaneko et al. | | 6,670,935 B2 | 12/2003 | Yeon et al. |
| 6,534,884 B2 | 3/2003 | Marcus et al. | | 6,670,941 B2 | 12/2003 | Albu et al. |
| 6,538,709 B1 | 3/2003 | Kurihara et al. | | 6,671,080 B2 | 12/2003 | Poll et al. |
| 6,539,306 B2 | 3/2003 | Turnbull et al. | | 6,672,731 B2 | 1/2004 | Schnell et al. |
| 6,542,085 B1 | 4/2003 | Yang | | 6,672,734 B2 | 1/2004 | Lammers |
| 6,542,182 B1 | 4/2003 | Chutorash | | 6,672,744 B2 | 1/2004 | DeLine et al. |
| 6,543,163 B1 | 4/2003 | Ginsberg | | 6,672,745 B1 | 1/2004 | Bauer et al. |
| 6,545,598 B1 | 4/2003 | de Villeroche | | 6,674,370 B2 | 1/2004 | Rodewald et al. |
| 6,549,253 B1 | 4/2003 | Robbie et al. | | 6,675,075 B1 | 1/2004 | Engelsberg et al. |
| 6,549,335 B1 | 4/2003 | Trapani et al. | | 6,678,083 B1 | 1/2004 | Anstee |
| 6,550,949 B1 | 4/2003 | Bauer et al. | | 6,678,614 B2 | 1/2004 | McCarthy et al. |
| 6,552,326 B2 | 4/2003 | Turnbull | | 6,679,608 B2 | 1/2004 | Bechtel et al. |
| 6,552,653 B2 | 4/2003 | Nakaho et al. | | 6,683,539 B2 | 1/2004 | Trajkovic et al. |
| 6,553,308 B1 | 4/2003 | Uhlmann et al. | | 6,683,969 B1 | 1/2004 | Nishigaki et al. |
| 6,559,761 B1 | 5/2003 | Miller et al. | | 6,685,348 B2 | 2/2004 | Pastrick et al. |
| 6,559,902 B1 | 5/2003 | Kusuda et al. | | 6,690,262 B1 | 2/2004 | Winnett |
| 6,560,004 B2 | 5/2003 | Theiste et al. | | 6,690,268 B2 | 2/2004 | Schofield et al. |

| | | |
|---|---|---|
| 6,690,413 B1 | 2/2004 | Moore |
| 6,690,438 B2 | 2/2004 | Sekiguchi |
| 6,693,517 B2 | 2/2004 | McCarthy et al. |
| 6,693,518 B2 | 2/2004 | Kumata et al. |
| 6,693,519 B2 | 2/2004 | Keirstead |
| 6,693,524 B1 | 2/2004 | Payne |
| 6,700,692 B2 | 3/2004 | Tonar et al. |
| 6,704,434 B1 | 3/2004 | Sakoh et al. |
| 6,709,136 B2 | 3/2004 | Pastrick et al. |
| 6,713,783 B1 | 3/2004 | Mase et al. |
| 6,717,109 B1 | 4/2004 | Macher et al. |
| 6,717,610 B1 | 4/2004 | Bos et al. |
| 6,717,712 B2 | 4/2004 | Lynam et al. |
| 6,719,215 B2 | 4/2004 | Drouillard |
| 6,724,446 B2 | 4/2004 | Motomura et al. |
| 6,726,337 B2 | 4/2004 | Whitehead et al. |
| 6,727,807 B2 | 4/2004 | Trajkovic et al. |
| 6,727,808 B1 | 4/2004 | Uselmann et al. |
| 6,727,844 B1 | 4/2004 | Zimmermann et al. |
| 6,731,332 B1 | 5/2004 | Yasui et al. |
| 6,734,807 B2 | 5/2004 | King |
| 6,736,526 B2 | 5/2004 | Matsuba et al. |
| 6,737,629 B2 | 5/2004 | Nixon et al. |
| 6,737,630 B2 | 5/2004 | Turnbull |
| 6,737,964 B2 | 5/2004 | Samman et al. |
| 6,738,088 B1 | 5/2004 | Uskolovsky et al. |
| 6,742,904 B2 | 6/2004 | Bechtel et al. |
| 6,744,353 B2 | 6/2004 | Sjönell |
| 6,746,775 B1 | 6/2004 | Boire et al. |
| 6,747,716 B2 | 6/2004 | Kuroiwa et al. |
| 6,748,211 B1 | 6/2004 | Isaac et al. |
| 6,749,308 B1 | 6/2004 | Niendorf et al. |
| 6,755,542 B2 | 6/2004 | Bechtel et al. |
| 6,756,912 B2 | 6/2004 | Skiver et al. |
| 6,757,039 B2 | 6/2004 | Ma |
| 6,757,109 B2 | 6/2004 | Bos |
| D493,131 S | 7/2004 | Lawlor et al. |
| D493,394 S | 7/2004 | Lawlor et al. |
| 6,759,113 B1 | 7/2004 | Tang |
| 6,759,945 B2 | 7/2004 | Richard |
| 6,760,157 B1 | 7/2004 | Allen et al. |
| 6,765,480 B2 | 7/2004 | Tseng |
| 6,773,116 B2 | 8/2004 | De Vaan et al. |
| 6,774,356 B2 | 8/2004 | Heslin et al. |
| 6,774,810 B2 | 8/2004 | DeLine et al. |
| 6,778,904 B2 | 8/2004 | Iwami et al. |
| 6,779,900 B1 | 8/2004 | Nolan-Brown |
| 6,781,738 B2 | 8/2004 | Kikuchi et al. |
| 6,782,718 B2 | 8/2004 | Lingle et al. |
| 6,784,129 B2 | 8/2004 | Seto et al. |
| 6,797,396 B1 | 9/2004 | Liu et al. |
| 6,800,871 B2 | 10/2004 | Matsuda et al. |
| 6,801,127 B2 | 10/2004 | Mizusawa et al. |
| 6,801,244 B2 | 10/2004 | Takeda et al. |
| 6,801,283 B2 | 10/2004 | Koyama et al. |
| 6,805,474 B2 | 10/2004 | Walser et al. |
| 6,806,452 B2 | 10/2004 | Bos et al. |
| 6,806,922 B2 | 10/2004 | Ishitaka |
| 6,810,323 B1 | 10/2004 | Bullock et al. |
| 6,812,463 B2 | 11/2004 | Okada |
| 6,812,907 B1 | 11/2004 | Gennetten et al. |
| 6,819,231 B2 | 11/2004 | Berberich et al. |
| 6,823,261 B2 | 11/2004 | Sekiguchi |
| 6,824,281 B2 | 11/2004 | Schofield et al. |
| 6,831,268 B2 | 12/2004 | Bechtel et al. |
| 6,832,848 B2 | 12/2004 | Pastrick |
| 6,834,969 B2 | 12/2004 | Bade et al. |
| 6,836,725 B2 | 12/2004 | Millington et al. |
| 6,838,980 B2 | 1/2005 | Gloger et al. |
| 6,842,189 B2 | 1/2005 | Park |
| 6,842,276 B2 | 1/2005 | Poll et al. |
| 6,845,805 B1 | 1/2005 | Köster |
| 6,846,098 B2 | 1/2005 | Bourdelais et al. |
| 6,847,424 B2 | 1/2005 | Gotoh et al. |
| 6,847,487 B2 | 1/2005 | Burgner |
| 6,848,817 B2 | 2/2005 | Bos et al. |
| 6,849,165 B2 | 2/2005 | Klöppel et al. |
| 6,853,491 B1 | 2/2005 | Ruhle et al. |
| 6,859,148 B2 | 2/2005 | Miller et al. |
| 6,861,789 B2 | 3/2005 | Wei |
| 6,870,655 B1 | 3/2005 | Northman et al. |
| 6,870,656 B2 | 3/2005 | Tonar et al. |
| 6,871,982 B2 | 3/2005 | Holman et al. |
| 6,877,888 B2 | 4/2005 | DeLine et al. |
| 6,882,287 B2 | 4/2005 | Schofield |
| 6,889,064 B2 | 5/2005 | Baratono et al. |
| 6,891,563 B2 | 5/2005 | Schofield et al. |
| 6,891,677 B2 | 5/2005 | Nilsen et al. |
| 6,898,518 B2 | 5/2005 | Padmanabhan |
| 6,902,284 B2 | 6/2005 | Hutzel et al. |
| 6,904,348 B2 | 6/2005 | Drummond et al. |
| 6,906,620 B2 | 6/2005 | Nakai et al. |
| 6,906,632 B2 | 6/2005 | DeLine et al. |
| 6,909,486 B2 | 6/2005 | Wang et al. |
| 6,910,779 B2 | 6/2005 | Abel et al. |
| 6,912,001 B2 | 6/2005 | Okamoto et al. |
| 6,912,396 B2 | 6/2005 | Sziraki et al. |
| 6,914,521 B2 | 7/2005 | Rothkop |
| 6,916,099 B2 | 7/2005 | Su et al. |
| 6,917,404 B2 | 7/2005 | Baek |
| 6,918,674 B2 | 7/2005 | Drummond et al. |
| 6,922,902 B2 | 8/2005 | Schierbeek et al. |
| 6,923,080 B1 | 8/2005 | Dobler et al. |
| 6,928,180 B2 | 8/2005 | Stam et al. |
| 6,928,366 B2 | 8/2005 | Ockerse et al. |
| 6,930,737 B2 | 8/2005 | Weindorf et al. |
| 6,933,837 B2 | 8/2005 | Gunderson et al. |
| 6,934,067 B2 | 8/2005 | Ash et al. |
| 6,940,423 B2 | 9/2005 | Takagi et al. |
| 6,946,978 B2 | 9/2005 | Schofield |
| 6,947,576 B2 | 9/2005 | Stam et al. |
| 6,947,577 B2 | 9/2005 | Stam et al. |
| 6,949,772 B2 | 9/2005 | Shimizu et al. |
| 6,950,035 B2 | 9/2005 | Tanaka et al. |
| 6,951,410 B2 | 10/2005 | Parsons |
| 6,951,681 B2 | 10/2005 | Hartley et al. |
| 6,952,312 B2 | 10/2005 | Weber et al. |
| 6,958,495 B2 | 10/2005 | Nishijima et al. |
| 6,958,683 B2 | 10/2005 | Mills et al. |
| 6,959,994 B2 | 11/2005 | Fujikawa et al. |
| 6,961,178 B2 | 11/2005 | Sugino et al. |
| 6,961,661 B2 | 11/2005 | Sekiguchi |
| 6,963,438 B2 | 11/2005 | Busscher et al. |
| 6,968,273 B2 | 11/2005 | Ockerse et al. |
| 6,971,181 B2 | 12/2005 | Ohm et al. |
| 6,972,888 B2 | 12/2005 | Poll et al. |
| 6,974,236 B2 | 12/2005 | Tenmyo |
| 6,975,215 B2 | 12/2005 | Schofield et al. |
| 6,977,702 B2 | 12/2005 | Wu |
| 6,980,092 B2 | 12/2005 | Turnbull et al. |
| 6,985,291 B2 | 1/2006 | Watson et al. |
| 6,989,736 B2 | 1/2006 | Berberich et al. |
| 6,992,573 B2 | 1/2006 | Blank et al. |
| 6,992,718 B1 | 1/2006 | Takahara |
| 6,992,826 B2 | 1/2006 | Wang |
| 6,995,687 B2 | 2/2006 | Lang et al. |
| 6,997,571 B2 | 2/2006 | Tenmyo |
| 7,001,058 B2 | 2/2006 | Inditsky |
| 7,004,592 B2 | 2/2006 | Varaprasad et al. |
| 7,004,593 B2 | 2/2006 | Weller et al. |
| 7,005,974 B2 | 2/2006 | McMahon et al. |
| 7,006,173 B1 | 2/2006 | Hiyama et al. |
| 7,008,090 B2 | 3/2006 | Blank |
| 7,009,751 B2 | 3/2006 | Tonar et al. |
| 7,012,543 B2 | 3/2006 | DeLine et al. |
| 7,012,727 B2 | 3/2006 | Hutzel et al. |
| 7,023,331 B2 | 4/2006 | Kodama |
| 7,029,156 B2 | 4/2006 | Suehiro et al. |
| 7,030,738 B2 | 4/2006 | Ishii |
| 7,030,775 B2 | 4/2006 | Sekiguchi |
| 7,038,577 B2 | 5/2006 | Pawlicki et al. |
| 7,041,965 B2 | 5/2006 | Heslin et al. |
| 7,042,616 B2 | 5/2006 | Tonar et al. |
| 7,046,418 B2 | 5/2006 | Lin et al. |
| 7,046,448 B2 | 5/2006 | Burgner |
| 7,050,908 B1 | 5/2006 | Schwartz et al. |
| 7,057,505 B2 | 6/2006 | Iwamoto |
| 7,057,681 B2 | 6/2006 | Hinata et al. |

| | | | | | | |
|---|---|---|---|---|---|---|
| 7,063,893 B2 | 6/2006 | Hoffman | | 7,290,919 B2 | 11/2007 | Pan et al. |
| 7,064,882 B2 | 6/2006 | Tonar et al. | | 7,292,208 B1 | 11/2007 | Park et al. |
| 7,068,289 B2 | 6/2006 | Satoh et al. | | 7,292,918 B2 | 11/2007 | Silvester |
| 7,074,486 B2 | 7/2006 | Boire et al. | | 7,300,183 B2 | 11/2007 | Kiyomoto et al. |
| 7,081,810 B2 | 7/2006 | Henderson et al. | | 7,302,344 B2 | 11/2007 | Olney et al. |
| 7,085,633 B2 | 8/2006 | Nishira et al. | | 7,304,661 B2 | 12/2007 | Ishikura |
| 7,092,052 B2 | 8/2006 | Okamoto et al. | | 7,308,341 B2 | 12/2007 | Schofield et al. |
| 7,095,432 B2 | 8/2006 | Nakayama et al. | | 7,310,177 B2 | 12/2007 | McCabe et al. |
| 7,095,567 B2 | 8/2006 | Troxell et al. | | 7,311,428 B2 | 12/2007 | DeLine et al. |
| 7,106,213 B2 | 9/2006 | White | | 7,316,485 B2 | 1/2008 | Roose |
| 7,106,392 B2 | 9/2006 | You | | 7,317,386 B2 | 1/2008 | Lengning et al. |
| 7,108,409 B2 | 9/2006 | DeLine et al. | | 7,318,664 B2 | 1/2008 | Hatanaka et al. |
| 7,110,021 B2 | 9/2006 | Nobori et al. | | 7,323,819 B2 | 1/2008 | Hong et al. |
| 7,114,554 B2 | 10/2006 | Bergman et al. | | 7,324,043 B2 | 1/2008 | Purden et al. |
| 7,121,028 B2 | 10/2006 | Shoen et al. | | 7,324,172 B2 | 1/2008 | Yamazaki et al. |
| 7,125,131 B2 | 10/2006 | Olczak | | 7,324,174 B2 | 1/2008 | Hafuka et al. |
| 7,130,727 B2 | 10/2006 | Liu et al. | | 7,324,261 B2 | 1/2008 | Tonar et al. |
| 7,132,064 B2 | 11/2006 | Li et al. | | 7,327,225 B2 | 2/2008 | Nicholas et al. |
| 7,136,091 B2 | 11/2006 | Ichikawa et al. | | 7,327,226 B2 | 2/2008 | Turnbull et al. |
| 7,138,974 B2 | 11/2006 | Hirakata et al. | | 7,327,855 B1 | 2/2008 | Chen |
| 7,149,613 B2 | 12/2006 | Stam et al. | | 7,328,103 B2 | 2/2008 | McCarthy et al. |
| 7,150,552 B2 | 12/2006 | Weidel | | 7,329,013 B2 | 2/2008 | Blank et al. |
| 7,151,515 B2 | 12/2006 | Kim et al. | | 7,329,850 B2 | 2/2008 | Drummond et al. |
| 7,151,997 B2 | 12/2006 | Uhlmann et al. | | 7,331,415 B2 | 2/2008 | Hawes et al. |
| 7,153,588 B2 | 12/2006 | McMan et al. | | 7,338,177 B2 | 3/2008 | Lynam |
| 7,154,657 B2 | 12/2006 | Poll et al. | | 7,342,707 B2 | 3/2008 | Roberts et al. |
| 7,158,881 B2 | 1/2007 | McCarthy et al. | | 7,344,284 B2 | 3/2008 | Lynam et al. |
| 7,160,017 B2 | 1/2007 | Lee et al. | | 7,349,143 B2 | 3/2008 | Tonar et al. |
| 7,161,567 B2 | 1/2007 | Homma et al. | | 7,349,144 B2 | 3/2008 | Varaprasad et al. |
| 7,167,796 B2 | 1/2007 | Taylor et al. | | 7,349,582 B2 | 3/2008 | Takeda et al. |
| 7,168,830 B2 | 1/2007 | Pastrick et al. | | 7,355,524 B2 | 4/2008 | Schofield |
| 7,175,291 B1 | 2/2007 | Li | | 7,360,932 B2 | 4/2008 | Uken et al. |
| 7,176,790 B2 | 2/2007 | Yamazaki | | 7,362,505 B2 | 4/2008 | Hikmet et al. |
| 7,184,190 B2 | 2/2007 | McCabe et al. | | 7,368,714 B2 | 5/2008 | Remillard et al. |
| 7,185,995 B2 | 3/2007 | Hatanaka et al. | | 7,370,983 B2 | 5/2008 | DeWind et al. |
| 7,187,498 B2 | 3/2007 | Bengoechea et al. | | 7,372,611 B2 | 5/2008 | Tonar et al. |
| 7,188,963 B2 | 3/2007 | Schofield et al. | | 7,375,895 B2 | 5/2008 | Brynielsson |
| 7,193,764 B2 | 3/2007 | Lin et al. | | 7,379,224 B2 | 5/2008 | Tonar et al. |
| 7,195,381 B2 | 3/2007 | Lynam et al. | | 7,379,225 B2 | 5/2008 | Tonar et al. |
| 7,199,767 B2 | 4/2007 | Spero | | 7,379,243 B2 | 5/2008 | Horsten et al. |
| 7,202,987 B2 | 4/2007 | Varaprasad et al. | | 7,379,814 B2 | 5/2008 | Ockerse et al. |
| 7,206,697 B2 | 4/2007 | Olney et al. | | 7,379,817 B1 | 5/2008 | Tyson et al. |
| 7,209,277 B2 | 4/2007 | Tonar et al. | | 7,380,633 B2 | 6/2008 | Shen et al. |
| 7,215,238 B2 | 5/2007 | Buck et al. | | 7,389,171 B2 | 6/2008 | Rupp |
| 7,215,473 B2 | 5/2007 | Fleming | | 7,391,563 B2 | 6/2008 | McCabe et al. |
| 7,221,363 B2 | 5/2007 | Roberts et al. | | 7,396,147 B2 | 7/2008 | Munro |
| 7,221,365 B1 | 5/2007 | Lévesque et al. | | 7,411,637 B2 | 8/2008 | Weiss |
| 7,224,324 B2 | 5/2007 | Quist et al. | | 7,411,732 B2 | 8/2008 | Kao et al. |
| 7,227,472 B1 | 6/2007 | Roe | | 7,412,328 B2 | 8/2008 | Uhlmann et al. |
| 7,230,523 B2 | 6/2007 | Harter, Jr. et al. | | 7,417,781 B2 | 8/2008 | Tonar et al. |
| 7,232,231 B2 | 6/2007 | Shih | | 7,420,159 B2 | 9/2008 | Heslin et al. |
| 7,232,594 B2 | 6/2007 | Miroshin et al. | | 7,420,756 B2 | 9/2008 | Lynam |
| 7,233,304 B1 | 6/2007 | Aratani et al. | | 7,429,998 B2 | 9/2008 | Kawauchi et al. |
| 7,235,918 B2 | 6/2007 | McCullough et al. | | 7,446,462 B2 | 11/2008 | Lim et al. |
| 7,241,030 B2 | 7/2007 | Mok et al. | | 7,446,650 B2 | 11/2008 | Scholfield et al. |
| 7,241,037 B2 | 7/2007 | Mathieu et al. | | 7,446,924 B2 | 11/2008 | Schofield et al. |
| 7,245,207 B1 | 7/2007 | Dayan et al. | | 7,448,776 B2 | 11/2008 | Tang |
| 7,245,231 B2 | 7/2007 | Kiefer et al. | | 7,452,090 B2 | 11/2008 | Weller et al. |
| 7,245,336 B2 | 7/2007 | Hiyama et al. | | 7,453,057 B2 | 11/2008 | Drummond et al. |
| 7,248,283 B2 | 7/2007 | Takagi et al. | | 7,455,412 B2 | 11/2008 | Rottcher |
| 7,248,305 B2 | 7/2007 | Ootsuta et al. | | 7,460,007 B2 | 12/2008 | Schofield et al. |
| 7,249,860 B2 | 7/2007 | Kulas et al. | | 7,467,883 B2 | 12/2008 | DeLine et al. |
| 7,251,079 B2 | 7/2007 | Capaldo et al. | | 7,468,651 B2 | 12/2008 | DeLine et al. |
| 7,253,723 B2 | 8/2007 | Lindahl et al. | | 7,471,438 B2 | 12/2008 | McCabe et al. |
| 7,255,451 B2 | 8/2007 | McCabe et al. | | 7,474,963 B2 | 1/2009 | Taylor et al. |
| 7,255,465 B2 | 8/2007 | DeLine et al. | | 7,477,439 B2 | 1/2009 | Tonar et al. |
| 7,259,036 B2 | 8/2007 | Borland et al. | | 7,480,149 B2 | 1/2009 | DeWard et al. |
| 7,262,406 B2 | 8/2007 | Heslin et al. | | 7,488,080 B2 | 2/2009 | Skiver et al. |
| 7,262,916 B2 | 8/2007 | Kao et al. | | 7,488,099 B2 | 2/2009 | Fogg et al. |
| 7,265,342 B2 | 9/2007 | Heslin et al. | | 7,489,374 B2 | 2/2009 | Utsumi et al. |
| 7,268,841 B2 | 9/2007 | Kasajima et al. | | 7,490,007 B2 | 2/2009 | Taylor et al. |
| 7,269,327 B2 | 9/2007 | Tang | | 7,490,943 B2 | 2/2009 | Kikuchi et al. |
| 7,269,328 B2 | 9/2007 | Tang | | 7,490,944 B2 | 2/2009 | Blank et al. |
| 7,271,951 B2 | 9/2007 | Weber et al. | | 7,494,231 B2 | 2/2009 | Varaprasad et al. |
| 7,274,501 B2 | 9/2007 | McCabe et al. | | 7,495,719 B2 | 2/2009 | Adachi et al. |
| 7,281,491 B2 | 10/2007 | Iwamaru | | 7,496,439 B2 | 2/2009 | McCormick |
| 7,286,280 B2 | 10/2007 | Whitehead et al. | | 7,502,156 B2 | 3/2009 | Tonar et al. |
| 7,287,868 B2 | 10/2007 | Carter et al. | | 7,505,047 B2 | 3/2009 | Yoshimura |
| 7,289,037 B2 | 10/2007 | Uken et al. | | 7,505,188 B2 | 3/2009 | Niiyama et al. |

| Patent | Date | Inventor |
|---|---|---|
| 7,511,607 B2 | 3/2009 | Hubbard et al. |
| 7,511,872 B2 | 3/2009 | Tonar et al. |
| 7,525,604 B2 | 4/2009 | Xue |
| 7,525,715 B2 | 4/2009 | McCabe et al. |
| 7,526,103 B2 | 4/2009 | Schofield et al. |
| 7,533,998 B2 | 5/2009 | Schofield et al. |
| 7,538,316 B2 | 5/2009 | Heslin et al. |
| 7,540,620 B2 | 6/2009 | Weller et al. |
| 7,541,570 B2 | 6/2009 | Drummond et al. |
| 7,542,193 B2 | 6/2009 | McCabe et al. |
| 7,543,946 B2 | 6/2009 | Ockerse et al. |
| 7,543,947 B2 | 6/2009 | Varaprasad et al. |
| 7,545,429 B2 | 6/2009 | Travis |
| 7,547,467 B2 | 6/2009 | Olson et al. |
| 7,548,291 B2 | 6/2009 | Lee et al. |
| 7,551,354 B2 | 6/2009 | Horsten et al. |
| 7,561,181 B2 | 7/2009 | Schofield et al. |
| 7,562,985 B2 | 7/2009 | Cortenraad et al. |
| 7,567,291 B2 | 7/2009 | Bechtel et al. |
| 7,571,038 B2 | 8/2009 | Butler et al. |
| 7,571,042 B2 | 8/2009 | Taylor et al. |
| 7,572,017 B2 | 8/2009 | Varaprasad et al. |
| 7,572,490 B2 | 8/2009 | Park et al. |
| 7,579,939 B2 | 8/2009 | Schofield et al. |
| 7,579,940 B2 | 8/2009 | Schofield et al. |
| 7,580,795 B2 | 8/2009 | McCarthy et al. |
| 7,581,859 B2 | 9/2009 | Lynam |
| 7,581,867 B2 | 9/2009 | Lee et al. |
| 7,583,184 B2 | 9/2009 | Schofield et al. |
| 7,586,566 B2 | 9/2009 | Nelson et al. |
| 7,586,666 B2 | 9/2009 | McCabe et al. |
| 7,589,883 B2 | 9/2009 | Varaprasad et al. |
| 7,589,893 B2 | 9/2009 | Rottcher |
| 7,600,878 B2 | 10/2009 | Blank et al. |
| 7,605,883 B2 | 10/2009 | Yamaki et al. |
| 7,619,508 B2 | 11/2009 | Lynam et al. |
| 7,623,202 B2 | 11/2009 | Araki et al. |
| 7,626,749 B2 | 12/2009 | Baur et al. |
| 7,629,996 B2 | 12/2009 | Rademacher et al. |
| 7,633,567 B2 | 12/2009 | Yamada et al. |
| 7,636,188 B2 | 12/2009 | Baur et al. |
| 7,636,195 B2 | 12/2009 | Nieuwkerk et al. |
| 7,636,930 B2 | 12/2009 | Chang |
| 7,643,200 B2 | 1/2010 | Varaprasad et al. |
| 7,643,927 B2 | 1/2010 | Hils |
| 7,651,228 B2 | 1/2010 | Skiver et al. |
| 7,658,521 B2 | 2/2010 | DeLine et al. |
| 7,663,798 B2 | 2/2010 | Tonar et al. |
| 7,667,579 B2 | 2/2010 | DeLine et al. |
| 7,670,016 B2 | 3/2010 | Weller et al. |
| 7,688,495 B2 | 3/2010 | Tonar et al. |
| 7,695,174 B2 | 4/2010 | Takayanagi et al. |
| 7,696,964 B2 | 4/2010 | Lankhorst et al. |
| 7,706,046 B2 | 4/2010 | Bauer et al. |
| 7,710,631 B2 | 5/2010 | McCabe et al. |
| 7,711,479 B2 | 5/2010 | Taylor et al. |
| 7,724,434 B2 | 5/2010 | Cross et al. |
| 7,726,822 B2 | 6/2010 | Blank et al. |
| 7,728,276 B2 | 6/2010 | Drummond et al. |
| 7,728,721 B2 | 6/2010 | Schofield et al. |
| 7,728,927 B2 | 6/2010 | Nieuwkerk et al. |
| 7,731,403 B2 | 6/2010 | Lynam et al. |
| 7,734,392 B2 | 6/2010 | Schofield et al. |
| 7,742,864 B2 | 6/2010 | Sekiguchi |
| 7,746,534 B2 | 6/2010 | Tonar et al. |
| 7,771,061 B2 | 8/2010 | Varaprasad et al. |
| 7,787,077 B2 | 8/2010 | Kondoh et al. |
| 7,791,694 B2 | 9/2010 | Molsen et al. |
| 7,795,675 B2 | 9/2010 | Darwish et al. |
| 7,815,326 B2 | 10/2010 | Blank et al. |
| 7,821,697 B2 | 10/2010 | Varaprasad et al. |
| 7,822,543 B2 | 10/2010 | Taylor et al. |
| 7,826,123 B2 | 11/2010 | McCabe et al. |
| 7,830,583 B2 | 11/2010 | Neuman et al. |
| 7,832,882 B2 | 11/2010 | Weller et al. |
| 7,842,154 B2 | 11/2010 | Lynam |
| 7,854,514 B2 | 12/2010 | Conner et al. |
| 7,855,755 B2 | 12/2010 | Weller et al. |
| 7,859,565 B2 | 12/2010 | Schofield et al. |
| 7,859,737 B2 | 12/2010 | McCabe et al. |
| 7,864,398 B2 | 1/2011 | Dozeman et al. |
| 7,864,399 B2 | 1/2011 | McCabe et al. |
| 7,871,169 B2 | 1/2011 | Varaprasad et al. |
| 7,873,593 B2 | 1/2011 | Schofield et al. |
| 7,888,629 B2 | 2/2011 | Heslin et al. |
| 7,898,398 B2 | 3/2011 | DeLine et al. |
| 7,898,719 B2 | 3/2011 | Schofield et al. |
| 7,903,324 B2 | 3/2011 | Kobayashi et al. |
| 7,903,335 B2 | 3/2011 | Nieuwkerk et al. |
| 7,906,756 B2 | 3/2011 | Drummond et al. |
| 7,911,547 B2 | 3/2011 | Brott et al. |
| 7,914,188 B2 | 3/2011 | DeLine et al. |
| 7,916,009 B2 | 3/2011 | Schofield et al. |
| 7,916,380 B2 | 3/2011 | Tonar et al. |
| 7,918,570 B2 | 4/2011 | Weller et al. |
| 7,926,960 B2 | 4/2011 | Skiver et al. |
| 7,937,667 B2 | 5/2011 | Kramer et al. |
| 7,965,336 B2 | 6/2011 | Bingle et al. |
| 7,965,357 B2 | 6/2011 | Van De Witte et al. |
| 7,980,711 B2 | 7/2011 | Takayanagi et al. |
| 7,994,471 B2 | 8/2011 | Heslin et al. |
| 8,000,894 B2 | 8/2011 | Taylor et al. |
| 8,004,768 B2 | 8/2011 | Takayanagi et al. |
| 8,019,505 B2 | 9/2011 | Schofield et al. |
| 8,027,691 B2 | 9/2011 | Bernas et al. |
| 8,031,225 B2 | 10/2011 | Watanabe et al. |
| 8,040,376 B2 | 10/2011 | Yamada et al. |
| 8,044,776 B2 | 10/2011 | Schofield et al. |
| 8,047,667 B2 | 11/2011 | Weller et al. |
| 8,049,640 B2 | 11/2011 | Uken et al. |
| 8,063,753 B2 | 11/2011 | Deline et al. |
| 8,072,318 B2 | 12/2011 | Lynam et al. |
| 8,083,386 B2 | 12/2011 | Lynam |
| 8,094,002 B2 | 1/2012 | Schofield et al. |
| 8,095,260 B1 | 1/2012 | Schofield et al. |
| 8,095,310 B2 | 1/2012 | Taylor et al. |
| 8,100,568 B2 | 1/2012 | Deline et al. |
| 8,106,347 B2 | 1/2012 | Drummond et al. |
| 8,121,787 B2 | 2/2012 | Taylor et al. |
| 8,134,117 B2 | 3/2012 | Heslin et al. |
| 8,144,033 B2 | 3/2012 | Chinomi et al. |
| 8,154,418 B2 | 4/2012 | Hook et al. |
| 8,162,493 B2 | 4/2012 | Skiver et al. |
| 8,164,817 B2 | 4/2012 | Varaprasad et al. |
| 8,169,307 B2 | 5/2012 | Nakamura et al. |
| 8,170,748 B1 | 5/2012 | Schofield et al. |
| 8,177,376 B2 | 5/2012 | Weller et al. |
| 8,179,236 B2 | 5/2012 | Weller et al. |
| 8,179,437 B2 | 5/2012 | Schofield et al. |
| 8,179,586 B2 | 5/2012 | Schofield et al. |
| 8,194,132 B2 | 6/2012 | Dayan et al. |
| 8,194,133 B2 | 6/2012 | De Wind et al. |
| 8,217,887 B2 | 7/2012 | Sangam et al. |
| 8,228,588 B2 | 7/2012 | McCabe et al. |
| 8,237,909 B2 | 8/2012 | Ostreko et al. |
| 8,267,559 B2 | 9/2012 | DeLine et al. |
| 8,271,187 B2 | 9/2012 | Taylor et al. |
| 8,277,059 B2 | 10/2012 | McCabe et al. |
| 8,282,224 B2 | 10/2012 | Anderson et al. |
| 8,282,226 B2 | 10/2012 | Blank et al. |
| 8,282,253 B2 | 10/2012 | Lynam |
| 8,288,711 B2 | 10/2012 | Heslin et al. |
| 8,294,975 B2 | 10/2012 | Varaprasad et al. |
| 8,304,711 B2 | 11/2012 | Drummond et al. |
| 8,308,325 B2 | 11/2012 | Takayanagi et al. |
| 8,309,907 B2 | 11/2012 | Heslin et al. |
| 8,325,028 B2 | 12/2012 | Schofield et al. |
| 8,335,032 B2 | 12/2012 | Mccabe et al. |
| 8,339,526 B2 | 12/2012 | Minikey, Jr. et al. |
| 8,355,853 B2 | 1/2013 | Schofield et al. |
| 8,358,262 B2 | 1/2013 | Degwekar et al. |
| 8,379,289 B2 | 2/2013 | Schofield et al. |
| 8,400,704 B2 | 3/2013 | McCabe et al. |
| 8,427,288 B2 | 4/2013 | Schofield et al. |
| 2001/0020202 A1 | 9/2001 | Obradovich |
| 2001/0026316 A1 | 10/2001 | Senatore |
| 2001/0035853 A1 | 11/2001 | Hoelen et al. |
| 2002/0049535 A1 | 4/2002 | Rigo et al. |

| | | | | | | |
|---|---|---|---|---|---|---|
| 2002/0085155 A1 | 7/2002 | Arikawa | DE | 3248511 A1 | 7/1984 | |
| 2002/0092958 A1 | 7/2002 | Lusk | DE | 3301945 | 7/1984 | |
| 2002/0118321 A1 | 8/2002 | Ge | DE | 3614882 | 11/1987 | |
| 2002/0133144 A1 | 9/2002 | Chan et al. | DE | 3720848 | 1/1989 | |
| 2002/0149727 A1 | 10/2002 | Wang | DE | 9306989.8 U1 | 7/1993 | |
| 2002/0154007 A1 | 10/2002 | Yang | DE | 4329983 | 8/1995 | |
| 2003/0002165 A1 | 1/2003 | Mathias et al. | DE | 4444443 A1 | 6/1996 | |
| 2003/0007261 A1 | 1/2003 | Hutzel et al. | DE | 29703084 U1 | 6/1997 | |
| 2003/0030724 A1 | 2/2003 | Okamoto | DE | 29805142 U1 | 5/1998 | |
| 2003/0069690 A1 | 4/2003 | Correia et al. | DE | 19741896 | 4/1999 | |
| 2003/0090568 A1 | 5/2003 | Pico | DE | 19755008 | 7/1999 | |
| 2003/0090569 A1 | 5/2003 | Poechmueller | DE | 29902344 U1 | 7/1999 | |
| 2003/0098908 A1 | 5/2003 | Misaiji et al. | DE | 19934999 | 2/2001 | |
| 2003/0103142 A1 | 6/2003 | Hitomi et al. | DE | 19943355 | 3/2001 | |
| 2003/0122929 A1 | 7/2003 | Minaudo et al. | DE | 20118868 | 3/2002 | |
| 2003/0133014 A1 | 7/2003 | Mendoza | DE | 10131459 | 1/2003 | |
| 2003/0137586 A1 | 7/2003 | Lewellen | DE | 102005000650 | 7/2006 | |
| 2003/0156193 A1 | 8/2003 | Nakamura | EP | 0299509 A2 | 1/1989 | |
| 2003/0169158 A1 | 9/2003 | Paul, Jr. | EP | 0513476 A1 | 11/1992 | |
| 2003/0179293 A1 | 9/2003 | Oizumi | EP | 0524766 | 1/1993 | |
| 2003/0202096 A1 | 10/2003 | Kim | EP | 0729864 A1 | 12/1995 | |
| 2003/0206256 A1 | 11/2003 | Drain et al. | EP | 0728618 A2 | 8/1996 | |
| 2003/0214576 A1 | 11/2003 | Koga | EP | 0825477 | 2/1998 | |
| 2003/0214584 A1 | 11/2003 | Ross, Jr. | EP | 0830985 | 3/1998 | |
| 2003/0227546 A1 | 12/2003 | Hilborn et al. | EP | 0928723 A2 | 7/1999 | |
| 2004/0004541 A1 | 1/2004 | Hong | EP | 937601 A2 | 8/1999 | |
| 2004/0027695 A1 | 2/2004 | Lin | EP | 1075986 | 2/2001 | |
| 2004/0036768 A1 | 2/2004 | Green | EP | 1097848 A | 5/2001 | |
| 2004/0080404 A1 | 4/2004 | White | EP | 1152285 A2 | 11/2001 | |
| 2004/0239243 A1 | 12/2004 | Roberts et al. | EP | 1193773 | 3/2002 | |
| 2004/0239849 A1 | 12/2004 | Wang | EP | 1256833 | 11/2002 | |
| 2005/0018738 A1 | 1/2005 | Duan et al. | EP | 0899157 | 10/2004 | |
| 2005/0024591 A1 | 2/2005 | Lian et al. | EP | 1315639 | 2/2006 | |
| 2005/0117095 A1 | 6/2005 | Ma | FR | 1021987 A | 2/1953 | |
| 2005/0168995 A1 | 8/2005 | Kittelmann et al. | FR | 1461419 | 12/1966 | |
| 2005/0237440 A1 | 10/2005 | Sugimura et al. | FR | 2585991 | 2/1987 | |
| 2005/0270766 A1 | 12/2005 | Kung et al. | FR | 2672857 A1 | 8/1992 | |
| 2006/0050018 A1 | 3/2006 | Hutzel et al. | FR | 2673499 A1 | 9/1992 | |
| 2006/0061008 A1 | 3/2006 | Karner et al. | FR | 2759045 | 8/1998 | |
| 2006/0076860 A1 | 4/2006 | Hoss | GB | 810010 | 3/1959 | |
| 2006/0139953 A1 | 6/2006 | Chou et al. | GB | 934037 | 8/1963 | |
| 2006/0187378 A1 | 8/2006 | Bong et al. | GB | 1008411 | 10/1965 | |
| 2006/0279522 A1 | 12/2006 | Kurihara | GB | 1136134 | 12/1968 | |
| 2007/0064108 A1 | 3/2007 | Haler | GB | 1553376 | 9/1979 | |
| 2007/0080585 A1 | 4/2007 | Lyu | GB | 2137573 A | 10/1984 | |
| 2007/0086097 A1 | 4/2007 | Motomiya et al. | GB | 2161440 | 1/1986 | |
| 2007/0183037 A1 | 8/2007 | De Boer et al. | GB | 2192370 | 1/1988 | |
| 2007/0262732 A1 | 11/2007 | Shen | GB | 2222991 | 3/1990 | |
| 2008/0042938 A1 | 2/2008 | Cok | GB | 2255539 A | 11/1992 | |
| 2009/0002491 A1 | 1/2009 | Haler | GB | 2351055 A | 12/2000 | |
| 2009/0052003 A1 | 2/2009 | Schofield et al. | GB | 2362494 | 11/2001 | |
| 2009/0096937 A1 | 4/2009 | Bauer et al. | JP | 50-000638 A | 1/1975 | |
| 2009/0201137 A1 | 8/2009 | Weller et al. | JP | 52-146988 | 11/1977 | |
| 2009/0258221 A1 | 10/2009 | Diehl et al. | JP | 55-039843 | 3/1980 | |
| 2009/0262192 A1 | 10/2009 | Schofield et al. | JP | 57-30639 | 2/1982 | |
| 2009/0296190 A1 | 12/2009 | Anderson et al. | JP | 57-102602 | 6/1982 | |
| 2010/0045899 A1 | 2/2010 | Ockerse | JP | 57-208530 | 12/1982 | |
| 2010/0245701 A1 | 9/2010 | Sato et al. | JP | 58-020954 | 2/1983 | |
| 2010/0246017 A1 | 9/2010 | Tonar et al. | JP | 58-030729 | 2/1983 | |
| 2010/0277786 A1 | 11/2010 | Anderson et al. | JP | 58-110334 | 6/1983 | |
| 2010/0289995 A1 | 11/2010 | Hwang et al. | JP | 58-180347 | 10/1983 | |
| 2011/0128137 A1 | 6/2011 | Varaprasad et al. | JP | 58-209635 | 12/1983 | |
| 2011/0166779 A1 | 7/2011 | McCarthy et al. | JP | 59-114139 | 7/1984 | |
| 2011/0166785 A1 | 7/2011 | McCarthy et al. | JP | 60-212730 | 10/1985 | |
| 2012/0050068 A1 | 3/2012 | DeLine et al. | JP | 60-261275 | 12/1985 | |
| 2012/0062744 A1 | 3/2012 | Schofield et al. | JP | 61-127186 | 6/1986 | |
| 2012/0086808 A1 | 4/2012 | Lynam et al. | JP | 61-260217 | 11/1986 | |
| 2012/0182141 A1 | 7/2012 | Peterson et al. | JP | 62-043543 | 2/1987 | |
| 2012/0203550 A1 | 8/2012 | Skiver et al. | JP | 62-075619 | 4/1987 | |
| 2012/0206790 A1 | 8/2012 | Varaprasad et al. | JP | 62-122487 | 6/1987 | |
| 2012/0224066 A1 | 9/2012 | Weller et al. | JP | 62-131232 | 6/1987 | |
| 2012/0224248 A1 | 9/2012 | Schofield et al. | JP | 63-02753 | 1/1988 | |
| 2012/0236152 A1 | 9/2012 | De Wind et al. | JP | 63-085525 | 4/1988 | |
| | | | JP | 63-106730 | 5/1988 | |
| | FOREIGN PATENT DOCUMENTS | | JP | 63-106731 | 5/1988 | |
| DE | 941408 | 4/1956 | JP | 63-274286 | 11/1988 | |
| DE | 944531 | 7/1956 | JP | 64-14700 | 1/1989 | |
| DE | 7323996 | 11/1973 | JP | 01-123587 | 5/1989 | |
| DE | 2808260 | 8/1979 | JP | 01-130578 | 5/1989 | |

| | | |
|---|---|---|
| JP | 02-122844 | 10/1990 |
| JP | 03-028947 | 3/1991 |
| JP | 03-28947 | 3/1991 |
| JP | 03-052097 | 3/1991 |
| JP | 30-061192 | 3/1991 |
| JP | 03-110855 | 5/1991 |
| JP | 03-198026 | 8/1991 |
| JP | 03-243914 | 10/1991 |
| JP | 04-114587 | 4/1992 |
| JP | 04-245886 | 9/1992 |
| JP | 05-080716 | 4/1993 |
| JP | 05-183194 | 7/1993 |
| JP | 05-213113 | 8/1993 |
| JP | 05-257142 | 10/1993 |
| JP | 60-80953 A | 3/1994 |
| JP | 61-07035 A | 4/1994 |
| JP | 62-27318 A | 8/1994 |
| JP | 06-318734 | 11/1994 |
| JP | 07-146467 | 6/1995 |
| JP | 07-175035 | 7/1995 |
| JP | 07-191311 | 7/1995 |
| JP | 07-266928 | 10/1995 |
| JP | 07-267002 | 10/1995 |
| JP | 07-277072 | 10/1995 |
| JP | 07-281150 | 10/1995 |
| JP | 07-281185 | 10/1995 |
| JP | 08-008083 | 1/1996 |
| JP | 08-083581 | 3/1996 |
| JP | 08-216789 | 8/1996 |
| JP | 08-227769 | 9/1996 |
| JP | 09-033886 | 2/1997 |
| JP | 09-260074 | 3/1997 |
| JP | 05-077657 | 7/1997 |
| JP | 09-220976 | 8/1997 |
| JP | 09-230827 | 9/1997 |
| JP | 09-266078 | 10/1997 |
| JP | 09-288262 | 11/1997 |
| JP | 10-076880 | 3/1998 |
| JP | 10-190960 | 7/1998 |
| JP | 10-199480 | 7/1998 |
| JP | 10-206643 | 8/1998 |
| JP | 10-221692 | 8/1998 |
| JP | 10-239659 | 9/1998 |
| JP | 10-276298 | 10/1998 |
| JP | 11-038381 | 2/1999 |
| JP | 11-067485 | 3/1999 |
| JP | 11-078693 | 3/1999 |
| JP | 11-109337 | 4/1999 |
| JP | 11-160539 | 6/1999 |
| JP | 11-212073 | 8/1999 |
| JP | 11-283759 | 10/1999 |
| JP | 11-298058 | 10/1999 |
| JP | 11-305197 | 11/1999 |
| JP | 2000-131681 | 5/2000 |
| JP | 2000-153736 | 6/2000 |
| JP | 2000-159014 | 6/2000 |
| JP | 2000-255321 | 9/2000 |
| JP | 2000-330107 | 11/2000 |
| JP | 2001-083509 | 3/2001 |
| JP | 2001-097116 | 4/2001 |
| JP | 2001-222005 | 8/2001 |
| JP | 2002-072901 | 3/2002 |
| JP | 2002-120649 | 4/2002 |
| JP | 2002-122860 | 4/2002 |
| JP | 2002-162626 | 6/2002 |
| JP | 2002-352611 | 12/2002 |
| JP | 2003-182454 | 3/2003 |
| JP | 2003-267129 | 9/2003 |
| JP | 2004-182156 | 7/2004 |
| JP | 2005-148119 | 6/2005 |
| JP | 2005-280526 | 10/2005 |
| JP | 2005-327600 | 11/2005 |
| JP | 38-46073 | 11/2006 |
| JP | 2008-083657 | 4/2008 |
| KR | 20060038856 | 5/2006 |
| KR | 100663930 | 1/2007 |
| KR | 20090031998 | 3/2009 |
| WO | WO 82/02448 | 7/1982 |
| WO | WO 86/06179 | 10/1986 |
| WO | WO 94/19212 | 9/1994 |
| WO | WO 96/21581 | 7/1996 |
| WO | WO 98/14974 | 4/1998 |
| WO | WO 98/38547 | 9/1998 |
| WO | WO 99/15360 | 4/1999 |
| WO | WO 00/23826 | 4/2000 |
| WO | WO 00/52661 | 9/2000 |
| WO | WO 00/55685 | 9/2000 |
| WO | WO 01/01192 | 1/2001 |
| WO | WO 02/18174 | 3/2002 |
| WO | WO 02/49881 | 6/2002 |
| WO | WO 03/021343 | 3/2003 |
| WO | WO 03/078941 | 9/2003 |

OTHER PUBLICATIONS

Edgar, Julian; Goodbye 12 Volts . . . Hello 42 Volts!; Oct. 5, 1999; Autospeed 50; Issue 50; www.autospeed.co.nz/cms/A_0319/article.html.

Kobe, Gerry; 42 Volts Goes Underhood; Mar. 2000; Automotive Industries; Cahners Publishing Company; www.findarticles.com/p/articles/mi_m3012/is_3_180/ai_61361677.

Jewett, Dale; Aug. 2000; Automotive Industries; Cahners Publishing Company; www.findarticles.com/p/articles/mi_m3012/is_8_180ai_64341779.

National Semiconductor, LM78S40, Universal Switching Regulator Subsystem, National Semiconductor Corporation, Apr. 1996, p. 6.

Dana H. Ballard and Christopher M. Brown, Computer Vision, Prentice-Hall, Englewood Cliffs, New Jersey, 5 pages, 1982.

G. Wang, D. Renshaw, P.B. Denyer and M. Lu, CMOS Video Cameras, article, 1991, 4 pages, University of Edinburgh, UK.

* cited by examiner

DRIVER ASSIST SYSTEM FOR VEHICLE

CROSS REFERENCE TO RELATED APPLICATIONS

The present application is a continuation of U.S. patent application Ser. No. 13/399,347, filed Feb. 17, 2012, now U.S. Pat. No. 8,271,187, which is a continuation of U.S. patent application Ser. No. 13/209,645, filed Aug. 15, 2011, now U.S. Pat. No. 8,121,787, which is a continuation of U.S. patent application Ser. No. 12/908,481, filed Oct. 20, 2010, now U.S. Pat. No. 8,000,894, which is a continuation of U.S. patent application Ser. No. 12/724,895, filed Mar. 16, 2010, now U.S. Pat. No. 7,822,543, which is a continuation of U.S. patent application Ser. No. 12/405,614, filed Mar. 17, 2009, now U.S. Pat. No. 7,711,479, which is a continuation of U.S. patent application Ser. No. 11/935,800, filed Nov. 6, 2007, now U.S. Pat. No. 7,571,042, which is a continuation of U.S. patent application Ser. No. 11/624,381, filed Jan. 18, 2007, now U.S. Pat. No. 7,490,007, which is a continuation of U.S. patent application Ser. No. 10/645,762, filed Aug. 20, 2003, now U.S. Pat. No. 7,167,796, which claims priority of U.S. provisional applications, Ser. No. 60/406,166, filed Aug. 27, 2002; Ser. No. 60/405,392, filed Aug. 23, 2002; and Ser. No. 60/404,906, filed Aug. 21, 2002, and U.S. patent application Ser. No. 10/645,762 is a continuation-in-part of U.S. patent application Ser. No. 10/456,599, filed Jun. 6, 2003, now U.S. Pat. No. 7,004,593, and U.S. patent application Ser. No. 10/645,762 is a continuation-in-part of U.S. patent application Ser. No. 10/287,178, filed Nov. 4, 2002, now U.S. Pat. No. 6,678,614, which is a continuation of U.S. patent application Ser. No. 09/799,414, filed Mar. 5, 2001, now U.S. Pat. No. 6,477,464, which claims priority of U.S. provisional application Ser. No. 60/187,960, filed Mar. 9, 2000, all of which are hereby incorporated herein by reference in their entireties, and U.S. patent application Ser. No. 11/624,381 is a continuation-in-part of U.S. patent application Ser. No. 10/755,915, filed Jan. 13, 2004, now U.S. Pat. No. 7,446,650, which is a continuation of U.S. patent application Ser. No. 09/793,002, filed Feb. 26, 2001, now U.S. Pat. No. 6,690,268, which claims benefit of U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Sep. 21, 2000; Ser. No. 60/218,336, filed Jul. 14, 2000; and Ser. No. 60/186,520, filed Mar. 2, 2000, and U.S. patent application Ser. No. 11/624,381 is a continuation-in-part of U.S. patent application Ser. No. 10/054,633, filed Jan. 22, 2002, now U.S. Pat. No. 7,195,381, which claims priority from and incorporates by reference in their entireties U.S. provisional applications, Ser. No. 60/346,733, filed Jan. 7, 2002; Ser. No. 60/263,680, filed Jan. 23, 2001; Ser. No. 60/271,466, filed Feb. 26, 2001; and Ser. No. 60/315,384, filed Aug. 28, 2001, and which is a continuation-in-part of U.S. patent application Ser. No. 09/793,002, filed Feb. 26, 2001, now U.S. Pat. No. 6,690,268.

FIELD OF THE INVENTION

The present invention relates generally to telematics systems for vehicles and, more particularly, to telematics systems which may provide driving instructions or directions to a driver of a vehicle or which may provide other controls to an accessory or system of the vehicle. The present invention also relates generally to vehicle seating adjustment systems and, more particularly, to vehicle seating adjustment systems with memory adjustment.

BACKGROUND OF THE INVENTION

In-vehicle telematics systems or vehicle-based telematics systems, such as General Motor's ONSTAR®, Daimler's TELEAID™, Ford's RESCU® or the like, are common in vehicles today. Such telematics systems involve a telecommunication link from the vehicle to an operator or a voice input system at a service center or the like external to the vehicle. The driver of the vehicle may connect or communicate with an operator at the service center to request directions to a targeted location. The service center may provide directions to the targeted location based on the known position of the vehicle, which may be given to the service center operator by the driver, or which may be known by the operator via a link to a global positioning system (GPS) of the vehicle.

However, in such concierge-type systems, typically all of the road names, exits to take, and directional headings/directions are given verbally by the service center operator to the driver all together while the driver is driving the vehicle. The driver is then typically expected to remember several directional driving instructions and often has difficulty in remembering the full directions. Although the driver may optionally remain on the line with the service center operator until the driver reaches the intended destination, which may take many minutes, such as ten, fifteen, twenty minutes or more, and/or the driver may call back to the service center for updated directions, these actions increase the cost of the service, since the service center typically charges for such calls.

Therefore, there is a need in the art for a navigation system that overcomes the shortcomings of the prior art.

SUMMARY OF THE INVENTION

The present invention is intended to provide instructions or directions to a driver of a vehicle which are keyed or coded or linked to respective geographic locations, such that the particular instructions are provided in response to the geographic position of the vehicle at least generally corresponding to the particular geographic location associated with the particular instruction. The particular instructions are thus provided to the driver of the vehicle only when the geographic position of the vehicle is at or near the predetermined or preset waypoints or geographic locations corresponding to the respective particular instructions.

According to an aspect of the present invention, a navigation system for a vehicle includes a vehicle-based telematics system, a vehicle-based global positioning system and a control. The telematics system is operable to receive a user input and to download directional information from a remote source to the control of the vehicle in response to the user input (often, for instance, in ONSTAR®, the user input may be a request from the driver to the remote source or service center operator for directions to a particular destination) and an initial geographic position of the vehicle, such as typically determined by the vehicle-based global positioning system. The directional information comprises at least two instructions, with each instruction being coded to or associated with or linked to a respective geographic location or waypoint. The control is operable to provide an output corresponding to each of the at least two instructions in response to a then current geographic position of the vehicle. The control is operable to provide each instruction only when the then current geographic position of the vehicle at least generally matches or corresponds to the particular respective geographic location associated with the particular instruction.

For instance, a first instruction is typically downloaded that comprises information as to the initial geographic position and heading of the vehicle (e.g., "You are now heading East on Maple Street. Continue until you reach Oak Road."). A second instruction may then provide information as the vehicle approaches the appropriate turn or intersection or the like to take (e.g., "You are now within two blocks of Oak Road. Prepare to turn Right at Oak Road."). A subsequent instruction may then provide information as to the geographic position of the vehicle after the previous step has been completed (e.g., "You are now heading South on Oak Road. Continue until you reach Elm Street."). The output thus provides separate instructions or steps of the directional information, with each instruction coded to a particular geographic location and provided in response to the then current geographic position of the vehicle.

Also, if the driver of the vehicle does not correctly turn or passes an appropriate turn or the like, the control of the present invention knows this via an input from the in-vehicle or vehicle-based global positioning system. As a consequence, a warning instruction may be communicated to the driver indicating that the directions are not being appropriately followed (e.g., "You have passed Oak Road. Please execute a U-Turn and proceed West on Maple Street to Oak Road and turn Left at Oak Road."). Also, if the driver turns off a given road onto an incorrect road or otherwise strays from the given route, the control may communicate a similar warning or instruction to alert the driver that the vehicle is no longer traveling along the given route (e.g., "You have left Maple Street, but are not on Oak Road. Return to Maple Street and continue East on Maple Street to Oak Road, then turn Right on Oak Road.").

The control is operable to tag or code each of the instructions with a respective geographic location or waypoint (alternately, each of the instructions may be tagged or coded or associated with a respective geographic location or waypoint at the remote source before downloading to the control of the vehicle, without affecting the scope of the present invention). The control is then operable to only display a particular instruction when the geographic location tagged or coded to the particular instruction matches or generally matches the actual, then current geographic position of the vehicle.

The control also receives, preferably continuously, an input from the vehicle-based global positioning system that is indicative of the actual, current geographic position of the vehicle as the vehicle travels along the road, highway or the like. The control is then operable to compare the tagged or coded geographic location (as associated with the respective instructions) with the GPS-derived actual geographic position information. Thus, the control may determine when a particular instruction is appropriate to be displayed and/or communicated to the driver by determining that the GPS-derived actual geographic position of the vehicle is now at or at least close to the geographic location associated with a particular instruction.

The user input may comprise a vocal input from the driver of the vehicle to the remote source or service center, or may comprise a keypad input or the like, without affecting the scope of the present invention. Preferably, the geographic position of the vehicle is provided to the remote source (such as a service center or the like) via the global positioning system of the vehicle and the telematics system of the vehicle.

In one form, the output of the control is provided to the driver as an audible message. In another form, the output of the control is provided to the driver as a visible display. The visible display may comprise a video display element, an alphanumeric or iconistic display element or the like, and may comprise a display on demand type display element, a thin film transistor liquid crystal display element, a multi-pixel display element, and/or a multi-icon display element and/or the like. In another form, a combination of a visible and audible output may be used.

Optionally, the system may include a seat adjustment system that is operable to adjust a seat of the vehicle in response to data received via at least one of the vehicle-based telematics system and the vehicle-based global positioning system. The seat adjustment system may be operable in response to biometric data pertaining to the occupant of the seat of the vehicle.

According to another aspect of the present invention, a method for providing navigational directions to a driver of a vehicle comprises accessing a remote source or service center via a vehicle-based wireless communication system and downloading local information from the remote source to a control of the vehicle via the wireless communication system in response to a user input. The local information comprises at least two driving instructions. Each of the at least two driving instructions is associated with or linked to a respective, particular geographic location. A current geographic position of the vehicle is provided to the control via a vehicle-based global positioning system. Each of the at least two driving instructions is provided by the control to the driver in response to the then current geographic position of the vehicle and only when the current geographic position of the vehicle at least generally matches or corresponds to the particular geographic location electronically associated with or linked to the respective one of the at least two driving instructions.

Preferably, the method includes associating or tagging or coding or linking (such as electronically, digitally or the like) each of the instructions with a respective particular geographic location. The control may tag or code the instructions to be associated with the respective geographic locations after the instructions have been downloaded, or the remote service center may tag or code the instructions to be associated with the respective geographic locations before downloading the instructions to the control, without affecting the scope of the present invention.

In one form, the at least two driving instructions are visibly displayed to the driver at a display of the vehicle. In another form, the at least two driving instructions are audibly communicated to the driver via at least one speaker of the vehicle. In a third form, a combination of a visible display and audible communication may be used.

According to yet another aspect of the present invention, a navigation system for a vehicle comprises a vehicle-based telematics system, a vehicle-based global positioning system, and a control. The telematics system is operable to receive a user input from a driver of the vehicle and to download directional information to the control of the vehicle in response to the user input and an initial geographic position of the vehicle. The directional information comprises at least two instructions. The control is operable to tag or code or link each of the instructions with a respective geographic location. The control is operable to provide an output corresponding to a particular instruction only when the geographic location tagged or coded or linked to the particular instruction at least generally corresponds to the actual current geographic position of the vehicle.

The present invention thus provides for step-by-step instructions or driving directions to the driver of a vehicle as the driver is driving the vehicle according to the instructions. Each step or instruction is provided either after the previous step or instruction has been completed or as the vehicle approaches a turn or intersection or location where the next step is to be performed, so that the driver is not overwhelmed with multiple instructions to remember as the driver drives the vehicle toward the targeted destination. The control or the remote source or service center is operable to electronically or digitally or otherwise tag, key, code or otherwise associate each instruction or step with a geographic location or waypoint, and the control is operable to only display that instruction when the geographic location tagged to the instruction generally matches the actual, current geographic position of the vehicle. All of the instructions are provided or downloaded to the vehicle during a single, short communication with the remote source or service center via the telematics system, so as to avoid multiple communications to the remote service center or a lengthy communication with the remote service center, thereby reducing the cost of the instruction service to the driver of the vehicle.

These and other objects, advantages, purposes, and features of the present invention will become more apparent from the study of the following description taken in conjunction with the drawings.

DESCRIPTION OF THE PREFERRED EMBODIMENTS

Figure 1:
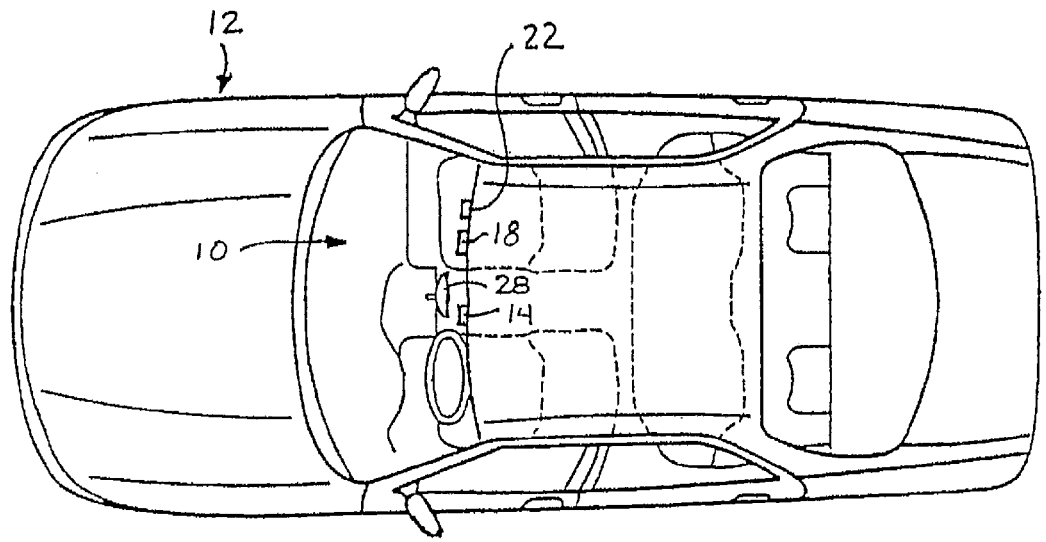
FIG. 1 is a top plan view of a vehicle incorporating a navigation system in accordance with the present invention.
Figure 2:
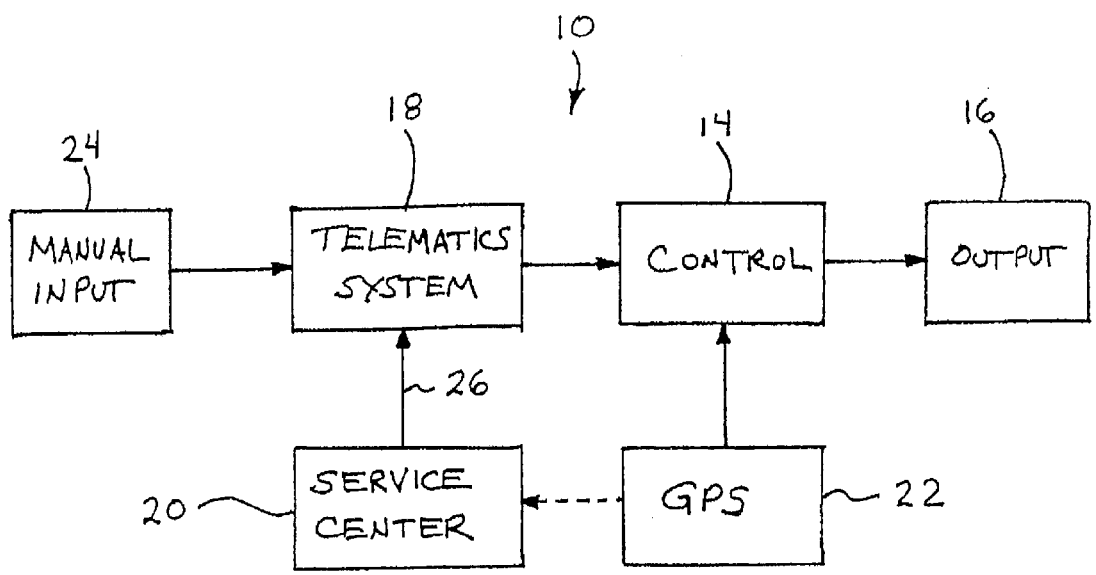
FIG. 2 is a block diagram of a navigation system in accordance with the present invention.

Referring now to the drawings and the illustrative embodiments depicted therein, a navigation system 10 of a vehicle 12 includes a control 14 which is operable to communicate an output 16, such as step-by-step directions or driving instructions, to a driver of the vehicle based on an initial, current or present geographic position of the vehicle and the desired or targeted final destination of the vehicle (FIGS. 1 and 2). The initial geographic position of the vehicle and the targeted destination is communicated to a remote source or service center 20 via a telematics system 18 of the vehicle and a global positioning system 22 of the vehicle. In response to a user input 24 from the driver or other occupant of the vehicle and the initial geographic position of the vehicle, the service center 20 provides or downloads a set of instructions or driving directions 26, which is received by the control 14 from the service center via the telematics system or wireless communication system 18 of the vehicle. Each of the particular instructions is electronically or digitally or otherwise coded, tagged, keyed, or otherwise associated with a respective particular geographic location or waypoint. The control 14 then provides the instructions or output 16 to the driver in a step-by-step manner based on the GPS-derived, actual, then current geographic position of the vehicle, and with the stepping from one step to the subsequent step of the instructions being linked to the then current geographic position of the vehicle in relation to the particular geographic locations or waypoints associated with the instructions, as discussed below.

The driver or the other occupant of the vehicle provides the user input 24 to the telematics system or wireless communication system 18 of the vehicle. The user input 24 may include a vocal communication or request for driving instructions or directional information to the final destination to an operator or voice input/recognition system of the service center or the like 20 associated with the telematics system 18 of the vehicle, or may be a keyed-in request or instructions via a keypad or the like to a remote computer system or computerized service center or the like, without affecting the scope of the present invention. The driver or other occupant of the vehicle may provide (such as via a vocal communication or via a keypad input or the like) the initial position of the vehicle to the service center or the geographic position of the vehicle may be communicated to the service center via a global positioning system 22 of the vehicle.

The remote service center 20 is then operable to download the local map and/or the driving instructions or directions to a memory storage or control 14 of the vehicle while the communication link is open between the service center and the vehicle. Because only the local information necessary to direct the driver to the targeted destination is downloaded to the control or memory of the vehicle, the download may be completed in a relatively short period of time (thus minimizing the time and cost of the communication) and does not require a large amount of memory or storage space for the information. After the instructions or directions are downloaded to the vehicle, the driver may disconnect from the service center to avoid additional charges for the communication and service.

Each of the output instructions provided by the control is electronically or digitally or otherwise keyed or coded or tagged or otherwise associated with or linked to a respective or corresponding geographic location or waypoint. The instructions may be tagged or coded by the remote source or service center before the instructions are downloaded to the vehicle, or the instructions may be tagged or coded by the control at the vehicle after the instructions have been downloaded to the control, without affecting the scope of the present invention.

The control 14 also receives, preferably continuously, an input from the in-vehicle or vehicle-based global positioning system 22 which is indicative of the actual, current geographic position of the vehicle as it travels along the road, highway or the like. The control is then operable to compare the tagged or coded geographic locations as associated with the respective instructions with the GPS-derived actual geographic position information. Thus, the control is operable to determine when a particular instruction is appropriate to be displayed or communicated to the driver of the vehicle by determining that the actual GPS-derived geographic position of the vehicle is now at or at least close to the geographic location associated with a particular instruction. The control is then operable to provide the separate or particular output instructions to the driver of the vehicle in response to the actual, then current geographic position of the vehicle matching or corresponding to or approaching a particular geographic location or waypoint keyed to or coded to or tagged to or associated with a respective, particular instruction.

Preferably, the output or instructions are provided to the driver of the vehicle in a step-by-step manner, where each individual instruction or step is provided based on the then current geographic position of the vehicle with respect to the keyed or coded geographic location. More particularly, each particular instruction is provided to the driver by the control only when the actual geographic position of the vehicle at least generally corresponds to or matches the particular geographic location associated with or linked to the respective, particular instruction. The particular instruction is thus provided to the driver of the vehicle at the particular time at which the vehicle is positioned at or near a geographic location where the particular instruction is most useful to the driver of the vehicle.

For example, an initial instruction may be electronically or digitally coded to the initial geographic position of the vehicle when the directions/instructions are first requested (e.g., "You are heading East on First Street"). Each subsequent individual step may be provided in response to the control detecting or determining (in response to an output of the global positioning system) that the vehicle is approaching, at or near the next geographic location or waypoint, such as a turn, location, intersection or the like, at which the next step is to be performed (e.g., the car is approaching and within a predetermined or threshold distance from Main Street and the next instruction is "Turn Left on Main Street"), or in response to the control detecting or determining (again in response to the global positioning system of the vehicle) that a previous instruction or step has been completed (e.g., the car has turned left and is now traveling along Main Street and the next instruction is "Proceed North on Main Street"). The control is thus operable to provide the next step or instruction only when the driver can readily understand the instruction and focus on performing that particular step. The driver thus does not have to remember all of the multiple steps or turns or street names or exits or the like while also driving the vehicle. The driver also thus does not have to remain on the line with the remote service center operator and/or does not have to repeatedly contact the service center to obtain the instructions again if any of the instructions are forgotten, since the local instructions and/or map have been downloaded to the vehicle.

The telematics system or wireless communication system 18 of the vehicle may be operable to connect to a corresponding service center or operator or voice input/recognition system or the like 20 which may provide a variety of information or assistance to the driver of the vehicle in response to a vocal message from the driver or other occupant of the vehicle (although the user input may be a keypad input or the like to a computerized service center or the like, without affecting the scope of the present invention). Such a communication system and service center may be substantially similar to known systems and centers, such as General Motors' ONSTAR®, Daimler's TELEAID™, Ford's RESCU® or the like, which are common in vehicles today. The communication link may be accomplished utilizing various linking principles, such as the principles disclosed in commonly assigned U.S. Pat. Nos. 6,420,975; 6,278,377; 6,243,003; 6,329,925; 6,428,172; 6,326,613, the disclosures of which are hereby incorporated herein by reference.

The driver or occupant of the vehicle may actuate a communication link (such as via a push button or the like at the interior rearview mirror or at a console of the vehicle), and request from the operator, such as via a voice input, the driving instructions or directions as to how to get to a desired or targeted location or destination. The service center may receive the initial geographic position of the vehicle (such as in response to the global positioning system of the vehicle or from the driver), and may access a database to obtain the appropriate local map and/or local directions to the targeted destination. The operator may even access the vast data banks available at the service center for destinations or locations and may provide human interaction to help find the destination of choice if the driver does not know the exact address. The operator or service center then downloads the local information or step-by-step or turn-by-turn directions 26 to the control or memory or storage system 14 of the vehicle 12 in a single download. Optionally, it is envisioned that the service center may download or provide the information to the vehicle in real time (which may result in a longer opened communication link between the vehicle and the service center), without affecting the scope of the present invention.

The control 14 is operable to provide the downloaded instructions to the driver of the vehicle while the vehicle is driven by the driver toward the targeted destination. The control 14 provides the information or directions or output 16, such as when/where to turn, how far until the turn, and the direction to travel, to the driver as needed. The control may be operable to update the output display or message in real time based on the current geographic position of the vehicle as the vehicle travels along the given route.

The output or instructions may be provided to the driver by the control via an audible message or signal, such as via one or more speakers of the vehicle, such as by utilizing principles of audio systems of the types disclosed in commonly assigned U.S. Pat. Nos. 6,243,003; 6,278,377; and 6,420,975, which are hereby incorporated herein by reference, or may be provided via a display, such as in a display of an interior rearview mirror 28, such as a scrolling display of the type disclosed in commonly assigned U.S. patent application Ser. No. 09/799,414, filed Mar. 5, 2001, now U.S. Pat. No. 6,477,464, which is hereby incorporated herein by reference, or a display on demand type display, such as the types disclosed in commonly assigned U.S. Pat. Nos. 5,668,663 and 5,724,187, and U.S. patent application Ser. No. 10/054,633, filed Jan. 22, 2002, now U.S. Pat. No. 7,195,381; and Ser. No. 09/793,002, filed Feb. 26, 2001, now U.S. Pat. No. 6,690,268, the entire disclosures of which are hereby incorporated herein by reference, or in a display screen or the like at the interior rearview mirror assembly or elsewhere within the vehicle, without affecting the scope of the present invention. Other types of visible displays or locations for such visible displays may be utilized, such as at an accessory module or pod or windshield electronic module, an instrument panel of the vehicle, a console of the vehicle and/or the like, without affecting the scope of the present invention. The visible display may comprise written instructions, icons (such as left and right arrows or the like), or any other characters or symbols or indicia which convey to the driver of the vehicle when/where to turn and/or which direction to travel in order to arrive at the targeted destination. Optionally, the output may comprise a combination of a visible display and an audible message or signal, without affecting the scope of the present invention.

As indicated above, a variety of means may be utilized to visually convey the direction instructions to the driver of the vehicle. For example, and such as described in U.S. patent application Ser. No. 09/799,414, filed Mar. 5, 2001, now U.S. Pat. No. 6,477,464, which is hereby incorporated herein by reference, a text display may be provided and/or an iconistic display may be provided, such as a display readable through the interior rearview mirror reflective element itself. In this regard, use of a display on demand (DOD) type display (such as disclosed in commonly assigned, U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690,268, and in U.S. Pat. Nos. 5,668,663 and 5,724,187, the entire disclosures of which are hereby incorporated by reference herein), may be preferred. For example, a video display element or a video display screen or an information display element can be used (such as an elongated alphanumeric/multi-pixel/multi-icon display element and/or such as an LCD display or an emitting display element, such as a multi-pixel electroluminescent display or field emission display or light emitting diode display (organic or inorganic) or the like) which is disposed within the minor housing of the interior minor assembly of the vehicle, and located behind the mirror reflective element in the minor housing, and configured so that the information displayed by the display element (that is positioned to the rear of the reflector of the minor reflective element) is viewable by the driver through the minor reflective element. Such a display can be accomplished by partially or wholly removing the reflector in the area of the display or, more preferably, by providing a display on demand type display, whereby the reflective element comprises a transflective element, as discussed below.

Preferably, and such as is disclosed in U.S. patent application Ser. No. 09/793,002, filed Feb. 26, 2001, now U.S. Pat. No. 6,690,268, the video display screen or other visible display element or elements may be disposed behind the minor reflective element so that the information displayed is visible by viewing through the minor reflective element of the interior rearview minor assembly, with the reflective element preferably comprising a transflective minor reflector such that the mirror reflective element is significantly transmitting to visible light incident from its rear (i.e. the portion furthest from the driver in the vehicle), with at least about 15% transmission preferred, at least about 20% transmission more preferred, and at least about 25% transmission most preferred, while, simultaneously, the mirror reflective element is substantially reflective to visible light incident from its front (i.e. the position closest to the driver when the interior minor assembly is mounted in the vehicle), with at least about 60% reflectance preferred, at least about 70% reflectance more preferred, and at least about 75% reflectance most preferred.

Preferably, a transflective electrochromic reflective minor element is used (such as is disclosed in U.S. patent application Ser. No. 09/793,002, filed Feb. 26, 2001, now U.S. Pat. No. 6,690,268; and/or in U.S. Pat. Nos. 5,668,663 and 5,724,187, the entire disclosures of which are hereby incorporated by reference herein) that comprises an electrochromic medium sandwiched between two substrates. With the likes of a TFT LCD video display or a light emitting information display disposed behind the rear substrate of a third-surface transflective electrochromic mirror reflective element in a "display-on-demand" configuration (such as disclosed in U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690,268, which are hereby incorporated by reference), the presence of (and the image or information displayed by) the video display screen or information display is only principally visible to the driver (who views the display through the transflective minor reflective element) when the information display element is powered so as to transmit light from the rear of the minor reflective element through the transflective mirror reflector to reach the eyes of the driver. Preferably, a single high-intensity power LED, such as a white light emitting LED comprising a Luxeon™ Star Power LXHL-MW1A white light emitting LED having (at a 25 degree Celsius junction temperature) a minimum forward voltage of 2.55 volts, a typical forward voltage of 3.42 volts, a maximum forward voltage of 3.99 volts, a dynamic resistance of 1 ohm and a forward current of 350 milliamps, and as available from Lumileds Lighting LLC of San Jose, Calif., is used as a backlight for the TFT LCD video screen. Alternately, a plurality of such single high-intensity power LEDs (such as an array of two or of four such power LEDs) may be placed behind the TFT LCD video screen so that the intense white light projected from the individual single high-intensity power LEDs passes through the TFT LCD element and through the transflective electrochromic element, preferably producing a display intensity as viewed by the driver of at least about 200 candelas/sq. meter; more preferably at least about 300 candelas/sq. meter; and most preferably at least about 400 candelas/sq. meter. Alternately, cold cathode vacuum fluorescent sources/tubes can be used for backlighting and optionally can be used in conjunction with LED backlighting.

Optionally, and in accordance with incorporated U.S. patent application Ser. No. 09/793,002, now U.S. Pat. No. 6,690,268, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, filed Jul. 27, 1999, now U.S. Pat. No. 6,201,642, and in U.S. patent application Ser. No. 09/199,907, filed Nov. 25, 1998, now U.S. Pat. No. 6,717,610, and in U.S. patent application Ser. No. 09/313,139, filed May 17, 1999, now U.S. Pat. No. 6,222,447; Ser. No. 09/776,625, filed Feb. 5, 2001, now U.S. Pat. No. 6,611,202.

Note that other display locations are possible for display of the video image or information display, such as a map and/or a text message comprising driving instructions, to the driver or occupant of the vehicle. For example, a video image may be displayed on an LCD video screen of flip-down display (such as is disclosed in U.S. patent application Ser. No. 09/793,002, filed Feb. 26, 2001, now U.S. Pat. No. 6,690,268, incorporated above), or on a video screen incorporated into the rearview mirror assembly, such as the type disclosed in U.S. provisional applications, Ser. No. 60/439,626, filed Jan. 13, 2003; Ser. No. 60/489,812, filed Jul. 24, 2003; and Ser. No. 60/492,225, filed Aug. 1, 2003, which are hereby incorporated herein by reference. Optionally, for example, a video display located in the front instrument panel can be used, or a video display located in an overhead console (such as an overhead accessory module or system as described in U.S. provisional applications, Ser. No. 60/489,812, filed Jul. 24, 2003; and Ser. No. 60/492,225, filed Aug. 1, 2003, which are hereby incorporated herein by reference) can be used, without affecting the scope of the present invention.

Alternately, as outlined above, a local area map may be downloaded to the control from the external service provider or service center and the control may be operable (such as by using the principles disclosed in U.S. patent application Ser. No. 10/054,633, filed Jan. 22, 2002, now U.S. Pat. No. 7,195,381, and Ser. No. 09/793,002, filed Feb. 26, 2001, now U.S. Pat. No. 6,690,268, which are hereby incorporated herein by reference) to feed such a map to the likes of a thin film transistor (TFT) liquid crystal (LC) video screen or other type of video screen or display element or display system, and with the instructions being conveyed by alphanumeric characters and/or indicia or the like and/or by highlighting portions of the map display. Such highlighting may be controlled by the in-vehicle control or control unit based on actual, current vehicle position information as determined by the in-vehicle or vehicle-based global positioning system. Thus, the vehicle owner need not buy into or have in the vehicle a full map of all areas to which the vehicle may be driven (such as regional maps or national maps or the like).

Alternately, a low cost, multi-pixel display (such as the type disclosed in U.S. provisional application Ser. No. 60/373,932, filed Apr. 19, 2002 by McMahon for VEHICLE IMAGING SYSTEM, and in U.S. patent application Ser. No. 10/418,486, filed Apr. 18, 2003, now U.S. Pat. No. 7,005,974, which are hereby incorporated herein by reference), such as a low cost multi-pixel vacuum fluorescent display, a low cost multi-pixel organic light emitting diode (OLED), a low cost multi-pixel field emission display, or any other or similar multi-pixel light emitting display or the like may be utilized, without affecting the scope of the present invention. The local area map, with the instructions iconistically displayed thereon, may be displayed on such a multi-pixel display or the like in response to the control receiving an input or download from the telematics system and/or the in-vehicle or vehicle-based global positioning system.

As disclosed in U.S. patent application Ser. No. 10/054, 633, filed Jan. 22, 2002, now U.S. Pat. No. 7,195,381, incorporated above, suitable LEDs for a light source unit include a white light emitting light emitting diode, such as described in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 30, 2000; Ser. No. 60/234,412, filed Jul. 21, 2000; Ser. No. 60/218,336, filed Jul. 14, 2000; and Ser. No. 60/186,520, filed Mar. 2, 2000, and U.S. utility applications entitled VIDEO MIRROR SYSTEMS INCORPORATING AN ACCESSORY MODULE, filed Feb. 26, 2001, now U.S. Pat. No. 6,690,268, and REARVIEW MIRROR ASSEMBLY WITH UTILITY FUNCTIONS, Ser. No. 09/585,379, filed Jun. 1, 2000, including a thermostable LED, which emits the same color light even when the temperature varies. Thus, regardless of the interior or exterior temperature of the vehicle and/or of the accessory equipped with the thermostable non-incandescent light emitting diode source, the same color light is radiated. Such a thermostable white light emitting non-incandescent light emitting diode source can incorporate a trio of red, green, and blue fluorescent materials that together create white light when struck by 380 nm wavelength light from a gallium-nitride LED, and is available from Toyoda Gosei Co. and Toshiba Corp of Nagoya, Japan.

One suitable white light emitting diode (LED) that is thermostable is available from Toshiba America Electronic Components, Inc. of Irvine, Calif., Part No.: TLWA1100. The thermostable white-light LED integrates multiple colored phosphors and a short peak wavelength (preferably, approximately 380 nanometers (nm) in peak spectral output intensity) light-emitting diode junction in a phosphor-mixed transparent resin package to achieve a high luminosity, low power consumption light source. Such thermostable LEDs adopt a technological approach differing from that used in conventional LEDs. Light emission in the visible wavelength band is controlled by excited phosphors, not by using temperature changes in the LED to achieve a change in color output. The fact that the LED emission does not directly determine the color brings advantages in overall controllability and wavelength stability. Incorporated in vehicular accessories, such as those disclosed above, the thermostable diode achieves improved tonic reproduction and enhanced color durability during temperature shifts. Such thermostable LEDs utilize a short wavelength light source by reducing the indium in an indium-doped GaN emission layer. This excites red, green, and blue (RGB) phosphors in the transparent resin of the device package to output white light. The RGB balance of the phosphor layer determines the output color, and different colored output can be achieved through modified phosphor balance. The emission light from the LED itself does not directly contribute to the white color. The phosphors used in the new LED offer excellent performance in terms of operating temperature range and color yield. Specifications of such thermostable white LEDs include a compact package (3.2× 2.8 millimeter), provided in a Surface Mount Device (SMD). Luminosity is typically about 100 millicandela (mcd) at 20 mA and luminous flux/electrical watt is about 4.5-5.0 lumens per watt at 20 mA. Correlated color temperature is about 6,500-9,000K. Operating temperature is about −40° Celsius-100° Celsius and storage temperature is about −40°-100° Celsius.

Also, high brightness LEDS are available from Uniroyal Technology Corporation of Saratoga, Fla. under the tradename POWER-Ga(I)™ High Brightness InGaN LEDs which comprise high brightness, high luminous efficiency short wavelength LEDs utilizing a power ring n-Contact and a centralized p-Pad design feature. 450 nm and 470 nm high brightness blue LED die products are available that have a minimum power output of 2 milliwatts in die form which, when conventionally packaged, can result in packaged lamp power levels between 4 and 5 milliwatts. Such LEDs combine indium gallium nitride (InGaN) materials on sapphire substrates in order to produce higher efficiencies. GaN LEDs can be produced by MOCVD epitaxy on Sapphire (aluminum oxide) or can be produced on silicon carbide substrates. Ultraviolet light emitting LEDs can be produced.

Depending on the application, LEDs emitting a colored light can be used, such as high intensity amber and reddish orange light emitting diode sources, such as solid state light emitting diode LED sources utilizing double hydro junction AlGaAs/GaAs Material Technology, such as very high intensity red LED lamps (5 mm) HLMP-4100/4101 available from Hewlett Packard Corporation of Palo Alto, Calif., or transparent substrate aluminum indium gallium phosphide (AlInGaP) Material Technology, commercially available from Hewlett Packard Corporation of Palo Alto, Calif. Also, blue can be used, or a combination of individual different colored diodes, such as red, blue, white, green, amber, orange etc. can be used with color mixing thereof to form a desired color or to deliver a desired local intensity of illumination as noted above. Other suitable white emitting light-emitting diodes are available from Nichia Chemical Industries of Tokyo, Japan and from Cree Research Inc., of Durham, N.C. For example, a white light emitting diode is available from Nichia Chemical Industries of Tokyo, Japan under Model Nos. NSPW 300AS, NSPW 500S, NSPW 310AS, NSPW 315AS, NSPW 510S, NSPW 515S and NSPW WF50S, such as is disclosed in U.S. patent application Ser. No. 09/448,700, filed Nov. 24, 1999, now U.S. Pat. No. 6,329,925, and in U.S. patent application Ser. No. 09/244,726, filed Feb. 5, 1999, now U.S. Pat. No. 6,172,613. A variety of constructions are used including GaAsP on GaP substrate, gallium aluminum phosphide, indium gallium nitride, and GaN on a SiC substrate. Optionally, a plurality of LEDs such as a cluster of two, three, four, six, eight or the like LEDs (each of the same color or the cluster comprising different colored LEDs) can be used to target and illuminate a local area for higher illumination at that area, such as may be useful in a map light or as a reading light or as an interior light or as an illumination source for an interior vehicle cabin-mounted and monitoring camera (most preferably illuminating the target area with white light). Such a cluster of high efficiency LEDs can be mounted at the mirror mount so as to project an intense pattern of light generally downwardly into the vehicle cabin for purposes of map reading, general illumination, courtesy illumination and the like. Also, a cluster of LED's, preferably including at least one white emitting LED and/or at least one blue emitting LED, can be mounted in a roof portion, side portion or any other portion of the vehicle cabin to furnish dome lighting, rail lighting, compartment lighting and the like. Use of white emitting LEDs is disclosed in U.S. Pat. No. 6,152,590, entitled LIGHTING DEVICE FOR MOTOR VEHICLES, filed Feb. 12, 1999, by Peter Fuerst and Harald Buchalla of Donnelly Hohe Gmbh & Co, KG.

Other suitable LEDs may include high-intensity, high current capability light emitting diodes such as the high-flux power LEDs available from LumiLeds Lighting, U.S., LLC of San Jose, Calif. under the SunPower Series High-Flux LED tradename. Such high-intensity power LEDs comprise a power package allowing high current operation of at least about 100 milliamps forward current, more preferably at least about 250 milliamps forward current, and most preferably at least about 350 milliamps forward current through a single LED. Such high current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high intensity power LEDs are available in blue, green, blue-green, red, amber, yellow and white light emitting forms, as well as other colors. Such high-intensity LEDs can provide a wide-angle radiation pattern, such as an about 30 degree to an about 160 degree cone. Such high-intensity power LEDs, when normally operating, emit a luminous flux of at least about 1 lumen, more preferably at least about 5 lumens and most preferably at least about 10 lumens. For certain applications such as ground illumination from lighted exterior mirror assemblies and interior minor map lights, such high-intensity power LEDs preferably conduct at least about 250 milliamps forward current when operated at a voltage in the about 2 volts to about 5 volts range, and emit a luminous flux of at least about 10 lumens, more preferably at least about 15 lumens and most preferably at least about 25 lumens, preferably emitting white light.

For example, the mirror assembly may include circuitry for minor mounted video cameras, which are used to visually detect the presence of moisture on the windshield and actuate windshield wipers accordingly, such as described in U.S. patent application Ser. No. 08/621,863, filed Mar. 25, 1996, now U.S. Pat. No. 5,796,094, or minor mounted cameras for vehicle internal cabin monitoring disclosed in U.S. Pat. Nos. 5,877,897 and 5,760,962, both commonly assigned to Donnelly Corporation, or mirror mounted cameras for rear vision systems as disclosed in U.S. Pat. Nos. 5,959,367; 5,929,786; 5,949,331; 5,914,815; 5,786,772; 5,798,575; 5,670,935; and U.S. patent application Ser. No. 09/304,201, filed May 3, 1999, now U.S. Pat. No. 6,198,409; Ser. No. 09/375,315, filed Aug. 16, 1999, now U.S. Pat. No. 6,175,164; Ser. No. 09/199,907 filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/300,201, filed May 3, 1999; and Ser. No. 09/313,139, filed May 17, 1999, now U.S. Pat. No. 6,222,447, which are all commonly assigned to Donnelly Corporation of Holland, Mich. Additional features and accessories that may be incorporated into the mirror assembly include: a trip computer, an intrusion detector, displays indicating, for example passenger air bag status, including information displays such as a PSIR (Passenger Side Inflatable Restraint) display, an SIR (Side-Airbag Inflatable Restraint), compass/temperature display, a tire pressure status display or other desirable displays and the like, such as those described in U.S. patent application Ser. No. 09/244,726, filed Feb. 5, 1999, now U.S. Pat. No. 6,172,613. For example, a rearview minor assembly (or an accessory module assembly such as a windshield electronics module assembly), may include: antennas, including GPS or cellular phone antennas, such as disclosed in U.S. Pat. No. 5,971,552; a communication module, such as disclosed in U.S. Pat. No. 5,798,688; displays such as shown in U.S. Pat. No. 5,530,240 or in U.S. application Ser. No. 09/244,726, filed Feb. 5, 1999, now U.S. Pat. No. 6,172,613; blind spot detection systems, such as disclosed in U.S. Pat. No. 5,929,786 or 5,786,772; transmitters and/or receivers, such as garage door openers, a digital network, such as described in U.S. Pat. No. 5,798,575; a high/low head lamp controller, such as disclosed in U.S. Pat. No. 5,715,093; a memory mirror system, such as disclosed in U.S. Pat. No. 5,796,176; a hands-free phone attachment, a video device for internal cabin surveillance and/or video telephone function, such as disclosed in U.S. Pat. Nos. 5,760,962 and 5,877,897 and application Ser. No. 09/433,467, now U.S. Pat. No. 6,326,613; a remote keyless entry receiver; microphones and/or speakers, such as disclosed in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610; a compass, such as disclosed in U.S. Pat. No. 5,924,212; seat occupancy detector; a trip computer; an ONSTAR System or the like, with all of these referenced patents and applications being commonly assigned to Donnelly Corporation.

An interior rearview mirror assembly may also include a compass/temperature and a clock display, fuel level display, and other vehicle status and other information displays. The interior rearview minor assembly may also include a compass/temperature and a clock display, fuel level display, and other vehicle status and other information displays. Furthermore, information displays may be incorporated which provide information to the driver or occupants of the vehicle, such as warnings relating to the status of the passenger airbag. In commonly assigned application Ser. No. 09/244,726, filed Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like. The passenger side air bag on/off signal may be derived from various types of seat occupancy detectors such as by video surveillance of the passenger seat as disclosed in commonly assigned PCT Application No. PCT/US94/01954, filed Feb. 25, 1994, published Sep. 1, 2004 as PCT Publication No. WO/1994/019212, or by ultrasonic or sonar detection, infrared sensing, pyrodetection, weight detection, or the like. Alternately, enablement/displayment of the passenger side air bag operation can be controlled manually such as through a user-operated switch operated with the ignition key of the vehicle in which the minor assembly is mounted as described in commonly assigned U.S. patent application Ser. No. 08/799,734, filed Feb. 12, 1997, now U.S. Pat. No. 5,786,772. In addition, the interior rearview minor assemblies may include electronic and electric devices, including a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors such as described in U.S. Pat. No. 4,973,844 or non-windshield contacting rain sensors, such as described in PCT International Application PCT/US94/05093, published as WO 94/27262 on Nov. 24, 1994.

In addition, the mirror assembly (or an accessory module assembly such as a windshield electronics module assembly) may incorporate one or more video screens or video display assemblies, such as disclosed in U.S. provisional applications, Ser. No. 60/263,680, filed Jan. 23, 2001; Ser. No. 60/243,986, filed Oct. 27, 2000; Ser. No. 60/238,483, filed Oct. 6, 2000; Ser. No. 60/237,077, filed Sep. 29, 2000; Ser. No. 60/234,412, filed Sep. 21, 2000; Ser. No. 60/218,336, filed Jul. 14, 2000; and Ser. No. 60/186,520, filed Mar. 2, 2000, all commonly assigned to Donnelly Corp. of Holland, Mich.

The video screen may be used for a baby minder system, such as the vehicle interior monitoring system described in U.S. Pat. Nos. 5,877,897 and 5,760,962 or the rear vision system described in U.S. patent application Ser. No. 09/361,814, filed Jul. 27, 1999, now U.S. Pat. No. 6,201,642, and Ser. No. 09/199,907, filed Nov. 25, 1998, now U.S. Pat. No. 6,717,610, and Ser. No. 09/433,467, filed Nov. 4, 1999, now U.S. Pat. No. 6,326,613. An interior surveillance system permits the driver of the vehicle to observe behavior or the activities of babies or children or other passengers seated in the rear seat. This is especially advantageous when the child or baby is in a rearward facing car seat, where the child or baby would ordinarily not be visible to the driver while driving. For example, a camera, such as a CMOS or CCD camera, can be mounted to view the rear seat area of the vehicle so that the driver can view what is occurring, such as in a rear seat mounted baby seat or with a rear seat passenger, such as children. Preferably, to enable viewing of the rear seat occupant or occupants even by night, the target field of view of the camera may be illuminated in a manner that provides adequate visibility for the camera to discern what is occurring in the rear seat in a darkened vehicle cabin but not illuminating in a manner that causes glare, distraction, and/or discomfort to any vehicle occupants, including the driver and/or rear seat passengers. For example, such a rear seat monitoring camera illumination is preferably achieved using directed low level non-incandescent light sources, such as light emitting diodes (LEDs), organic light emitting material, electroluminescent sources (both organic and inorganic), and the like, and most preferably such non-incandescent sources are low power and are directed low intensity sources, such as described in U.S. Pat. No. 5,938,321 and application Ser. No. 09/287,926, filed Apr. 7, 1999, now U.S. Pat. No. 6,139,172. The baby minder camera may be mounted as a part of the rearview mirror assembly and, most preferably, may be mounted as a part of a roof area of the interior vehicle cabin such as a header, including a front header of a roof or a rear header or a header console of a roof. It may be desirable to mount a baby minder camera to the rear header of a roof when it is desirable to view rear facing child support seats. Most preferably, a plurality of at least two, more preferably at least four, and most preferably at least six LEDs (or similar low level, directed, low-current light sources such as electroluminescent sources and organic light emitting sources) are mounted with a camera (preferably, such as to form a ring around the camera) with the light projected from the individual LEDs directed to be coincident with the camera field of view and to illuminate the target area desired to be viewed. The LEDs being directed low level sources will not glare or cause discomfort to occupants when illuminated. Further, camera illumination sources can be illuminated whenever the ignition switch is on to operate the vehicle or at least when the ignition switch is placed in an "accessory on" position so that both the camera and illumination lights are operating on vehicle battery power even when parked. Alternately, the illumination lights can be operational only when the baby minder camera is selected to be operational. While it is preferred to use non-incandescent lights, incandescent light sources can be used, most preferably high intensity, low current incandescent light sources. For example, when the camera is activated to view the rear seat or to view a baby seat or the like, the dome light in the vehicle, which typically comprises an incandescent light source, can illuminate so that the rear seat area is illuminated to assist visibility for the camera. A circuit or other device can be provided that illuminates the dome light (or a similar rear seat-illuminating interior light source, such as a rail lamp or the like) whenever the camera is selected to view the rear seat. Optionally, the dome light or similar interior light within the interior cabin, once caused to illuminate when the camera is activated, can cease to illuminate after a determined time interval (such as 5 seconds or ten seconds or longer) under the control of a timeout circuit or device. By providing a timeout, the driver can selectively view the status of passengers in the rear seat of the vehicle by selecting a baby-minder camera or similar rear seat viewing function (such as by voice command, user-operated switch or the like). Upon selection of the camera function, whatever is being viewed on the video screen in the vehicle may be interrupted (or superimposed over or the like), the interior light in the cabin (such as the dome light) will illuminate, a timeout will initiate, and the driver (or other front-seat occupant) can view the rear seat status for the duration of the timeout. Once the timeout elapses, the interior light ceases to illuminate, and preferably, the camera ceases to be activated and the video screen reverts to its pre-event status. Optionally, a reverse-aid rearward viewing camera can be mounted to the rear of the vehicle in order to display to the driver, upon selecting a reverse gear, a field of view immediately rearward of the vehicle so as to assist the driver in reversing the vehicle. Such vehicle reverse-aid camera systems are disclosed in U.S. patent application Ser. No. 09/361,814, filed Jul. 27, 1999, now U.S. Pat. No. 6,201,642, and in U.S. patent application Ser. No. 09/199,907, filed Nov. 25, 1998, now U.S. Pat. No. 6,717,610, and in U.S. patent application Ser. No. 09/313,139, filed May 17, 1999, now U.S. Pat. No. 6,222,447.

Light emitting sources, such as light emitting diodes, can be used to provide lighting for any camera that feeds an image to the mirror-mounted video screen (or feeds an image to an accessory module assembly such as a windshield electronics module assembly). Light emitting diodes can be used to provide illumination in various colors, such as white, amber, yellow, green, orange red, blue, or their combination, or the like, may be used. Alternately, other light emitting elements can be used to provide illumination for any camera that feeds an image to the mirror-mounted video screen, such as incandescent sources, fluorescent sources, including cold-cathode fluorescent sources, electroluminescent sources (both organic and inorganic), such as described in U.S. Pat. No. 5,938,321, and application Ser. No. 09/287,926, filed Apr. 7, 1999, now U.S. Pat. No. 6,139,172, and in such as is disclosed in co-assigned U.S. patent application Ser. No. 09/466,010, filed Dec. 17, 1999, now U.S. Pat. No. 6,420,975, and in co-assigned U.S. patent application Ser. No. 09/449,121, filed Nov. 24, 1999, now U.S. Pat. No. 6,428,172, and U.S. patent application Ser. No. 09/585,379, filed Jun. 1, 2000, entitled REARVIEW MIRROR ASSEMBLY WITH UTILITY FUNCTIONS.

The minor-mounted video screen can display the output from a rear vision back-up camera, such as disclosed in application Ser. No. 09/199,907, filed Nov. 25, 1998, now U.S. Pat. No. 6,717,610, and Ser. No. 09/361,814, filed Jul. 27, 1999, now U.S. Pat. No. 6,201,642, commonly assigned to Donnelly Corporation, along with vehicle instrument status, such as a vehicle information display, such as information relating to fuel gauge levels, speed, climate control setting, GPS directional instructions, tire pressure status, instrument and vehicle function status, and the like.

Also, and especially for a minor assembly incorporating a video screen that is incorporated as part of an interior electro-optic (such as electrochromic) mirror assembly, a common circuit board and/or common electronic components and subcircuitry can be utilized to control the electro-optic activity of the reflective element and to control the image displayed by the video screen, thus achieving economy of design and function, and for operating other electrical or electronic functions supported in the interior rearview assembly. For example, a circuit board of the interior mirror assembly may support, for example, light emitting diodes (LEDs) for illuminating indicia on display elements provided on a chin or eyebrow portion of the bezel region of the interior mirror casing. Reference is made to U.S. Pat. Nos. 5,671,996 and 5,820,245. It should be understood that one or more of these buttons or displays may be located elsewhere on the mirror assembly or separately in a module, for example of the type disclosed in U.S. patent application Ser. No. 09/244,726, filed by DeLine et al., now U.S. Pat. No. 6,172,613, which is assigned to Donnelly Corporation of Holland, Mich., and may comprise the touch-sensitive displays as disclosed in U.S. patent application Ser. No. 60/192,721, filed Mar. 27, 2000. Note that button inputs can be provided along the lower bezel region of the interior mirror assembly such that, when actuated, a display appears within the mirror reflector region of the mirror reflective element. Preferably, the display appears local to the physical location of the particular button accessed by the driver or vehicle occupant (typically, immediately above it) so that the person accessing the mirror associates the appearance and information of the display called up by that individual button with the user's actuation of the button. Multiple actuations of that button can cause the display to scroll through various menu items/data displays, allowing the user to access a wide range of information. The button and associated circuitry can be adapted to recognize when a particular menu item is desired selected (such as holding down a particular input button for longer than a prescribed period, for example longer than about 1 second or longer than about 2 seconds or the like; if the button is held down for less than the prescribed period, the display scrolls to the next menu item). Preferably, whatever information is being displayed is displayed by a substantially reflecting and substantially transmitting reflective/transmissive reflector of the mirror reflective element such as the display on demand constructions disclosed in U.S. Pat. No. 5,724,187. Also, these features can be provided for a non-mirror video display.

Optionally, one or more of the cameras of the vehicle may be equipped with infrared LED light emitting sources, such as are disclosed in U.S. patent application Ser. No. 09/025,712, filed Feb. 18, 1998, now U.S. Pat. No. 6,087,953, and U.S. patent application Ser. No. 09/244,726, filed Feb. 5, 1999, now U.S. Pat. No. 6,172,613, and in U.S. patent application Ser. No. 09/561,023, filed Apr. 28, 2000, now U.S. Pat. No. 6,553,308, and in U.S. patent application Ser. No. 09/466,010, filed Dec. 17, 1999, now U.S. Pat. No. 6,420,975, in order to light up an area in or around the vehicle when it is dark. When an intrusion detector such as a motion detector (preferably a pyrodetector-based intrusion detection system such as is disclosed in commonly assigned U.S. patent application Ser. No. 08/901,929, filed Jul. 29, 1997, now U.S. Pat. No. 6,166,625, and commonly assigned U.S. patent application Ser. No. 09/516,831, filed Mar. 1, 2000, now U.S. Pat. No. 6,390,529, and U.S. patent application Ser. No. 09/275,565, filed Mar. 24, 1999, now U.S. Pat. No. 6,086,131) is triggered by, for example, someone attempting to break into the vehicle or steal the vehicle, the vehicle-based security system triggers images captured by the vehicular camera(s) to be downloaded to the telemetry system which then forwards by wireless telecommunication (such as by radio frequency or by microwave transmission) the images (or a security alert signal derived from an in-vehicle image analysis of the captured images) to a security service, a mobile device in the possession of the driver of the vehicle when he/she is remote from the parked vehicle (such as a key-fob or a Palm Pilot™ PDA), the cell phone of the vehicle owner, the home computer of the vehicle owner or the police or the like that is remote and distant from the vehicle where the security condition is being detected. Preferably, the in-vehicle camera-based security system silently and secretly records the events occurring in and/or around the vehicle while it is operating (such as when idling in traffic or moving on a highway or stopped at a traffic light) and provides a "black box" recording of activities in the interior of the vehicle or exterior of the vehicle. For example, the security system may be used to record or document vehicle status including speed, brake activation, vehicle control status signals (for example, whether the turn signal has been actuated, vehicle traction, tire pressures, yaw and roll, geographic location, time and date) and other vehicle information as well as record visual images detected by the cameras. In an accident, such vehicle performance/function data in combination with a visual recording of the interior and/or exterior vehicular scene (and optionally, a microphone recording of sounds/voices interior and/or exterior to the vehicle) can help insurance and police investigators establish the causes and conditions of an accident. The camera-based vehicle performance/function recording system of the vehicle preferably records data onto a recording medium (such as onto electronic memory or onto digital recording tape) that is rugged and protected from the consequences of an accident so as to survive the impact forces, shocks, fires and other events possible in an automobile accident. Preferably, any electronic memory utilized is non-volatile memory that is non-erasing in the event of electrical power loss in the vehicle. For example, the camera-based in-vehicle security system may include an electronic memory recording medium and/or a video tape (preferably a digital) recording medium so that a pre-determined period of operation of the vehicle, such as up to the last about 1 minute of vehicle operation, more preferably up to the last about 5 minutes of vehicle operation, most preferably up to the last about 15 minutes of vehicle operation, or even greater, is continuously recorded (such as on a closed-loop tape or electronic recording that continually records the most recent events inside and/or outside the road transportation vehicle). The camera-based in-vehicle security system can maintain the stored images and/or vehicle data in the vehicle for downloading when desired such as after an accident. Alternately, the camera-based in-vehicle security system can transmit the images and/or vehicle data by wireless communication to a remote receiver such as a receiver distant and remote from the vehicle (such as at a security system or a telematic service such as ONSTAR™ or RESCU™ or at the vehicle owners home or at a car rental center). This can occur continuously while the vehicle is being operated, so that in the event an accident occurs, retrieval and analysis of the recorded information is not impeded such as by damage or even loss of the vehicle in the accident. Also, the remote receiver of the information can alert authorities (such as a police, fire and/or ambulance service) of an accident immediately when such accident occurs (and thus potentially speed aid to any accident victims and/or dispatch the correct medical aid for the type of accident/injuries recorded by the camera(s)). The recorded information can include the gear in which the driver is operating the vehicle, the activation of the brakes, the speed at which the driver is traveling, the rate of acceleration/deceleration, the time, date and geographic location, the atmospheric conditions including lighting conditions—basically, the system can record what happened during a collision whereby the system provides an information recordation function. For example, when the system is used to record an accident when the vehicle is operating, the cameras may record scenes, vehicle instrument/function status, or the like which are kept on a tape or non-volatile electronic, solid-state memory, for example a continuous loop tape or electronic memory. Alternately, this information can be continuously transmitted or downloaded. For example, the information can be downloaded in response to a selected stimuli or trigger, such as when the brakes are activated, the air bag or bags are activated, when the horn is operated, or when the car de-accelerates, or the like. For example, the system may use accelerometers such as disclosed in U.S. patent application Ser. No. 09/440,497, filed Nov. 15, 1999, now U.S. Pat. No. 6,411,204, and, furthermore, may be combined with the deceleration based anti-collision safety light control system described in the aforementioned application. This information recordation function can be used, as noted above, to record both interior activities and exterior activities and, therefore, can be used as noted above as a security system as well. When the system is used as a security system, the telemetry system may contact the security base who in turn can scroll through the camera images to determine whether the alarm is a true or false alarm. In this manner, various existing systems that are provided in the vehicle may be optionally used individually to provide one or more functions or collectively to provide even further or enhanced functions.

Examples of camera locations where vehicular cameras included in a vehicular camera-based accident recording system can be located include interior and exterior mirror assembly locations, roof areas such as a headliner or header console, front, side and rear exterior body areas such as front grilles, rear doors/trunk areas, side doors, side panels, door handles, CHMSL units, interior body pillars (such as an A-, B- or C-interior pillar) and seat backs, and such as are disclosed in commonly assigned U.S. provisional applications, Ser. No. 60/187,961, filed Mar. 9, 2000; Ser. No. 60/192,721, filed Mar. 27, 2000; and Ser. No. 60/186,520, filed Mar. 1, 2000; and in U.S. Pat. Nos. 5,877,897; 5,760,962; 5,959,367; 5,929,786; 5,949,331; 5,914,815; 5,786,772; 5,798,575; and 5,670,935; and U.S. patent application Ser. No. 09/304,201, filed May 3, 1999, now U.S. Pat. No. 6,124,886; Ser. No. 09/375,315, filed Aug. 16, 1999, now U.S. Pat. No. 6,175,164; Ser. No. 09/199,907, filed Nov. 25, 1998, now U.S. Pat. No. 6,717,610; Ser. No. 09/361,814, filed Jul. 27, 1999, now U.S. Pat. No. 6,201,642; Ser. No. 09/372,915, filed Aug. 12, 1999, now U.S. Pat. No. 6,396,397; Ser. No. 09/304,201, filed May 3, 1999, now U.S. Pat. No. 6,198,409; and Ser. No. 09/313,139, filed May 17, 1999, now U.S. Pat. No. 6,222,447, which are all commonly assigned to Donnelly Corporation of Holland, Mich. For example, a camera, preferably a solid-state CMOS video camera, can be located within the interior cabin of the vehicle (and preferably located at, on or within the interior rearview mirror assembly or at or in an A-pillar), and adapted to capture a surveillance image of the front and rear occupants of the vehicle. In this regard, locating the interior cabin surveillance camera at, on or within the interior rearview mirror assembly is preferred as this location provides the camera with a good rearward field of view that captures an image of all front and rear seat occupants. Preferably, the vehicle is also equipped with the in-vehicle portion of a wireless communication telematic system such as an ONSTAR™ or RESCU™ system, and the geographic location of the vehicle can also be established by a navigational system, such as an in-vehicle GPS system. Images of the interior vehicle cabin (including images of the various vehicle occupants) can be captured by the in-vehicle image capture device, preferably an interior mirror-mounted video camera, and this information, in conjunction with the geographic location of the vehicle provided by a position locator such as a GPS system, along with various vehicle information/function data such as the state of activation of any air bag in the vehicle, can be communicated by wireless telecommunication to an external service remote from the vehicle such as an ONSTAR™ or RESCU™ service. Such communication can be periodic (such as when the ignition is first turned on during a particular trip, or initially when the ignition is first turned on and intermittently thereafter, such as every about 1 minute or so) or continuous during operation of the vehicle with its engine turned on. Should the receiver at the remote service be alerted that an accident has occurred (such as by receiving from the vehicle via wireless telematic communication an accident alert signal indicative that an air bag has activated), the remote receiver (which can be an ONSTAR™ operator or an automatic computer-based image analyzer or an emergency service such as a "911" service provider) can count, via the video imaged relayed from the vehicle, the number of occupants in the vehicle and can accordingly alert emergency services as to the location of the accident and the number of victims involved (thus ensuring that the appropriate number of, for example, ambulances are dispatched to deal with the actual number of potential victims in the vehicle at the time of the crash). Optionally, the owner/driver of the vehicle can register/notify the remote telematic service of any special medical needs, blood types and the likes of the likely driver(s) and/or likely occupants (such as family members) along with any next-of-kin information, insurance coverage and the like so that, in the event the like of an ONSTAR™ or RESCU™ telematic service or telematically-linked "911" emergency response service determines an accident has occurred, medical and emergency relief specific to the likely/actual occupants of the vehicle can be dispatched. Likewise, should an in-vehicle fire be detected such as by visual determination via image analysis of video images telematically transmitted and/or by an in-vehicle temperature probe transmitting data telematically, then the fire brigade can be automatically sent to the crash site and/or an in-vehicle fire extinguisher can be activated to put out any fire (either by remote, wireless activation by the telematic service of the in-vehicle fire extinguisher or by automatic in-vehicle image analysis of the image recorded by an interior or exterior camera of the vehicle that, upon in-vehicle image analysis determining that a fire has occurred in the vehicle, causes a vehicular on-board fire extinguisher to actuate to put out the fire). Also, either remotely or via in-vehicle image analysis, the engine of the vehicle can be turned off after an accident has been detected via the vehicular camera system.

A variety of other electrical and electronic features can be incorporated into the assemblies, such as those disclosed in U.S. patent application Ser. No. 09/433,467, filed Nov., 4, 1999, now U.S. Pat. No. 6,326,613, commonly assigned to Donnelly Corporation. For example, a microphone or a plurality of microphones may be incorporated, preferably to provide hands-free input to a wireless telecommunication system such as the ONSTAR™ system in use in General Motors vehicles. Most preferably, such microphones provide input to an audio system that transmits and communicates wirelessly with a remote transceiver, preferably in voice recognition mode. Such systems are described in U.S. patent application Ser. No. 09/382,720, filed Aug. 25, 1999, now U.S. Pat. No. 6,243,003.

In this regard it may be desirable to use audio processing techniques, such as digital sound processing, to ensure that vocal inputs to the vehicular audio system are clearly distinguished from cabin ambient noise such as from wind noise, HVAC, and the like. Digital sound processing techniques, as known in the acoustics arts and such as are disclosed in U.S. Pat. No. 4,959,865, entitled A METHOD FOR INDICATING THE PRESENCE OF SPEECH IN AN AUDIO SIGNAL, issued Sep. 25, 1990, to Stettiner et al., are particularly useful to enhance clarity of vocal signal detection when a single microphone is used, located in the interior mirror assembly such as in the mirror casing that houses the interior minor reflective element, as part of a vehicular wireless communication system such as General Motors' ONSTAR™ system. Use of digital signal processing and a single mirror-mounted microphone (such as is described in U.S. patent application Ser. No. 09/396,179, filed Sep. 14, 1999, now U.S. Pat. No. 6,278,377) is particularly advantageous for economical achievement of clear and error-free transmission from the vehicle, while operating along a highway, to a remote receiver, particularly in speech-recognition mode. Although advantageous with a single mirror-mounted microphone (or for a microphone mounted elsewhere in the vehicle cabin such as in the header region or in an accessory module assembly such as a windshield electronics module assembly), digital sound processing is also beneficial when multiple microphones are used, and preferably when at least two and more preferably at least four microphones are used.

As previously described, connection and communication between the video displays and/or the cameras and/or other electronic accessories can be by wired connection (including multi-element cables, wired multiplex links and fiber-optic cables) and/or by wireless connection/communication (such as by infrared communication and/or by radio frequency communication such as via BLUETOOTH, described below).

For example, the video displays may include a display of the speed limit applicable to the location where the vehicle is travelling. Conventionally, speed limits are posted as a fixed limit (for example, 45 MPH) that is read by the vehicle driver upon passing a sign. As an improvement to this, an information display (preferably an alphanumerical display and, more preferably, a reconfigurable display) can be provided within the vehicle cabin, and preferably displayed by a video display, and readable by the driver, that displays the speed limit at whatever location on the road/highway the vehicle actually is at any moment. For example, existing speed limit signs could be enhanced to include a transmitter that broadcasts a local speed limit signal, such signal being received by an in-vehicle receiver and displayed to the driver. The speed limit signal can be transmitted by a variety of wireless transmission methods, such as radio transmission, and such systems can benefit from wireless transmission protocols and standards, such as the BLUETOOTH low-cost, low-power radio based cable replacement or wireless link based on short-range radio-based technology. BLUETOOTH enables creation of a short-range (typically 30 feet or so although longer and shorter ranges are possible), wireless personal area network via small radio transmitters built into various devices. For example, transmission can be on a 2.45 gigahertz band, moving data at about 721 kilobits per second, or faster. BLUETOOTH, and similar systems, allow creation of an in-vehicle area network. Conventionally, features and accessories in the vehicle are wired together. Thus, for example, an interior electrochromic mirror and an exterior electrochromic mirror is connected by at least one wire in order to transmit control signal and the like. With BLUETOOTH and similar systems such as the IEEE 802.11a protocol which is a wireless local area network standard that preferably uses a 5 GigaHertz frequency band and with a data transfer rate of at least about 10 Mb/sec and more preferably at least about 30 Mb/sec, control commands can be broadcast between the interior minor and the exterior mirror (and vice versa) or between a camera capturing an image in a horse box (or any other towed trailer) being towed by a vehicle and a video display located at the windshield or at the interior rearview mirror or at or adjacent to an A-pillar of that vehicle that is viewable by the vehicle driver without the need for physical wiring interconnecting the two. Likewise, for example, the two exterior minor assemblies on the vehicle can exchange, transmit and/or receive control commands/signals (such as of memory position or the like such as is described in U.S. Pat. No. 5,798,575) via an in-vehicle short-range radio local network such as BLUETOOTH. Similarly, tire pressure sensors in the wheels can transmit via BLUETOOTH to a receiver in the interior minor assembly, and tire pressure status (such as described in U.S. patent application Ser. No. 09/513,941, filed Feb. 28, 2000, now U.S. Pat. No. 6,294,989) can be displayed, preferably at the interior rearview mirror. In the case of the dynamic speed limit system described above, preferably, the in-vehicle receiver is located at and/or the display of local speed limit is displayed at the interior mirror assembly (for example, a speed limit display can be located in a chin or eyebrow portion of the minor case, such as in the mirror reflector itself, or such as in a pod attached to the interior minor assembly), or can be displayed on any video display. More preferably, the actual speed of the vehicle can be displayed simultaneously with and beside the local speed limit in-vehicle display and/or the difference or excess thereto can be displayed. Optionally, the wireless-based speed limit transmission system can actually control the speed at which a subject vehicle travels in a certain location (such as by controlling an engine governor or the like) and thereby provide a vehicle speed control function. Thus, for example, a school zone speed limit can be enforced by transmission of a speed-limiting signal into the vehicle. Likewise, different classes of vehicles can be set for different speed limits for the same stretch of highway. The system may also require driver identification and then set individual speed limits for individual drivers reflecting their skill level, age, driving record and the like. Moreover, a global positioning system (GPS) can be used to locate a specific vehicle, calculate its velocity on the highway, verify what the allowed speed limit is at that specific moment on that specific stretch of highway, transmit that specific speed limit to the vehicle for display (preferably at the interior rearview mirror that the driver constantly looks at as part of the driving task) and optionally alert the driver or retard the driver's ability to exceed the speed limit as deemed appropriate. A short-range, local communication system such as envisaged in the BLUETOOTH protocol finds broad utility in vehicular applications, and particularly where information is to be displayed at the interior minor assembly or on a video display, or where a microphone or user-interface (such as buttons to connect/interact with a remote wireless receiver) is to be located at the interior (or exterior) rearview mirror assembly. For example, a train approaching a railway crossing may transmit a wireless signal such as a radio signal (using the BLUETOOTH protocol or another protocol) and that signal may be received by and/or displayed at the interior rearview minor assembly (or the exterior side view minor assembly) or a video display. Also, the interior rearview minor and/or the exterior side view minors and/or any video display can function as transceivers/display locations/interface locations for intelligent vehicle highway systems, using protocols such as the BLUETOOTH protocol. Protocols such as BLUETOOTH and the IEEE 802.11a wireless local area network standard that preferably uses a 5 GigaHertz frequency band and with a data transfer rate of at least about 10 Mb/sec and more preferably at least about 30 Mb/sec, as known in the telecommunications art, can facilitate voice/data, voice over data, digital and analog communication and vehicle/external wireless connectivity, preferably using the interior and/or exterior mirror assemblies as transceiver/display/user-interaction sites. Electronic accessories to achieve the above can be accommodated in any of the video displays/video mirrors/camera assemblies, and/or in the interior minor assembly (such as in the housing disclosed in U.S. patent application Ser. No. 09/433,467, filed Nov. 4, 1999, now U.S. Pat. No. 6,326,613).

Furthermore, information displays may be incorporated which provide information to the driver or occupants of the vehicle, such as warnings relating to the status of the passenger airbag or a train approaching warning. Such a train approaching warning system alerts the driver of the vehicle of the eminent arrival of a train at a railroad crossing. Such a warning system can activate audible and/or visual alarms in the vehicle if a train is approaching. Such train warning displays may override any existing displays so that the driver is fully alert to any potential hazard. One suitable train control system is described in U.S. patent application Ser. No. 09/561,023, filed Apr. 28, 2000, now U.S. Pat. No. 6,553,308. Vehicle to road-side communication antennas can be attached to railroad signs, crossing barriers, and the like and can transmit to antennas mounted in the vehicle located such as within the interior rearview mirror of the vehicle or within an interior cabin trim item or side exterior rearview mirror assembly. One such track side communication system is available from Dynamic Vehicle Safety Systems of Amarillo, Tex., which detects signals from trains approaching a crossing and transmits these signals along the road to forewarn of a railroad crossing ahead.

In commonly assigned application Ser. No. 09/244,726, filed Feb. 5, 1999, now U.S. Pat. No. 6,172,613, information displays are provided which include information relating to vehicle or engine status, warning information, and the like such as information relating to oil pressure, fuel remaining, time, temperature, compass headings for vehicle direction, and the like. The passenger side air bag on/off signal may be derived from various types of seat occupancy detectors such as by video surveillance of the passenger seat as disclosed in commonly assigned PCT Application No. PCT/US94/01954, filed Feb. 25, 1994, published Sep. 1, 2004 as PCT Publication No. WO/1994/019212, or by ultrasonic or sonar detection, infrared sensing, pyrodetection, weight detection, or the like. Alternately, enablement/displayment of the passenger side air bag operation can be controlled manually such as through a user operated switch operated with the ignition key of the vehicle in which the assembly is mounted as described in commonly assigned U.S. patent application Ser. No. 08/799,734, filed Feb. 12, 1997, now U.S. Pat. No. 5,786,772.

In addition, the interior rearview mirror assembly may include a blind spot detection system, such as the type disclosed in U.S. patent application Ser. No. 08/799,734, filed Feb. 12, 1997, now U.S. Pat. No. 5,786,772, or rain sensor systems, for example rain sensor systems which include windshield contacting rain sensors, such as described in U.S. Pat. No. 4,973,844 or non-windshield contacting rain sensors, such as described in PCT International Application PCT/US94/05093, published as WO 94/27262 on Nov. 24, 1994.

The interior rearview mirror assembly may also incorporate one or more user actuatable buttons or the like for activating the various accessories housed in the assembly, for example an ONSTAR system, HOMELINK® system, a remote transaction system, or the like. For example, one or more user actuatable buttons may be mounted at the chin area or eyebrow area for actuating, for example a video screen, or for selecting or scrolling between displays or for activating, for example, a light, including a map light which may be incorporated into the minor casing. Furthermore, a dimming switch may be incorporated into the casing to provide adjustment to the brightness of the video screen.

Also, a single high-intensity power LED may comprise a single LED light source in a compact package or as an individual chip or circuit element (and with a diagonal size less than about 14 mm diagonal cross-sectional dimension when viewed from the light emitting side; more preferably less than about 8 mm; and most preferably, less than about 5 mm) that illuminates to emit a light beam when (powered at about 25 degrees Celsius or thereabouts) at least about 100 milliamps passes (i.e., conducts) through the LED element (more preferably when at least about 225 milliamps passes through the LED element and most preferably when at least 300 milliamps passes through the LED element), and with a luminous efficiency of at least about 1 lumen/watt, more preferably at least about 3 lumens/watt, and most preferably at least about 7 lumens/watt. Such high-intensity power LEDs, when normally operating, emit a luminous flux of at least about 1 lumen, more preferably at least about 5 lumens and most preferably at least about 10 lumens. For certain applications such as ground illumination from lighted exterior minor assemblies and interior minor map lights, such high-intensity LEDs preferably conduct at least about 250 milliamps forward current when operated at a voltage in the about 2 volts to about 5 volts range, and emit a luminous flux of at least about 10 lumens, more preferably at least about 15 lumens, even more preferably at least about 20 lumens, and most preferably at least about 25 lumens, preferably emitting white light.

Single high-intensity power LEDs suitable to use include high-intensity, high-current capability light emitting diodes such as the high-flux LEDs available from LumiLeds Lighting, U.S., LLC of San Jose, Calif. under the SunPower Series High-Flux LED tradename. Such high-intensity power LEDs comprise a power package allowing high-current operation of at least about 100 milliamps forward current, more preferably at least about 250 milliamps forward current, and most preferably at least about 350 milliamps forward current, through a single LED. Such high-current/high-intensity power LEDs (as high as 500 mA or more current possible, and especially with use of heat sinks) are capable of delivering a luminous efficiency of at least about 1 lumen per watt, more preferably at least about 3 lumens per watt, and most preferably at least about 5 lumens per watt. Such high-intensity LEDs are available in blue, green, blue-green, red, amber, yellow and white light emitting forms, as well as other colors. Such high-intensity LEDs can provide a wide-angle radiation pattern, such as an about 30 degree to an about 160 degree cone. Typically, such high-intensity LEDs are fabricated using Indium Gallium Nitride technology. To assist heat dissipation and maintain the LED junction below about 130° Celsius (and more preferably below about 100° Celsius and most preferably below about 70° Celsius), a heat sink can be used. Preferably, such a heat sink comprises a metal heat dissipater (such as an aluminum metal heat sink) with a surface area dissipating heat of at least about 1 square inch, more preferably of at least about 2.5 square inches, and most preferably of at least about 3.5 square inches. When used as, for example, a map light assembly mounted in an interior rearview mirror assembly (such as in the minor housing or in a pod attaching to the mirror mount to the vehicle), a single high-intensity power LED (for example, a single white light emitting LED passing about 350 mA and emitting light, and preferably white light or any other color, with a luminous efficiency of at least about 3 lumens per watt, and with a light pattern of about 120° or so) can be combined with a reflector element and a lens to form a high-intensity power LED interior light module capable of directing an intense light beam of light from an interior minor assembly mounted to a windshield or header region of the vehicle to the lap area of a driver or a front-seat passenger in order to allow a reading function such as a map reading function and/or to provide courtesy or theatre lighting within the vehicle cabin. Also, a single high-intensity power LED (for example, a single white light emitting LED or a red light emitting or any other colored light emitting diode passing about 350 mA and emitting light, preferably white light or any other color, with a luminous efficiency of at least about 3 lumens per watt, and with a light pattern of about 120° or so) can be combined with a reflector element and a lens to form a high-intensity LED security light module capable of directing an intense light beam of light (or any other color) from an exterior mirror assembly to illuminate the ground adjacent an entry door of the vehicle in order to provide a security lighting function. Also, a single high-intensity power LED (for example, a single white light emitting LED or a red light emitting or any other colored light emitting diode passing about 350 mA and emitting white light with a luminous efficiency of at least about 3 lumens per watt, and with a light pattern of about 120° or so) can be combined with a reflector element and a lens (and optionally with high-intensity and/or conventional near-IR light emitting diodes), and be used in conjunction with a reversing or forward parking camera mounted on the exterior of a vehicle (such as at a license plate holder) in order to provide illumination for the, for example, reverse-aid camera when reversing at night.

For applications such as ground illumination from exterior mirror assemblies and map/reading lighting from interior minor assemblies or from windshield-mounted accessory modules such as windshield electronic modules or for ground illumination/camera-field-of-view illumination in association with video-based reverse-aids systems or park-aid systems or tow hitch-aid systems, it is preferable to use a single high-intensity power LED source having a luminous efficiency of at least about 7 lumens/watt; more preferably at least about 15 lumens/watt; and most preferably at least about 20 lumens/watt, with such single high efficiency power LED light source preferably being provided in a module that includes a heat sink/heat dissipater and most preferably, that further includes a power regulator such as a series power resistor and most preferably, a DC to DC voltage converter. Such high efficiency power LEDs are available from LumiLeds Lighting, U.S., LLC of San Jose, Calif. under the SunPower Series High-Flux LED tradename, for example.

Also, a video display element or screen can be used (such as an LCD display or an emitting display element such as a multi-pixel electroluminescent display or field emission display or light emitting diode display (organic or inorganic)) disposed within the minor housing of the interior minor assembly of the vehicle, and located behind the mirror reflective element in the minor housing, and configured so that the image displayed by the video display element is visible to the driver by viewing through the mirror reflective element. Preferably, and such as is disclosed in U.S. utility patent application Ser. No. 09/793,002, filed Feb. 26, 2001, now U.S. Pat. No. 6,690,268, the mirror reflective element (behind which the video display screen is disposed so that the image displayed is visible by viewing through the minor reflective element) of the interior minor assembly preferably comprises a transflective mirror reflector such that the minor reflective element is significantly transmitting to visible light incident from its rear (i.e. the portion furthest from the driver in the vehicle), with at least about 15% transmission preferred, at least about 20% transmission more preferred and at least about 25% transmission most preferred, while simultaneously, the minor reflective element is substantially reflective to visible light incident from its front (i.e. the position closest to the driver when the interior mirror assembly is mounted in the vehicle), with at least about 60% reflectance preferred, at least about 70% reflectance more preferred and at least about 75% reflectance most preferred. Preferably a transflective electrochromic reflective mirror element is used (such as is disclosed in U.S. utility patent application Ser. No. 09/793,002, filed Feb. 26, 2001, now U.S. Pat. No. 6,690,268, and in U.S. Pat. Nos. 5,668,663; 5,724,187) that comprises an electrochromic medium sandwiched between two substrates. The front (i.e. closest to the driver when the interior minor assembly is mounted in the vehicle) substrate preferably comprises a glass substrate having a transparent electronic conductive coating (such as indium tin oxide or doped tin oxide) on its inner surface (and contacting the electrochromic medium). More preferably, the front substrate of the twin-substrate electrochromic cell that sandwiches the electrochromic medium comprises a glass substrate having a thickness of about 1.6 millimeters or less; most preferably, about 1.1 millimeters or less. The rear (i.e. furthest from the driver when the interior minor assembly is mounted in the vehicle) substrate preferably comprises a glass substrate having a transflective mirror reflector on the surface thereof that the electrochromic medium contacts (such a configuration being referred to as a "third-surface" reflector in the electrochromic minor art). For example, the minor reflector can comprise a transparent semiconductor/metal conductor/transparent semiconductor multilayer stack such an indium tin oxide/silver/indium tin oxide stack (for example, a third-surface electrochromic mirror reflective element can be used comprising a front substrate comprising an about 1.1 mm thick glass substrate having a half-wave ITO coating of about 12 ohms/square sheet resistance on its inner surface; a rear substrate comprising an about 1.6 mm thick glass substrate having a transflective minor reflector thereon comprising an about 350 angstrom thick silver metal layer sandwiched between an about 800 angstrom thick indium thin oxide transparent semiconductor layer and another about 800 angstrom thick indium thin oxide transparent semiconductor layer; and with an electrochromic solid polymer matrix medium such as is disclosed in U.S. Pat. No. 6,245,262 disposed between the transflective mirror reflector of the rear substrate and the half-wave indium tin oxide layer of the front substrate. Visible light reflectivity of the transflective electrochromic minor element is about 60-65%; transmission is about 20-25%. With a TFT LCD video display disposed behind the rear substrate of such a third-surface transflective electrochromic minor reflective element in a "display-on-demand" configuration, the presence of (and image displayed by) the video display screen is only principally visible to the driver (who views through the transflective mirror reflective element) when the video display element is powered so as to project light from the rear of the mirror reflective element).

Also, and as disclosed in U.S. utility patent application Ser. No. 09/793,002, filed Feb. 26, 2001, now U.S. Pat. No. 6,690, 268, incorporated above, an image on the screen includes a video view rearward of the vehicle, and also preferably includes electronically generated indicia overlaying the video image on the video screen and indicating the distance of detected objects (such as via a graphic display or via an alphanumeric display in feet/inches) and/or highlighting of obstacles/objects that a reversing vehicle is in jeopardy of colliding with (such as a child or a barrier). For example, red highlighting can be used, or a screen portion can strobe/flash to draw the driver's attention to an object in the screen. Also, the control can provide an audible output signal to a speaker that audibly alerts the driver that the vehicle is reversing closer and closer to a rear-situated object. The combination of a video reverse-aid system with an audible reverse-aid system based off an object detection system such as an ultrasonic obstacle detection system is a significant advance over reversing systems known to date, and particularly with distance or similar graphics overlaying the video image of the rearward scene.

Also, any of the video screens of the above embodiments, and such as disclosed in U.S. utility patent application Ser. No. 09/793,002, filed Feb. 26, 2001, now U.S. Pat. No. 6,690,268, can display the image output by a forward facing image capture device (preferably positioned to capture a video image of the ground surface/objects/persons immediately in front of the vehicle, most preferably encompassing an area that encompasses substantially the entire front fender width of the vehicle) and/or can display the image output by a rearward facing image capture device positioned to capture a video image of the ground surface/objects/persons immediately to the rear of the vehicle, most preferably encompassing an area that encompasses substantially the entire rear fender width of the vehicle. Preferably, a graphic overlay with indicia of forward or backup travel, such as disclosed in U.S. patent application Ser. No. 09/313,139 filed May 19, 1999, now U.S. Pat. No. 6,222,447, in U.S. patent application Ser. No. 09/776,625, filed Feb. 5, 2001, now U.S. Pat. No. 6,611,202, and in U.S. Pat. No. 5,949,331. For example, the intended path of travel and/or a distance grid can be electronically superimposed upon the video image from a reverse-aid camera as displayed on any screen of the above video mirrors, video display assemblies and accessory modules.

It is further envisioned that the control may provide a warning or alert to the driver of the vehicle when the actual geographic position of the vehicle (as provided by the global positioning system of the vehicle) is not where it should be based on the instructions received from the remote service center. For example, the control may instruct the driver to turn around or otherwise get back onto the given route, or the control may instruct the driver to contact the service center to obtain updated directions based on the new position of the vehicle. This may be done if, for example, the geographic position of the vehicle is outside of a predetermined or threshold range or distance of the next location or waypoint, or if the geographic position of the vehicle is past the location or waypoint. Optionally, the control may provide audible chirps or other audible signal or the like delivered by a speaker to alert the driver when approaching a turn or to indicate to the driver that the driver has missed a turn.

The control may also be operable to continuously monitor the actual geographic position of the vehicle and compare to the locations or waypoints associated with the instructions even after the vehicle has strayed from the given route. As discussed above, the control may provide instructions to turn around to get back on the given route. However, if the vehicle continues along a different path (such as in situations where the driver gets lost and attempts to find a way back to the given route, or where the driver may take an alternate route, such as an alternate route known to the driver or a detour or the like), but eventually arrives at one of the geographic locations or waypoints associated with the downloaded instructions, the control may be operable to recognize that the vehicle is back on the given route and resume communicating/displaying the appropriate instructions to the driver to direct the driver to the targeted destination.

During operation, as the driver is driving the vehicle, the driver may access or contact a service center via the telematics system 18 of the vehicle, such as ONSTAR®, TELEAID™, RESCU® or the like, depending on the type of vehicle, and request driving directions to a particular desired destination or targeted location. The operator or service center may provide the directions to the desired destination from the known position of the vehicle (which may be provided by the driver to the service center or may be known by the service center in response to the global positioning system of the vehicle). Preferably, the service center communicates the directions and downloads the directions to a storage location or control of the vehicle. The directions or instructions are electronically or digitally or otherwise coded or tagged or otherwise associated with or linked to a particular geographic location or waypoint either by the remote service center or by the control. The control is then operable to provide the directions in sections or parts or steps, with each separate, particular step or instruction being provided to the driver in response to the current geographic position of the vehicle (based on a signal from the global positioning system of the vehicle) generally corresponding to a particular geographic location or waypoint associated with the particular step or instruction. For example, a step may be provided in response to the vehicle completing a previous step of the directions, and/or may be provided in response to the vehicle approaching (such as the vehicle being within a threshold distance of) the street, intersection, location or the like at which the next step or turn is to be performed, without affecting the scope of the present invention.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The instructions may be downloaded to a storage or memory location or system of the vehicle during a brief communication or connection with the remote service center, so that the driver does not have to remain connected with the remote service center or repeatedly contact the service center to receive updated instructions as the driver drives the vehicle toward the targeted destination. The downloaded instructions are only the local instructions and thus do not require an excessive amount of time to download nor do they require an excessive amount of storage space or memory on the control. Thus, the remote service center, operator, computerized system or the like maintains the detailed maps and directories, and feeds back or downloads wirelessly to the vehicle the local information or map for communication or display to the driver of the vehicle for directional guidance information.

Optionally, the telematics system or communication link or other system may be operable to download data, such as via ONSTAR® or other communication system, or via a global positioning system or the like, to the vehicle or to a control or system or accessory of the vehicle. The data may be used to adjust an accessory or system of the vehicle or to set the accessory or system of the vehicle to a desired or appropriate setting in response to the data and/or in response to other vehicle or driver characteristics or status.

For example, data pertaining to the location of the vehicle, the time of day, the date, weather conditions and/or driving conditions may be provided to the vehicle for use in adjustment of an accessory or system of the vehicle. For example, such data may be used by a seat adjustment system, such that adjustment of the driver or passenger seat of the vehicle may be made in response to changes in such data. This may be beneficial because, for example, during long journeys, the seat adjustment or position at the start of the journey may not be comfortable or appropriate later on in the long journey. The seat adjustment system of the present invention thus may be operable to adjust the seat position or lumbar support or the like (and the mirror position or positions may also be adjusted accordingly) in response to various conditions, such as the length of the journey, altitude of the vehicle, driving conditions and/or the like. The seat adjustment system thus may make dynamic adjustments of the seat or seats to keep the driver or occupants of the vehicle comfortable or alert.

Optionally, it is envisioned that the seats of the vehicle may have a massage capability. In such applications, the seat adjustment system or seat control system may detect that the vehicle is on a long journey, and may activate the massage function to enhance the comfort to the driver of the vehicle. Such an adjustment or control may also be enabled if rural highway conditions are detected or other driving conditions where such a feature may be desired. It is further envisioned that the seat adjustment or control system may be programmable, such that a particular driver or occupant may indicate what changes he or she may desire in certain conditions. The seat adjustment system may then automatically activate such features or changes when the specified conditions are detected.

Optionally, the adjustment may also or otherwise be made in response to biometric data about the driver or occupant that is presently occupying the seat. It is known to use body measurements to order clothing tailored to the body measurements. Many catalogue clothing companies are now taking body scan measurements to order clothing on line. These measurements ensure a substantially perfect fit of the ordered clothing. Such body scan measurements or data or other such biometric data may be entered into the vehicle seat adjustment system, or may be communicated to the vehicle seat adjustment system, such as via the telematics system or other communication system or data system or the like. The seat adjustment system may then adjust the seat (and the mirrors may be adjusted as well) in response to detection of a particular person and/or their biometric characteristics or data.

Figure 3:
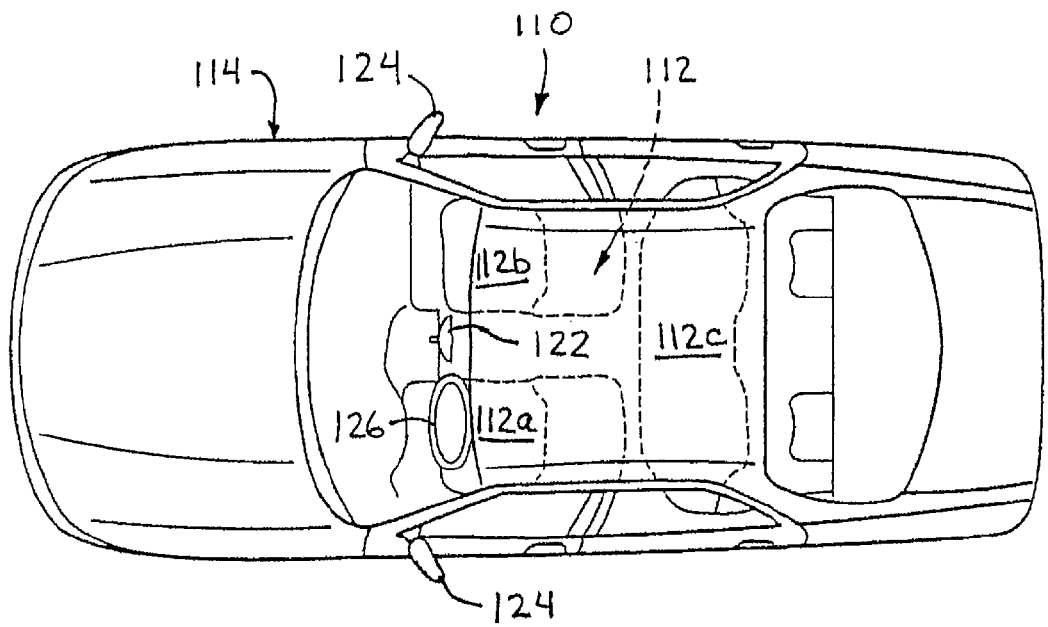
FIG. 3 is a top plan view of a vehicle incorporating a seat adjustment system in accordance with the present invention.
Figure 4:
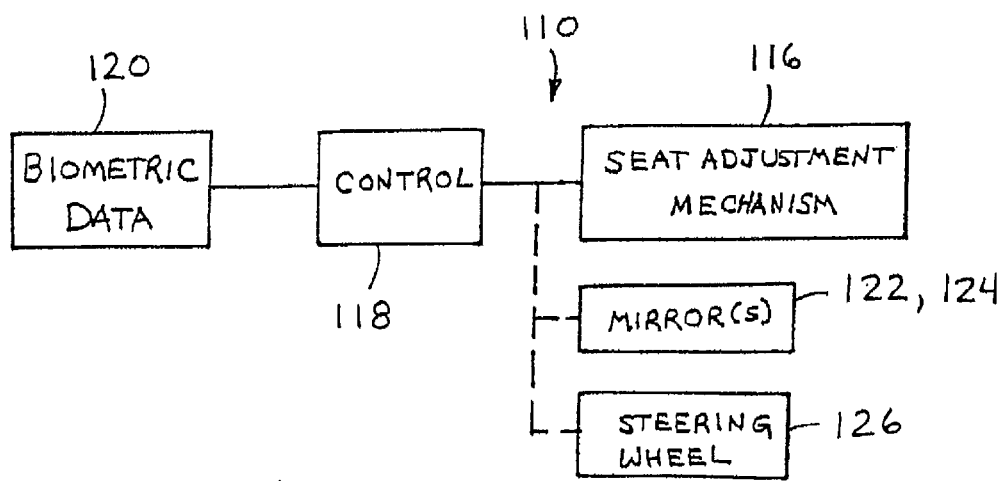
FIG. 4 is a block diagram of a seat adjustment system in accordance with the present invention.

Referring now FIGS. 3 and 4, a biometric seat adjustment system 110 is operable to adjust the seats 112 of a vehicle 114. The biometric seat adjustment system 110 may adjust a driver seat 112a, a front passenger seat 112b, and/or one or more rear passenger seats 112c via a powered seat adjustment mechanism 116 (FIG. 4) at the respective seats in response to biometric data or information pertaining to a person that may be sitting in or may be about to sit in one of the vehicle seats. As shown in FIG. 4, biometric seat adjustment system 110 includes a control 118, which may store biometric data 120 in a memory and/or may receive biometric data 120 from a remote source or an input device or communication (not shown). Control 118 is operable to control or adjust the seat adjustment mechanism 116 to adjust the seats 112 of the vehicle (such as lumbar support, seat travel, seat height, etc.) in response to the stored biometric data and/or input. For example, a person may have their biometric data or characteristics stored in a memory of control 118, and may select a particular code or setting corresponding to their data (such as "position 1" of the seat adjustment system), whereby control 118 adjusts the adjustment mechanism of the particular selected seat in response to the data. Alternately, a person may have their biometric data or characteristics stored in a portable device (such as a key fob, PDA, or the like) or at a remote location or device, and may have the biometric data or characteristic communicated to the control 118, whereby control 118 may adjust the adjustment mechanism of the particular selected seat in response to the communication. The control 118 may also be operable to control or adjust a setting of an interior rearview minor 122, an exterior rearview mirror or minors 124, a steering wheel 126 and/or the like in response to the input or communication.

The present invention thus provides a vehicle seat adjustment in response to biometric data, such as various body dimensions, weight, sex, age and the like. Such body dimension measurements, such as those taken for ordering clothing, may be made on a person and may be contained in the person's computer or the like, along with other biometric data or characteristics of the person (and optionally may include preferences of the person). These data may be loaded into the vehicle computer and/or seat adjustment system. The seat adjustment system receives the data and may be operable to pre-adjust the driver seat (or passenger seat or other seat) of the vehicle in response to the data so that the seat that the person will sit in is set to the person's precise body measurements and other data. Additionally, the adjustment system may pre-adjust an interior rearview minor, exterior rearview minor or mirrors, steering wheel and/or the like in response to the measurements or inputs.

The body dimensions may be saved in a person's computer or PDA, such as done for ordering clothing. Such measurement and saving technology now exists and is used by some catalogues, such as Lands' End and/or Levi (which provides for measurements in their stores and these measurements are stored in the person's file for ordering perfect fit jeans). Alternately, a vehicle dealer may perform simple measurements on a person (like a tailor with a new suit). This information may then be used to adjust the seat in the person's vehicle to the person's body size, weight, age, sex, etc. For example, the vehicle dealer may download the information or data for a person or person's (such as a driver and their spouse) into memory positions 1 and 2 of a vehicle seat adjustment memory of the person's vehicle. Optionally, the data may be downloaded into a Bluetooth (or other communication protocol) enabled phone, PDA or key fob, which may then be used to communicate the data to the targeted vehicle. Such an approach would be particularly suitable for and advantageous to use with rental cars.

The biometric seat adjustment system preferably utilizes the normal memory seat adjustment system or mechanisms currently in some vehicles, such as high end vehicles. While the seats today can be adjusted to a person's particular preferences, it is likely that most people take awhile to get themselves comfortable. By using a few body dimensions and the person's weight (and maybe other information or characteristics as well), the present invention may set the seat or seats substantially perfectly before or when the person or persons first get into the vehicle.

It is envisioned that the biometric data measurement event may occur in the vehicle (such as by an in-vehicle laser or similar scanners and/or cameras that measure the driver's and/or passengers' biometric dimensions). Alternately, the biometric data may be measured external to the vehicle (such as at a dealership "booth" when the driver is ordering and/or receiving delivery of the vehicle or at a biometric measurement booth at a Mall or other store or facility or the like) and may be provided to the vehicle in a manner such as described above and/or via, for example, an ONSTAR® telematics service or via a similar telecommunication system or event or the like.

It is further envisioned that more than the seat or seats (lumbar support/seat travel/seat height etc.) may be adjusted in response to the individual biometric data stored in or communicated to the vehicle memory system. For example, exterior and/or interior minor reflective elements may be moved or adjusted in response to such stored or input biometrics data, which may be called up or loaded when that particular individual sits in one of the seats of the vehicle. Additionally, other accessories or systems of the vehicle may be adjusted or customized, such as suspension characteristics; steering column tilt; size of display characters (for example, older drivers may desire larger alphanumerical display digits); and/or the like, in response to the biometric data of a particular individual.

Therefore, the present invention provides a navigation system which is operable to provide step-by-step instructions to a targeted destination to a driver of a vehicle while the driver is driving the vehicle toward the targeted destination. The instructions are downloaded from a remote database at a remote service center or the like via a telematics system or wireless communication system of the vehicle. The instructions may then be provided to the driver only as needed by the driver, since they are coded or associated with or linked to particular geographic locations or waypoints, thereby simplifying the instructions so that the driver will be able to understand each step and execute the step accordingly. The present invention may also provide a seat adjustment function that automatically adjusts the seat of the vehicle in response to data communicated to the vehicle via a telematics system or a global positioning system or the like. The seat adjustment system or function may be operable to adjust the seat of the vehicle in response to biometric data of the person occupying the seat. The interior and/or exterior rearview mirrors may also be adjusted in response to the data or seat adjustments.

Changes and modifications in the specifically described embodiments may be carried out without departing from the principles of the present invention, which is intended to be limited The embodiments of the invention in which an exclusive property is claimed are defined as only by the scope of the appended claims as interpreted according to the principles of patent law.

The embodiments of the invention in which an exclusive property or privilege is claimed are defined as follows:

1. A driver assist system for a vehicle, said driver assist system comprising:
    a rearward facing camera disposed at a vehicle equipped with said driver assist system and having a rearward field of view relative to the equipped vehicle;
    a video display viewable by a driver of the equipped vehicle when normally operating the equipped vehicle, wherein said video display is operable to display image data captured by said rearward facing camera;
    wherein said driver assist system is operable to detect objects present in said rearward field of view of said rearward facing camera;
    wherein said driver assist system is operable to provide a display intensity of said displayed image data of at least about 200 candelas/sq. meter for viewing by the driver of the equipped vehicle;
    wherein said driver assist system is operable to provide a visual alert to the driver of the equipped vehicle responsive to detection of an object rearward of the equipped vehicle during a reversing maneuver of the equipped vehicle;
    wherein said driver assist system is operable to provide an audible alert to the driver of the equipped vehicle responsive to detection of an object rearward of the equipped vehicle during a reversing maneuver of the equipped vehicle; and
    wherein said visual alert comprises electronically generated indicia that overlay said image data displayed by said video display, and wherein said electronically generated indicia at least one of (i) indicate distance to a detected object rearward of the equipped vehicle and (ii) highlight a detected object rearward of the equipped vehicle.

2. The driver assist system of claim 1, wherein said electronically generated indicia indicate distance to a detected object rearward of the equipped vehicle.

3. The driver assist system of claim 2, wherein said electronically generated indicia comprise at least one of (i) a graphic display, (ii) an alphanumeric display and (iii) a distance grid.

4. The driver assist system of claim 2, wherein said electronically generated indicia are indicative of an intended path of rearward travel of the equipped vehicle.

5. The driver assist system of claim 1, wherein said electronically generated indicia highlight a detected object rearward of the equipped vehicle.

6. The driver assist system of claim 5, wherein said electronically generated indicia highlight a detected object that the equipped vehicle is in jeopardy of colliding with during the reversing maneuver.

7. The driver assist system of claim 5, wherein said electronically generated indicia highlight a detected object by flashing a portion of said video display to draw the driver's attention to a detected object displayed by said video display.

8. The driver assist system of claim 5, wherein said highlighting is accompanied by said audible alert, said audible alert comprising an audible output of a speaker of the equipped vehicle that audibly alerts the driver that the equipped vehicle is reversing closer and closer to an object present in the reversing path of the equipped vehicle.

9. The driver assist system of claim 1, wherein, responsive to detection of an object, the driver's attention is drawn to an object displayed on said video display.

10. The driver assist system of claim 9, wherein said electronically generated indicia highlights the detected object to draw the driver's attention to the displayed object.

11. The driver assist system of claim 1, wherein said audible alert audibly alerts the driver of the equipped vehicle that the equipped vehicle is reversing closer and closer to an object present in the reversing path of the equipped vehicle.

12. The driver assist system of claim 11, wherein said audible alert comprises an audible output of a speaker of the equipped vehicle.

13. The driver assist system of claim 1, wherein said rearward facing camera is mounted at the rear of the equipped vehicle and wherein, during a reversing maneuver of the equipped vehicle, image data captured by said rearward facing camera is displayed by said video display as video images so as to assist the driver in reversing the equipped vehicle.

14. The driver assist system of claim 1, wherein detection of objects present in said rearward field of view of said rearward facing camera comprises non-visual object detection.

15. The driver assist system of claim 14, wherein said non-visual object detection comprises ultrasonic object detection.

16. The driver assist system of claim 14, wherein, responsive to detection of an object by said non-visual object detection, said audible alert audibly alerts the driver of the equipped vehicle that the equipped vehicle is reversing closer and closer to an object present in the reversing path of the equipped vehicle.

17. The driver assist system of claim 16, wherein said audible alert comprises an audible output of a speaker of the equipped vehicle.

18. The driver assist system of claim 1, wherein said video display is operable to display at least one of (i) an instruction, (ii) an icon, (iii) a character and (iv) a symbol.

19. The driver assist system of claim 1, wherein said video display comprises a TFT liquid crystal display screen backlit by a plurality of white light emitting light emitting diodes.

20. The driver assist system of claim 19, wherein at least some of said plurality of white light emitting light emitting diodes are operable to each individually pass at least about 100 milliamps forward current.

21. The driver assist system of claim 19, wherein said at least some of said plurality of white light emitting light emitting diodes are operable to each individually pass up to about 100 milliamps forward current.

22. The driver assist system of claim 1, comprising a human machine interface, said human machine interface comprising at least one user input.

23. The driver assist system of claim 22, wherein said at least one user input comprises at least one of a vocal input and a non-vocal input.

24. The driver assist system of claim 22, wherein said at least one user input comprises at least one of a keypad input and a touch sensitive input.

25. The driver assist system of claim 22, wherein said at least one user input comprises a touch sensitive input.

26. The driver assist system of claim 22, wherein at least one of (i) said at least one user input comprises at least one input for a telematics system of the equipped vehicle, (ii) said at least one user input comprises at least one input for a navigational system of the equipped vehicle, (iii) said at least one user input comprises at least one input for a navigation function of said driver assist system, (iv) said at least one user input comprises at least one input for a biometric system of the equipped vehicle and (v) said driver assist system controls operation of said video display responsive, at least in part, to said at least one user input.

27. The driver assist system of claim 1, wherein said video display is disposed at one of (i) a windshield electronics module of the equipped vehicle, (ii) an instrument panel of the equipped vehicle, (iii) a console of the equipped vehicle and (iv) an interior rearview mirror assembly of the equipped vehicle.

28. The driver assist system of claim 1, wherein said video display is disposed at an interior rearview minor assembly of the equipped vehicle and wherein a touch sensitive input is disposed at said interior rearview mirror assembly, and wherein said driver assist system controls operation of said video display responsive, at least in part, to said touch sensitive input.

29. The driver assist system of claim 1, wherein said driver assist system is operable to provide a display intensity of said displayed image data of at least about 300 candelas/sq. meter for viewing by the driver of the equipped vehicle.

30. The driver assist system of claim 1, wherein said driver assist system is operable to provide a display intensity of said displayed image data of at least about 400 candelas/sq. meter for viewing by the driver of the equipped vehicle.

31. The driver assist system of claim 1, comprising a control operable to control at least one accessory of the equipped vehicle in accordance with a characteristic of an occupant of the equipped vehicle, and wherein said at least one accessory comprises a seat adjustment system operable to adjust a seat of the equipped vehicle in accordance with a biometric characteristic of an occupant of the equipped vehicle.

32. The driver assist system of claim 31, wherein said seat adjustment system is operable to adjust a seat of the equipped vehicle in response to biometric data, said biometric data pertaining to the occupant of the seat of the equipped vehicle.

33. The driver assist system of claim 32, wherein the occupant of the equipped vehicle is the driver of the equipped vehicle and wherein said at least one accessory comprises a mirror adjustment system that is operable to at least one of (a) adjust a setting of an interior rearview minor assembly of the equipped vehicle responsive at least in part to said biometric data and (b) adjust a setting of an exterior rearview minor assembly of the equipped vehicle responsive at least in part to said biometric data.

34. The driver assist system of claim 1, comprising a control operable to communicate with an external service provider via a wireless communication link between the equipped vehicle and the external service provider.

35. The driver assist system of claim 34, wherein said control receives an input from the driver of the equipped vehicle, and responsive thereto, establishes said wireless communication link between the equipped vehicle and the external service provider, and wherein said control controls at least one accessory of the equipped vehicle responsive to a geographic location of the equipped vehicle as determined by a global positioning system of the equipped vehicle, and wherein data from the external service provider is downloaded to said control via said wireless communication link, and wherein said control comprises memory for storing downloaded data at least after said wireless communication link established between said control and the external service provider is disconnected.

36. The driver assist system of claim 35, wherein said downloaded data comprises downloaded driving instruction data useful for instructing the driver of the equipped vehicle how to drive from an initial location to a destination location, and wherein driving instructions derived at least in part from said downloaded driving instruction data are displayed by said video display for viewing by the driver of the equipped vehicle, and wherein said driving instructions are displayed by said video display in a step-by-step manner, with at least some driving instruction steps being displayed by said video display after said wireless communication link between said control and the external service provider is disconnected.

37. The driver assist system of claim 36, wherein said driving instructions comprise at least two driving instructions with each of said at least two driving instructions being coded or associated with or linked to a respective geographic location, and wherein each driving instruction is displayed by said video display only when the then current actual geographic position of the equipped vehicle at least generally corresponds to the particular geographic location coded or associated with or linked to said each driving instruction.

38. The driver assist system of claim 37, wherein said control provides an alert to the driver of the equipped vehicle when the actual geographic position of the equipped vehicle is not where it should be.

39. A driver assist system for a vehicle, said driver assist system comprising:
  a rearward facing camera disposed at a vehicle equipped with said driver assist system and having a rearward field of view relative to the equipped vehicle;
  a forward facing camera disposed at a vehicle equipped with said driver assist system and having a forward field of view relative to the equipped vehicle;

a video display viewable by a driver of the equipped vehicle when normally operating the equipped vehicle, wherein said video display is operable to display at least one of (i) image data captured by said rearward facing camera and (ii) image data captured by said forward facing camera;

wherein said driver assist system is operable to at least one of (i) detect objects present in said rearward field of view of said rearward facing camera and (ii) detect objects present said forward field of view of said forward facing camera;

wherein said driver assist system is operable to provide a display intensity of said displayed image data of at least about 200 candelas/sq. meter for viewing by the driver of the equipped vehicle;

wherein said driver assist system is operable to provide a visual alert to the driver of the equipped vehicle responsive to detection of an object exterior of the equipped vehicle;

wherein said driver assist system is operable to provide an audible alert to the driver of the equipped vehicle responsive to detection of an object exterior of the equipped vehicle; and wherein said visual alert comprises electronically generated indicia that overlay said image data displayed by said video display, and wherein said electronically generated indicia at least one of (i) indicate distance to a detected object exterior of the equipped vehicle and (ii) highlight a detected object exterior of the equipped vehicle.

40. The driver assist system of claim 39, wherein, during a reversing maneuver of the equipped vehicle, image data captured by said rearward facing camera is displayed by said video display as video images so as to assist the driver in reversing the equipped vehicle.

41. The driver assist system of claim 40, wherein said driver assist system is operable to detect objects present in said rearward field of view of said rearward facing camera during a reversing maneuver of the equipped vehicle.

42. The driver assist system of claim 41, wherein said electronically generated indicia at least one of (i) indicate distance to a detected object rearward of the equipped vehicle during a reversing maneuver of the equipped vehicle and (ii) highlight a detected object rearward of the equipped vehicle during a reversing maneuver of the equipped vehicle.

43. The driver assist system of claim 40, wherein said driver assist system is operable to (i) provide a visual alert to the driver of the equipped vehicle responsive to detection of an object rearward of the equipped vehicle during a reversing maneuver of the equipped vehicle, and (ii) provide an audible alert to the driver of the equipped vehicle responsive to detection of an object rearward of the equipped vehicle during a reversing maneuver of the equipped vehicle.

44. The driver assist system of claim 39, wherein said forward field of view of said forward facing camera encompasses the ground immediately in front of the equipped vehicle.

45. The driver assist system of claim 44, wherein said forward field of view of said forward facing camera encompasses an area forward of the equipped vehicle that is at least about as wide as a front fender of the equipped vehicle.

46. The driver assist system of claim 39, wherein said rearward field of view of said rearward facing camera encompasses the ground immediately rearward of the equipped vehicle.

47. The driver assist system of claim 46, wherein said rearward field of view of said rearward facing camera encompasses an area rearward of the equipped vehicle that is at least about as wide as a rear fender of the equipped vehicle.

48. The driver assist system of claim 39, wherein, responsive to detection of an object, the driver's attention is drawn to an object displayed on said video display.

49. The driver assist system of claim 48, wherein said electronically generated indicia highlights the detected object to draw the driver's attention to the displayed object.

50. The driver assist system of claim 39, wherein said audible alert audibly alerts the driver of the equipped vehicle that the equipped vehicle is moving closer and closer to an object present in the path of the equipped vehicle.

51. The driver assist system of claim 50, wherein said audible alert comprises an audible output of a speaker of the equipped vehicle.

52. The driver assist system of claim 39, wherein detection of objects present in said rearward field of view of said rearward facing camera comprises non-visual object detection.

53. The driver assist system of claim 52, wherein, responsive to detection of an object by said non-visual object detection, said audible alert audibly alerts the driver of the equipped vehicle that the equipped vehicle is reversing closer and closer to an object present in the reversing path of the equipped vehicle.

54. The driver assist system of claim 53, wherein said audible alert comprises an audible output of a speaker of the equipped vehicle.

55. The driver assist system of claim 39, comprising a human machine interface, said human machine interface comprising at least one user input, and wherein said at least one user input comprises at least one of a vocal input and a non-vocal input.

56. The driver assist system of claim 55, wherein said at least one user input comprises a non-vocal input and wherein said non-vocal input comprises at least one of a keypad input and a touch sensitive input.

57. The driver assist system of claim 56, wherein said at least one user input comprises a touch sensitive input.

58. The driver assist system of claim 55, wherein at least one of (i) said at least one user input comprises at least one input for a telematics system of the equipped vehicle, (ii) said at least one user input comprises at least one input for a navigational system of the equipped vehicle, (iii) said at least one user input comprises at least one input for a navigation function of said driver assist system, (iv) said at least one user input comprises at least one input for a biometric system of the equipped vehicle and (v) said driver assist system controls operation of said video display responsive, at least in part, to said at least one user input.

59. A driver assist system for a vehicle, said driver assist system comprising:

a rearward facing camera disposed at a vehicle equipped with said driver assist system and having a rearward field of view relative to the equipped vehicle;

a forward facing camera disposed at a vehicle equipped with said driver assist system and having a forward field of view relative to the equipped vehicle;

a video display viewable by a driver of the equipped vehicle when normally operating the equipped vehicle, wherein said video display is operable to display at least one of (i) image data captured by said rearward facing camera and (ii) image data captured by said forward facing camera;

wherein said driver assist system is operable to at least one of (i) detect objects present in said rearward field of view of said rearward facing camera and (ii) detect objects present said forward field of view of said forward facing camera;

wherein said driver assist system is operable to provide a display intensity of said displayed image data of at least about 200 candelas/sq. meter for viewing by the driver of the equipped vehicle;

wherein said driver assist system is operable to provide a visual alert to the driver of the equipped vehicle responsive to detection of an object exterior of the equipped vehicle;

wherein said driver assist system is operable to provide an audible alert to the driver of the equipped vehicle responsive to detection of an object exterior of the equipped vehicle;

wherein said visual alert comprises electronically generated indicia that overlay said image data displayed by said video display, and wherein said electronically generated indicia at least one of (i) indicate distance to a detected object exterior of the equipped vehicle and (ii) highlight a detected object exterior of the equipped vehicle; and at least one user input, wherein at least one of (i) said at least one user input comprises at least one input for a telematics system of the equipped vehicle, (ii) said at least one user input comprises at least one input for a navigational system of the equipped vehicle, (iii) said at least one user input comprises at least one input for a navigation function of said driver assist system, (iv) said at least one user input comprises at least one input for a biometric system of the equipped vehicle and (v) said driver assist system controls operation of said video display responsive, at least in part, to said at least one user input.

60. The driver assist system of claim 59, wherein, during a reversing maneuver of the equipped vehicle, image data captured by said rearward facing camera is displayed by said video display as video images so as to assist the driver in reversing the equipped vehicle.

61. The driver assist system of claim 60, wherein said driver assist system is operable to detect objects present in said rearward field of view of said rearward facing camera during a reversing maneuver of the equipped vehicle.

62. The driver assist system of claim 61, wherein said electronically generated indicia at least one of (i) indicate distance to a detected object rearward of the equipped vehicle during a reversing maneuver of the equipped vehicle and (ii) highlight a detected object rearward of the equipped vehicle during a reversing maneuver of the equipped vehicle.

63. The driver assist system of claim 61, wherein said driver assist system is operable to (i) provide a visual alert to the driver of the equipped vehicle responsive to detection of an object rearward of the equipped vehicle during a reversing maneuver of the equipped vehicle, and (ii) provide an audible alert to the driver of the equipped vehicle responsive to detection of an object rearward of the equipped vehicle during a reversing maneuver of the equipped vehicle.

64. The driver assist system of claim 59, wherein said forward field of view of said forward facing camera encompasses the ground immediately in front of the equipped vehicle.

65. The driver assist system of claim 64, wherein said forward field of view of said forward facing camera encompasses an area forward of the equipped vehicle that is at least about as wide as a front fender of the equipped vehicle.

66. The driver assist system of claim 59, wherein said rearward field of view of said rearward facing camera encompasses the ground immediately rearward of the equipped vehicle.

67. The driver assist system of claim 66, wherein said rearward field of view of said rearward facing camera encompasses an area rearward of the equipped vehicle that is at least about as wide as a rear fender of the equipped vehicle.

68. The driver assist system of claim 59, wherein, responsive to detection of an object, the driver's attention is drawn to an object displayed on said video display.

69. The driver assist system of claim 68, wherein said electronically generated indicia highlights the detected object to draw the driver's attention to the displayed object.

70. The driver assist system of claim 59, wherein said audible alert audibly alerts the driver of the equipped vehicle that the equipped vehicle is moving closer and closer to an object present in the path of the equipped vehicle.

71. The driver assist system of claim 70, wherein said audible alert comprises an audible output of a speaker of the equipped vehicle.

72. The driver assist system of claim 59, wherein detection of objects present in said rearward field of view of said rearward facing camera comprises non-visual object detection.

73. The driver assist system of claim 72, wherein, responsive to detection of an object by said non-visual object detection, said audible alert audibly alerts the driver of the equipped vehicle that the equipped vehicle is reversing closer and closer to an object present in the reversing path of the equipped vehicle.

74. The driver assist system of claim 73, wherein said audible alert comprises an audible output of a speaker of the equipped vehicle.

75. The driver assist system of claim 59, wherein said at least one user input comprises a touch sensitive input.

76. A driver assist system for a vehicle, said driver assist system comprising:

a camera disposed at a vehicle equipped with said driver assist system and having an exterior field of view relative to the equipped vehicle;

a video display viewable by a driver of the equipped vehicle when normally operating the equipped vehicle, wherein said video display is operable to display image data captured by said camera;

wherein said driver assist system is operable to detect objects present in said exterior field of view of said camera;

wherein said driver assist system is operable to provide a display intensity of said displayed image data of at least about 200 candelas/sq. meter for viewing by the driver of the equipped vehicle;

wherein said driver assist system is operable to provide a visual alert to the driver of the equipped vehicle responsive to detection of an object exterior of the equipped vehicle;

wherein said driver assist system is operable to provide an audible alert to the driver of the equipped vehicle responsive to detection of an object exterior of the equipped vehicle;

wherein said visual alert comprises electronically generated indicia that overlay said image data displayed by said video display, and wherein said electronically generated indicia at least one of (i) indicate distance to a detected object exterior of the equipped vehicle and (ii) highlight a detected object exterior of the equipped vehicle; and wherein, responsive to detection of an object, the driver's attention is drawn to an object displayed on said video display.

77. The driver assist system of claim 76, wherein said camera comprises a rearward facing camera having a rearward field of view and wherein, during a reversing maneuver of the equipped vehicle, image data captured by said rearward facing camera is displayed by said video display as video images so as to assist the driver in reversing the equipped vehicle.

78. The driver assist system of claim 77, wherein said driver assist system is operable to detect objects present in said rearward field of view of said rearward facing camera during a reversing maneuver of the equipped vehicle.

79. The driver assist system of claim 78, wherein said electronically generated indicia at least one of (i) indicate distance to a detected object rearward of the equipped vehicle during a reversing maneuver of the equipped vehicle and (ii) highlight a detected object rearward of the equipped vehicle during a reversing maneuver of the equipped vehicle.

80. The driver assist system of claim 78, wherein said driver assist system is operable to (i) provide a visual alert to the driver of the equipped vehicle responsive to detection of an object rearward of the equipped vehicle during a reversing maneuver of the equipped vehicle, and (ii) provide an audible alert to the driver of the equipped vehicle responsive to detection of an object rearward of the equipped vehicle during a reversing maneuver of the equipped vehicle.

81. The driver assist system of claim 76, wherein said camera comprises a forward facing camera having a forward field of view and wherein said forward field of view of said forward facing camera encompasses the ground immediately in front of the equipped vehicle.

82. The driver assist system of claim 81, wherein said forward field of view of said forward facing camera encompasses an area forward of the equipped vehicle that is at least about as wide as a front fender of the equipped vehicle.

83. The driver assist system of claim 76, wherein said electronically generated indicia highlights the detected object to draw the driver's attention to the displayed object.

84. The driver assist system of claim 76, wherein said audible alert audibly alerts the driver of the equipped vehicle that the equipped vehicle is moving closer and closer to an object present in the path of the equipped vehicle.

85. The driver assist system of claim 76, wherein said driver assist system is operable to provide a display intensity of said displayed image data of at least about 300 candelas/sq. meter for viewing by the driver of the equipped vehicle.

86. The driver assist system of claim 76, wherein said driver assist system is operable to provide a display intensity of said displayed image data of at least about 400 candelas/sq. meter for viewing by the driver of the equipped vehicle.

87. The driver assist system of claim 76, comprising at least one user input, wherein at least one of (i) said at least one user input comprises at least one input for a telematics system of the equipped vehicle, (ii) said at least one user input comprises at least one input for a navigational system of the equipped vehicle, (iii) said at least one user input comprises at least one input for a navigation function of said driver assist system, (iv) said at least one user input comprises at least one input for a biometric system of the equipped vehicle and (v) said driver assist system controls operation of said video display responsive, at least in part, to said at least one user input.

88. The driver assist system of claim 76, comprising a human machine interface, said human machine interface comprising at least one user input, wherein said at least one user input comprises at least one of (i) a vocal input, (ii) a non-vocal input, (iii) a keypad input and (iv) a touch sensitive input.

89. The driver assist system of claim 88, wherein said at least one user input comprises a touch sensitive input and wherein said driver assist system is operable to provide a display intensity of said displayed image data of at least about 400 candelas/sq. meter for viewing by the driver of the equipped vehicle.

* * * * *

UNITED STATES PATENT AND TRADEMARK OFFICE
CERTIFICATE OF CORRECTION

PATENT NO.        : 8,543,330 B2
APPLICATION NO.   : 13/621382
DATED             : September 24, 2013
INVENTOR(S)       : David W. Taylor et al.

It is certified that error appears in the above-identified patent and that said Letters Patent is hereby corrected as shown below:

In the Specification

Column 8:
Line 27, "application" should be --applications,--
Line 55, "application" should be --applications,--
Line 67, "minor" should be --mirror--

Column 9:
Line 1, "minor" should be --mirror--
Line 2, "minor" should be --mirror--
Line 4, "minor" should be --mirror--
Line 6, "minor" should be --mirror--
Line 14, "minor" should be --mirror--
Line 16, "minor" should be --mirror--
Line 17, "minor" should be --mirror--
Line 18, "minor" should be --mirror--
Line 26, "minor" should be --mirror--
Line 30, "minor" should be --mirror--
Line 41, "application" should be --applications,--
Line 47, "minor" should be --mirror--
Line 49, "minor" should be --mirror--

Column 10:
Line 43, "application" should be --applications,--

Column 13:
Line 24, "minor" should be --mirror--
Line 32, "minor" should be --mirror--
Line 36, "minor" should be --mirror--

Signed and Sealed this
Tenth Day of February, 2015

Michelle K. Lee
*Deputy Director of the United States Patent and Trademark Office*

CERTIFICATE OF CORRECTION (continued)
U.S. Pat. No. 8,543,330 B2

Line 42, "application" should be --applications,--
Line 61, "minor" should be --application--

Column 14:
Line 12, "application" should be --applications,--
Line 24, "minor" should be --mirror--
Line 47, "minor" should be --mirror--
Line 50, "minor" should be --mirror--

Column 15:
Line 7, "application" should be --applications,--

Column 16:
Line 54, "minor" should be --mirror--
Line 64, "minor" should be --mirror--

Column 17:
Line 6, "minor" should be --mirror--
Line 9, "minor" should be --mirror--
Line 12, "minor" should be --mirror--
Line 21, "minor" should be --mirror--

Column 19:
Line 41, "application" should be --applications,--

Column 21:
Line 8, "minor" should be --mirror--

Column 22:
Line 1, "minor" should be --mirror--
Line 8, "minor" should be --mirror--
Line 14, "minor" should be --mirror--
Line 23, "minor" should be --mirror--
Line 24, "minor" should be --mirror--
Line 51, "minor" should be --mirror--
Line 58, "minor" should be --mirror--
Line 59, "minor" should be --mirror--
Line 60, "minor" should be --mirror--
Line 61, "minors" should be --mirrors--

Column 23:
Line 8, "minor" should be --mirror--

Column 24:
Line 3, "minor" should be --mirror--

Line 24, "minor" should be --mirror--
Line 25, "minor" should be --mirror--
Line 62, "minor" should be --mirror--

Column 25:
Line 4, "minor" should be --mirror--
Line 33, "minor" should be --mirror--
Line 53, "minor" should be --mirror--
Line 53, "minor" should be --mirror--
Line 55, "minor" should be --mirror--
Line 62, "minor" should be --mirror--
Line 63, "minor" should be --mirror--
Line 64, "minor" should be --mirror--

Column 26:
Line 3, "minor" should be --mirror--
Line 14, "minor" should be --mirror--
Line 24, "minor" should be --mirror--
Line 29, "minor" should be --mirror--
Line 29, "minor" should be --mirror--
Line 38, "minor" should be --mirror--
Line 47, "minor" should be --mirror--
Line 50, "minor" should be --mirror--

Column 30:
Line 10, "minor" should be --mirror--
Line 11, "minors" should be --mirrors--
Line 27, "minor" should be --mirror--
Line 28, "minor" should be --mirror--

Column 31:
Line 8, "minor" should be --mirror--
Line 41, Delete "The embodiments of the invention in which an exclusive property is claimed as defined as" After "limited"

In the Claims

Column 33:
Line 50, Claim 28, "minor" should be --mirror--

Column 34:
Line 12, Claim 33, "minor" should be --mirror--
Line 14, Claim 33, "minor" should be --mirror--